(12) United States Patent
Islam et al.

US011252717B2

(10) Patent No.: US 11,252,717 B2
(45) Date of Patent: Feb. 15, 2022

(54) CO-EXISTENCE OF LATENCY TOLERANT AND LOW LATENCY COMMUNICATIONS

(71) Applicant: Huawei Technologies Co., Ltd., Shenzhen (CN)

(72) Inventors: Toufiqul Islam, Ottawa (CA); Jianglei Ma, Ottawa (CA); Kelvin Kar Kin Au, Kanata (CA); Jiayin Zhang, Kanata (CA); Mohamed Adel Salem, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/691,312

(22) Filed: Aug. 30, 2017

(65) Prior Publication Data

US 2018/0070341 A1    Mar. 8, 2018

Related U.S. Application Data

(60) Provisional application No. 62/417,933, filed on Nov. 4, 2016, provisional application No. 62/395,914, filed
(Continued)

(51) Int. Cl.
*H04W 72/04*    (2009.01)
*H04L 5/00*    (2006.01)
(Continued)

(52) U.S. Cl.
CPC ......... *H04W 72/044* (2013.01); *H04L 1/1812* (2013.01); *H04L 1/1887* (2013.01);
(Continued)

(58) Field of Classification Search
CPC . H04L 1/1887; H04L 27/2602; H04L 5/1469; H04L 5/0064; H04L 2001/0093;
(Continued)

(56) References Cited

U.S. PATENT DOCUMENTS 10,334,589 B2    6/2019    Stephenne et al.
10,368,345 B2    7/2019    Sun et al.
(Continued)

FOREIGN PATENT DOCUMENTS

CN    101212762 A    7/2008
CN    101459965 A    6/2009
(Continued)

OTHER PUBLICATIONS

Nokia et al., "Punctured Scheduling for Low Latency Transmissions", 3GPP TSG-RAN WG1 #85, R1-165381, May 23-27, 2016, 4 Pages, XP51096643, Nanjing, P.R. China.
(Continued)

*Primary Examiner* — Hoang-Chuong Q Vu
(74) *Attorney, Agent, or Firm* — Slater Matsil, LLP

(57) ABSTRACT

Some user equipments (UEs) served by a base station may need to receive data from the base station and/or transmit data to the base station with lower latency than other UEs. It is desired to accommodate the presence of both low latency and latency tolerant communications in shared time-frequency resources to try to improve resource utilization. Embodiments are disclosed in which low latency and latency tolerant communications coexist in the same time-frequency resources. In some embodiments, a latency tolerant transmission is postponed to free resources to send a low latency transmission.

30 Claims, 28 Drawing Sheets

Related U.S. Application Data on Sep. 16, 2016, provisional application No. 62/383,149, filed on Sep. 2, 2016.

(51) Int. Cl.
| | |
|---|---|
| *H04L 1/18* | (2006.01) |
| *H04L 27/26* | (2006.01) |
| *H04W 72/12* | (2009.01) |
| *H04L 5/14* | (2006.01) |
| *H04L 1/00* | (2006.01) |
| *H04W 88/02* | (2009.01) |
| *H04W 88/08* | (2009.01) |

(52) U.S. Cl.
CPC .......... *H04L 5/0064* (2013.01); *H04L 5/1469* (2013.01); *H04L 27/2602* (2013.01); *H04W 72/042* (2013.01); *H04W 72/1242* (2013.01); *H04L 1/1822* (2013.01); *H04L 5/0007* (2013.01); *H04L 5/0055* (2013.01); *H04L 2001/0093* (2013.01); *H04W 88/02* (2013.01); *H04W 88/08* (2013.01)

(58) Field of Classification Search
CPC ... H04L 1/1822; H04L 1/1812; H04L 5/0055; H04L 5/0007; H04W 72/1242; H04W 72/044; H04W 72/042; H04W 88/08; H04W 88/02
See application file for complete search history.

(56) References Cited

U.S. PATENT DOCUMENTS

| | | | |
|---|---|---|---|
| 2004/0062273 A1 | 4/2004 | Frank et al. | |
| 2005/0071471 A1 | 3/2005 | Saenz | |
| 2008/0313521 A1 | 12/2008 | Frederiksen et al. | |
| 2009/0262699 A1 | 10/2009 | Wengerter et al. | |
| 2010/0074200 A1 | 3/2010 | Li et al. | |
| 2012/0329400 A1 | 12/2012 | Seo et al. | |
| 2013/0083753 A1* | 4/2013 | Lee | H04W 72/0453 370/329 |
| 2013/0163537 A1 | 6/2013 | Anderson et al. | |
| 2013/0324117 A1 | 12/2013 | Kim et al. | |
| 2014/0086197 A1 | 3/2014 | Yang et al. | |
| 2014/0146689 A1 | 5/2014 | Gaur et al. | |
| 2014/0258815 A1 | 9/2014 | Jeong et al. | |
| 2014/0325321 A1 | 10/2014 | Rafique et al. | |
| 2014/0369247 A1 | 12/2014 | Sambhwani et al. | |
| 2015/0023145 A1 | 1/2015 | Kim et al. | |
| 2015/0181570 A1 | 6/2015 | Sorrentino et al. | |
| 2015/0230211 A1 | 8/2015 | You et al. | |
| 2015/0256486 A1 | 9/2015 | Boucard et al. | |
| 2015/0326369 A1 | 11/2015 | Kim et al. | |
| 2015/0334685 A1* | 11/2015 | Ji | H04W 72/1247 370/330 |
| 2015/0334709 A1 | 11/2015 | Ji et al. | |
| 2016/0057768 A1 | 2/2016 | Sun et al. | |
| 2016/0066316 A1 | 3/2016 | Bhushan et al. | |
| 2016/0113008 A1* | 4/2016 | Damnjanovic | H04W 72/14 370/336 |
| 2016/0127094 A1 | 5/2016 | Jiang et al. | |
| 2016/0128045 A1 | 5/2016 | Azarian Yazdi et al. | |
| 2016/0198350 A1 | 7/2016 | Lou et al. | |
| 2016/0234857 A1 | 8/2016 | Chen et al. | |
| 2016/0309466 A1 | 10/2016 | Chen et al. | |
| 2016/0309518 A1 | 10/2016 | Patel et al. | |
| 2016/0352551 A1* | 12/2016 | Zhang | H04L 27/2646 |
| 2016/0381490 A1 | 12/2016 | Rico Alvarino et al. | |
| 2017/0111886 A1 | 4/2017 | Kim et al. | |
| 2017/0257860 A1 | 9/2017 | Nam et al. | |
| 2017/0289964 A1 | 10/2017 | Lin et al. | |
| 2017/0332358 A1 | 11/2017 | Park et al. | |
| 2017/0366311 A1 | 12/2017 | Iyer et al. | |
| 2017/0367003 A1* | 12/2017 | Zhang | H04W 8/08 |
| 2018/0027576 A1* | 1/2018 | Kowalski | H04W 72/0446 370/329 |
| 2018/0035332 A1* | 2/2018 | Agiwal | H04W 74/0858 |
| 2018/0041858 A1 | 2/2018 | Sheng et al. | |
| 2018/0049166 A1 | 2/2018 | Sun et al. | |
| 2018/0049189 A1 | 2/2018 | Hugl et al. | |
| 2018/0049197 A1* | 2/2018 | Patel | H04J 1/00 |
| 2018/0049272 A1* | 2/2018 | Bagheri | H04W 72/042 |
| 2018/0199341 A1* | 7/2018 | Baldemair | H04L 5/0091 |
| 2018/0234998 A1 | 8/2018 | You et al. | |
| 2018/0249486 A1 | 8/2018 | Hosseini et al. | |
| 2018/0255543 A1* | 9/2018 | Takeda | H04W 72/0413 |
| 2018/0279347 A1* | 9/2018 | Wang | H04W 72/0446 |
| 2018/0287739 A1 | 10/2018 | Kim et al. | |
| 2018/0302900 A1* | 10/2018 | Ibars Casas | H04L 5/0053 |
| 2018/0337763 A1* | 11/2018 | Shi | H04L 1/16 |
| 2018/0367263 A1 | 12/2018 | Ying et al. | |
| 2018/0376495 A1* | 12/2018 | Lee | H04L 5/00 |
| 2019/0007181 A1* | 1/2019 | Marinier | H04L 5/0007 |
| 2019/0115997 A1 | 4/2019 | Chen et al. | |
| 2019/0159240 A1 | 5/2019 | Lohr et al. | |
| 2019/0165906 A1* | 5/2019 | Bala | H04L 5/0091 |
| 2019/0173623 A1* | 6/2019 | Khosravirad | H04L 1/0079 |
| 2019/0190675 A1 | 6/2019 | Takeda et al. | |
| 2019/0223050 A1* | 7/2019 | Wikstrom | H04W 72/1205 |
| 2019/0261383 A1* | 8/2019 | Kwak | H04W 72/10 |
| 2019/0268096 A1 | 8/2019 | Takeda et al. | |
| 2019/0268107 A1 | 8/2019 | Yasukawa et al. | |
| 2019/0319750 A1 | 10/2019 | Khosravirad et al. | |
| 2019/0372742 A1 | 12/2019 | Lee et al. | |
| 2020/0015248 A1 | 1/2020 | Ji et al. | |
| 2020/0037305 A1 | 1/2020 | Fang et al. | |
| 2021/0167905 A1* | 6/2021 | Bala | H04J 11/00 |
| 2021/0266871 A1* | 8/2021 | Rudolf | H04L 29/08306 |

FOREIGN PATENT DOCUMENTS

| | | |
|---|---|---|
| CN | 101986619 A | 3/2011 |
| CN | 104113937 A | 10/2014 |
| CN | 104284424 A | 1/2015 |
| EP | 2214340 A1 | 8/2010 |
| JP | 2012503349 A | 2/2012 |
| JP | 2014107868 A | 6/2014 |
| JP | 2017519421 A | 7/2017 |
| JP | 2017530653 A | 10/2017 |
| WO | 2008154646 A2 | 12/2008 |
| WO | 2010012156 A1 | 2/2010 |
| WO | 2015003057 A3 | 3/2015 |
| WO | 2015179136 A1 | 11/2015 |
| WO | 2015179145 A1 | 11/2015 |
| WO | 2016036492 A1 | 3/2016 |
| WO | 2016040290 A1 | 3/2016 |
| WO | 2016126398 A1 | 8/2016 |

OTHER PUBLICATIONS

Qualcomm et al., "WF on Scalable Numerology Symbol Boundary Alignment", 3GPP TSG RAN WG1 #85, R1-165583, May 23-27, 2016, 6 Pages, XP511117744, Nanjing, China.

Samsung, "Discussion on symbol alignment across scaled numerology", 3GPP TSG RAN WG1#86, R1-166753, Aug. 22-26, 2016, 4 Pages, XP51141919, Gothenburg, Sweden.

LG Electronics, "Discussion on alignment for different numerology multiplexing", 3GPP TSG RAN WG1 Meeting #86, R1-166878, Aug. 22-26, 2016, 5 Pages, XP51125615, Gothenburg, Sweden.

LG Electronics, "Discussion on relay operation in NR", 3GPP TSG RAN WG1 Meeting #86, R1-166887, Aug. 22-26, 2016, 4 Pages, XP51132944, Gothenburg, Sweden.

Nokia et al., "Punctured Scheduling for Low Latency Transmissions", 3GPP TSG-RAN WG1 #86, R1-167308, Aug. 22-26, 2016, 4 Pages, XP51125827A, Gothenburg, Sweden.

Samsung, "Discussion on URLLC support in NR", 3GPP TSG RAN WG1 Meeting #86, R1-166759, Aug. 22-26, 2016, 5 pages, Gothenburg, Sweden.

Intel Corporation, "Downlink URLLC transmission and multiplexing with eMBB", 3GPP TSG RAN WG1 Meeting #87, R1-1612003, Nov. 14-18, 2016, 10 pages, Reno, USA.

(56) References Cited

OTHER PUBLICATIONS

Huawei et al., "Consideration on multiplexing of non-sTTI and sTTI in the same carrier", 3GPP TSG RAN WG1 Meeting #84bis, R1-162590, Apr. 11- 5, 2016, 5 pages, Busan, Korea.
Huawei et al., "Discussion on sTTI scheduling", 3GPP TSG RAN WG1 Meeting #88, R1-1701733, Feb. 13-17, 2017, Athens, Greece.
Samsung, "Collision handling of sTTI and TTI in UL", 3GPP TSG RAN WG1 Meeting #89, R1-1707886, May 15-19, 2017, 4 Pages, Hangzhou, P.R. China.
Huawei et al., "On pre-emption indication for DL multiplexing of URLLC and eMBB", 3GPP TSG RAN WG1 Meeting, #88bis, R1-1704215, Apr. 3-7, 2017, 5 Pages, Spokane, USA.
Caban, S. et al., "Evaluation of HSDPA and LTE", From Testbed Measurements to System Level Performance, 4 Pages.
Rumney, M., "LTE and the Evolution to 4G Wireless", Design and Measurement Challenges, Second Edition, Agilent Technologies, 4 Pages.
ZTE, Unified Synchronization Structure, 3GPP TSG RAN WG1 Meeting #86, R1-166422, Aug. 13, 2016, 6 pages, Gothenburg, Sweden.
Alcatel-Lucent, "UL grant and UE behaviour", 3GPP TSG RAN WG2 #60, R2-074891, Nov. 5-9, 2007, 4 Pages, Jeju, Korea.

\* cited by examiner

| Parameters | Set 1 | Set 2 | Set 3 | Set 4 | Set 5 | Set 6 | Set 7 |
|---|---|---|---|---|---|---|---|
| Subcarrier-spacing(kHz) | 7.5 | 15 | 30 | 60 | 120 | 240 | 480 |
| OFDM symbol length (usec) | 133.33 | 66.67 | 33.33 | 16.67 | 8.33 | 4.17 | 2.08 |
| CP-length(usec) (NCP (Type 1, Type 2)/ECP) | (10.42,9.38) / 33.3 | (5.21,4.69) / 16.67 | (2.6, 2.34) /8.33 | (1.3, 1.17) / 4.17 | (0.65, 0.59) * | (0.326, 0.29) * | (0.16,0.15) * |
| No. of symbols per sub-frame: 7 (1 w/cp1, 6 w/cp2) / 6 (single cp) | 7/6 | 7/6 | 7/6 | 7/6 | 7 | 7 | 7 |
| TTU length (ms) | 1 | 0.5 | 0.25 | 0.125 | 0.0625 | 0.03125 | 0.015625 |
| CP overhead(NCP/ECP) | 6.67% /20% | 6.67% /20% | 6.67% /20% | 6.67% /20% | 6.67% * | 6.67% * | 6.67% * |

FIG. 19

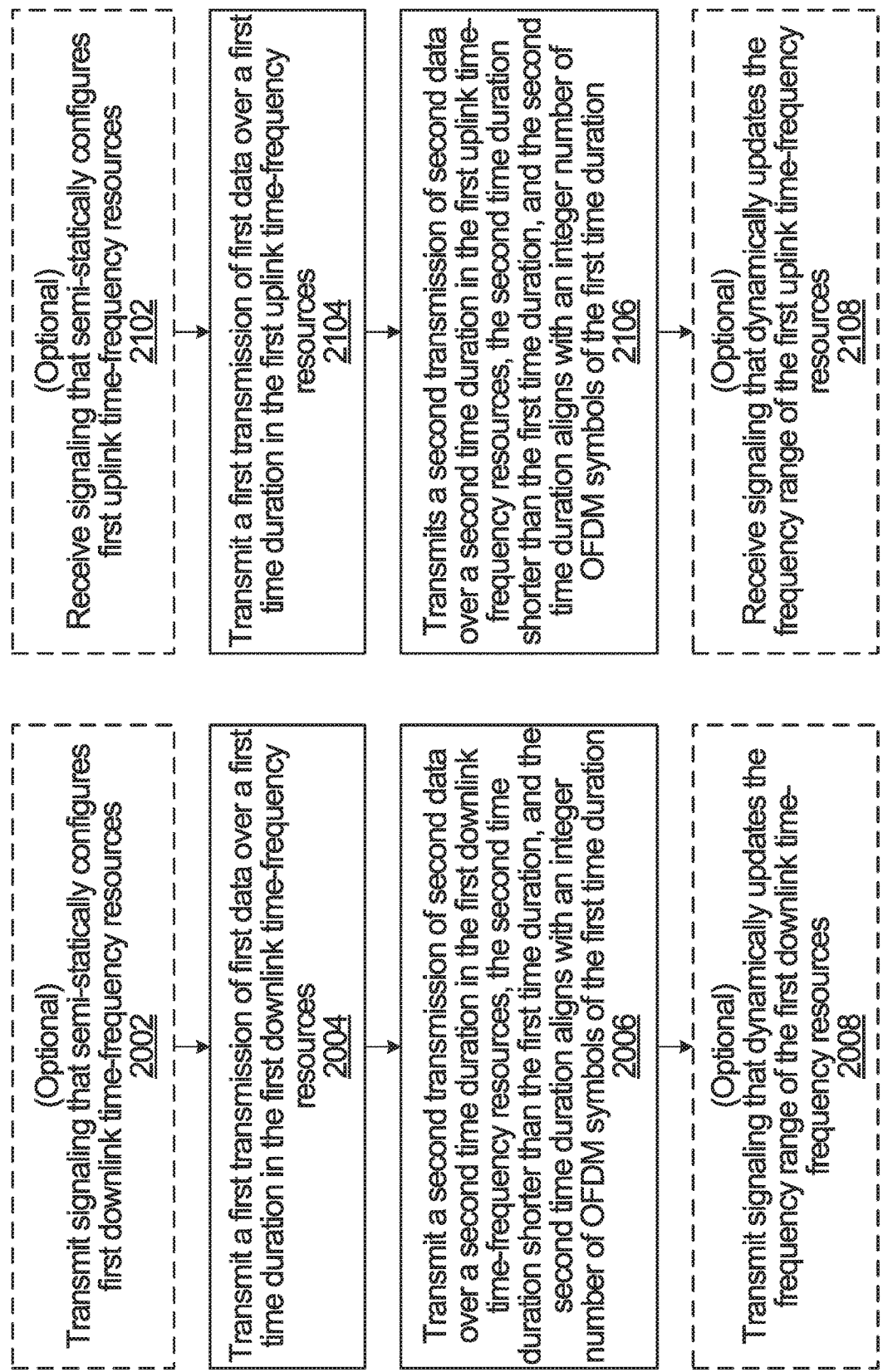

US 11,252,717 B2

CO-EXISTENCE OF LATENCY TOLERANT AND LOW LATENCY COMMUNICATIONS

PRIORITY CLAIM

The present application claims priority to U.S. Provisional Patent Application Ser. No. 62/383,149 entitled "Coexistence of Mixed Services in TDD Flexible Frame Structure" and filed on Sep. 2, 2016, and U.S. Provisional Patent Application Ser. No. 62/395,914 entitled "System and Method for Mixed Numerology Coexistence With Slot or Symbol Alignment" and filed on Sep. 16, 2016, and U.S. Provisional Patent Application Ser. No. 62/417,933 entitled "Coexistence of Mixed Services in TDD Flexible Frame Structure" and filed on Nov. 4, 2016, all of which are incorporated herein by reference.

FIELD

The present application relates to the co-existence of latency tolerant and low latency communication.

BACKGROUND

In some wireless communication systems, user equipments (UEs) wirelessly communicate with one or more base stations. The wireless communications may be performed by transmitting orthogonal frequency-division multiplexing (OFDM) symbols. The OFDM symbols may be transmitted according to an orthogonal multiple access scheme, such as orthogonal frequency-division multiple access (OFDMA), or a non-orthogonal multiple access (NoMA) scheme, such as sparse code multiple access (SCMA).

A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources.

Some UEs served by a base station may need to receive data from the base station and/or transmit data to the base station with lower latency than other UEs. For example, a base station may serve multiple UEs, including a first UE and a second UE. The first UE may be a mobile device carried by a human who is using the first UE to browse on the Internet. The second UE may be equipment on an autonomous vehicle driving on a highway. Although the base station is serving both UEs, the second UE may need to send and/or receive data with lower latency compared to the first UE. The second UE may also need to send and/or receive its data with higher reliability. The second UE may be an ultra-reliable low latency communication (URLLC) UE, and the first UE may be an enhanced mobile broadband (eMBB) UE.

It is desired to accommodate the presence of both low latency and latency tolerant communications in shared time-frequency resources to try to improve resource utilization.

SUMMARY

Embodiments are disclosed herein in which low latency and latency tolerant communications coexist in the same time-frequency resources. In some embodiments, a latency tolerant transmission is postponed to free resources to send a low latency transmission.

In one embodiment, there is provided a method performed by a base station. The method includes transmitting a first transmission of first data over a first time duration in first downlink time-frequency resources. The method may further include transmitting a second transmission of second data over a second time duration in the first downlink time-frequency resources. The second time duration may be shorter than the first time duration. The second time duration may align with an integer number of OFDM symbols of the first time duration.

In another embodiment, there is provided a method performed by a UE. The method includes transmitting a first transmission of first data over a first time duration in first uplink time-frequency resources. The method may further include transmitting a second transmission of second data over a second time duration in the first uplink time-frequency resources. The second time duration may be shorter than the first time duration. The second time duration may align with an integer number of OFDM symbols of the first time duration.

In another embodiment, there is provided another method performed by a UE. The method includes receiving scheduling information that schedules a downlink transmission of a transport block for the UE during a first time interval. The downlink transmission includes first data on particular time-frequency resources. The method further includes receiving an indication that indicates that the first data is no longer scheduled on the particular time-frequency resources. The indication may be received after receiving some of the downlink transmission.

BRIEF DESCRIPTION OF THE DRAWINGS

Embodiments will be described, by way of example only, with reference to the accompanying figures wherein:

FIG. 19 is a table illustrating the parameters for different numerologies, according to one embodiment;

FIG. 28 is a method performed by a base station, according to one embodiment; and FIGS. 29 and 30 are methods performed by a UE, according to different embodiments.

DETAILED DESCRIPTION

For illustrative purposes, specific example embodiments will now be explained in greater detail below in conjunction with the figures.

Figure 1:
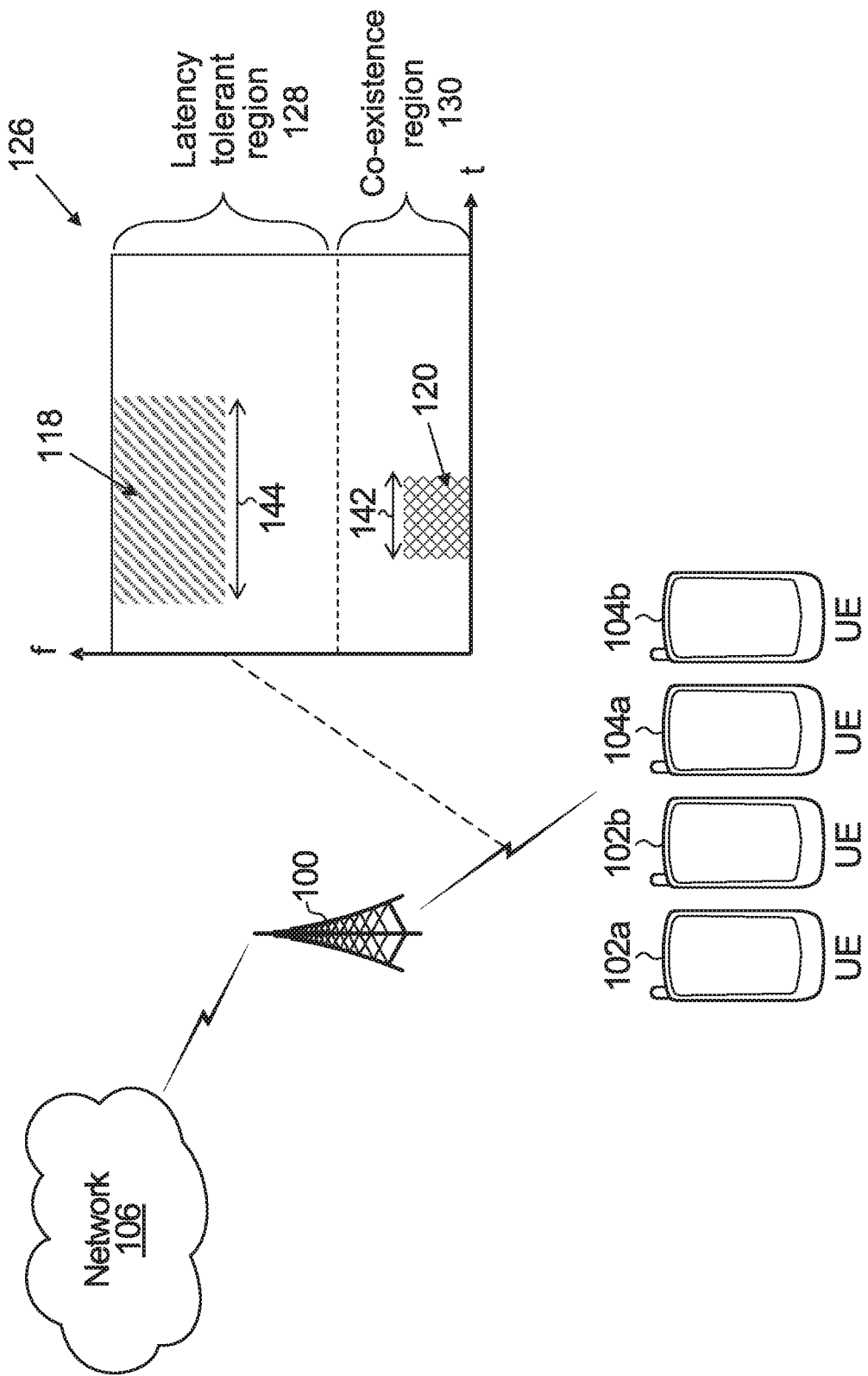
FIG. 1 is a block diagram of a base station communicating with four UEs, according to one embodiment.

FIG. 1 is a block diagram of a base station 100, as well as four UEs 102a, 102b, 104a, and 104b served by the base station 100, according to one embodiment. The base station 100 facilitates uplink and downlink communication between the UEs and a network 106. The uplink and downlink communications may use OFDM symbols, possibly in combination with either an orthogonal multiple access scheme, such as OFDMA, or a non-orthogonal multiple access scheme, such as SCMA.

UEs 102a and 102b require lower latency uplink and/or downlink communication compared to UEs 104a and 104b. For example, UEs 102a and 102b may be URLLC UEs, and UEs 104a and 104b may be eMBB UEs.

UEs that are served by a base station 100 and that require lower latency communication will be referred to as "low latency UEs". The other UEs served by the base station will be referred to as "latency tolerant UEs" because traffic to/from the other UEs is relatively delay tolerant compared to the traffic to/from the low latency UEs. In FIG. 1, UEs 102a and 102b are low latency UEs, and UEs 104a and 104b are latency tolerant UEs. Data to be transmitted between a base station and a low latency UE will be referred to as "low latency data", and data to be transmitted between a base station and a latency tolerant UE will be referred to as "latency tolerant data". It is contemplated that a single UE may use both low latency communication and latency tolerant communication, in which case the term "low latency UE" would refer to the activities of the single UE for the purpose of low latency communication, and the term "latency tolerant UE" would refer to the activities of the single UE for the purpose of latency tolerant communication.

The UEs 102a and 102b do not necessarily have to be low latency UEs, and the UEs 104a and 104b do not have to be latency tolerant UEs. More generally, UEs 102a and 102b may have a different traffic type from UEs 104a and 104b. For example, UEs 104a and 104b may each be a first traffic type UE, which is a UE that is configured to transmit and receive traffic of a first type. The traffic of the first type may be latency tolerant data traffic, such as eMBB traffic. UEs 102a and 102b may each be a second traffic type UE, which is a UE that is configured to transmit and receive traffic of a second type. The traffic of the second type may be low latency traffic, such as URLLC traffic. A second traffic type UE may also have other capabilities, including handling traffic of the first traffic type. Similarly, a first traffic type UE may also have other capabilities, including handling traffic of the second traffic type.

Therefore, although eMBB UEs and eMBB data are described later in some embodiments, more generally the UEs in these embodiments may instead be replaced with latency tolerant UEs having latency tolerant data instead of eMBB data. Even more generally, latency tolerant UEs, such as eMBB UEs, may instead be replaced with first traffic type UEs having traffic of a first type. Similarly, although URLLC UEs and URLLC data are described later in some embodiments, more generally the UEs in these embodiments may instead be replaced with low latency UEs having low latency data instead of URLLC data. Even more generally, low latency UEs, such as URLLC UEs, may instead be replaced with second traffic type UEs having traffic of a second type.

Although the base station 100 only serves four UEs in FIG. 1, in actual operation the base station 100 may serve many more UEs. In some examples described herein, downlink transmissions to the low latency UEs are grant-based, and uplink transmissions from the low latency UEs are grant-free. However, more generally uplink and/or downlink transmissions between the base station and low latency UEs may be grant-based and/or grant-free.

When a wireless transmission occurs between the base station 100 and one or more of UEs 102a, 102b, 104a, and/or 104b, the transmission uses allocated resources, e.g. time-frequency resources. An example of time-frequency resources is indicated at 126. Example specific resource partitions allocated to UEs are shown at 118 and 120.

A region 128 of the time-frequency resources 126 is reserved or used for the transmission of latency tolerant data, and this region 128 will be referred to as the latency tolerant region. Another region 130 of the time-frequency resources 126 is reserved or used for the transmission of both latency tolerant data and low latency data, and this region 130 will be referred to as the co-existence region. Region 128 is illustrated as a separate frequency range from region 130, although in general this need not be the case. Also, there may be another region (not shown) that is reserved or used just for the transmission of low latency data. Other types of regions may additionally or alternatively be present. For example, the time-frequency resources 126 could instead be partitioned into a low latency region and a coexistence region, or into a latency tolerant region, a low latency region, and a coexistence region. It is also contemplated that the partitioning of the time-frequency resources 126 could be time division multiplexing (TDM) based, frequency division multiplexing (FDM) based, or in any other suitable manner, and that the partitions may change dynamically or semi-statically over time. This implies that the time-frequency region where both low latency and latency tolerant communication are made can be semi-statically configured and/or dynamically updated.

Because both latency tolerant and low latency traffic can be scheduled in the time-frequency region 130, and the latency tolerant transmission can be punctured so that a low latency transmission may be sent instead, the time-frequency region 130 may alternatively be referred to as coexistence region or pre-emption region or pre-emption/puncturing indication region or impacted region.

The resources used for low latency communications may be partitioned into time intervals. A time interval used for low latency communication will be referred to as a "low latency interval". In some embodiments, a low latency interval may be called a "low latency slot" or a "mini slot", if a slot duration happens to be equal to a low latency interval duration. A slot may be defined as a particular number of OFDM symbols, e.g. 7 or 14 OFDM symbols in some embodiments. In some embodiments, a low latency interval may be called a low latency scheduling interval if low latency data is being scheduled for transmission on the low latency interval.

An example of a low latency interval duration is shown at 142. A low latency interval carries an encoded transport block to or from a low latency UE. It is contemplated that in some cases, an encoded transport block may span more than one low latency interval. A low latency interval encompasses a particular number of OFDM symbols, e.g. 7 OFDM symbols or any other integer number of OFDM symbols.

A low latency interval may be equal to, more than, or less than a sub-frame duration, depending upon the implementation. A sub-frame duration refers to a particular time interval. In some embodiments, a sub-frame may have a duration of 1 ms, regardless of the numerology or number of OFDM symbols in the sub-frame. In other embodiments, e.g. as in the embodiment illustrated in FIG. 3, a sub-frame may have different durations in different numerologies. In some embodiments, a low latency interval duration may be equal to one transmission time unit (TTU), or encompass multiple TTUs, depending upon the implementation. In some embodiments, a low latency interval duration may be equal to one slot, or encompass multiple slots, depending upon the implementation.

Therefore, although "low latency interval" is used, it may be interchangeably called a "low latency sub-frame" in implementations in which a low latency interval has the same duration as a sub-frame. Also, "low latency interval" may be interchangeably called a "low latency TTU" in implementations in which a low latency interval has the same duration as a TTU. Also, a TTU is sometimes referred to as a transmission time interval (TTI). Also, "low latency interval" may be interchangeably called a "low latency slot", "slot", or "mini-slot" in implementations in which a low latency interval has the same duration as a slot or mini-slot. A mini-slot comprises a number of symbols that is less than the number of symbols in a slot for a given numerology.

In some examples described later, a URLLC slot is discussed, but more generally a URLLC slot may be replaced with a low latency interval. Also, it is contemplated that latency tolerant traffic may optionally use the same interval duration as low latency traffic.

The resources used for latency tolerant communications may also be partitioned into intervals. An interval used for latency tolerant communication will be referred to as a "latency tolerant interval". An example of a latency tolerant interval is shown at 144. A latency tolerant interval is the smallest interval of time that may be scheduled or allocated for a data transmission to/from a latency tolerant UE.

A latency tolerant interval may be interchangeably called a "latency tolerant slot" in embodiments in which the time duration of a latency tolerant interval is equal to a slot duration. A latency tolerant interval may be interchangeably called a "latency tolerant sub-frame" in embodiments in which the time duration of a latency tolerant interval is equal to a sub-frame duration. A latency tolerant interval may be interchangeably called a "latency tolerant TTU" in embodiments in which the time duration of a latency tolerant interval is equal to a TTU. A latency tolerant interval may be interchangeably called a latency tolerant scheduling interval if latency tolerant data is being scheduled for transmission on the latency tolerant interval.

In some examples described later, an eMBB slot or eMBB interval is discussed, but more generally eMBB slot and eMBB interval may be replaced with a latency tolerant interval.

As shown in FIG. 1, a low latency interval has a time duration that is shorter than a latency tolerant interval. By transmitting low latency data in low latency intervals of a shorter duration, the latency of the data transmissions to/from the low latency UEs may be reduced.

In some embodiments, different subcarrier spacings may be used for different transmissions. For example, the subcarrier spacing in the latency tolerant region 128 may be different from the subcarrier spacing in the coexistence region 130. In some embodiments, two numerologies with different sub-carrier spacings may be used. Numerology may refer to subcarrier spacing and/or cyclic prefix (CP), or additionally other physical layer parameters like TTU (or TTI), number of symbols per TTU, symbol duration, symbol useful part duration, carrier bandwidth, fast Fourier Transform (FFT) sizes, etc. A first traffic type, like eMBB, and a second traffic type, like URLLC, may use a scalable numerology. In some embodiments, eMBB and URLLC may use a different numerology when they coexist in same time-frequency resources under a common carrier. eMBB and URLLC may or may not be assigned a separate sub-band. The numerology switching may occur in same sub-band, for example, the eMBB transmission band, e.g. in the latency tolerant region 128.

Figure 2:
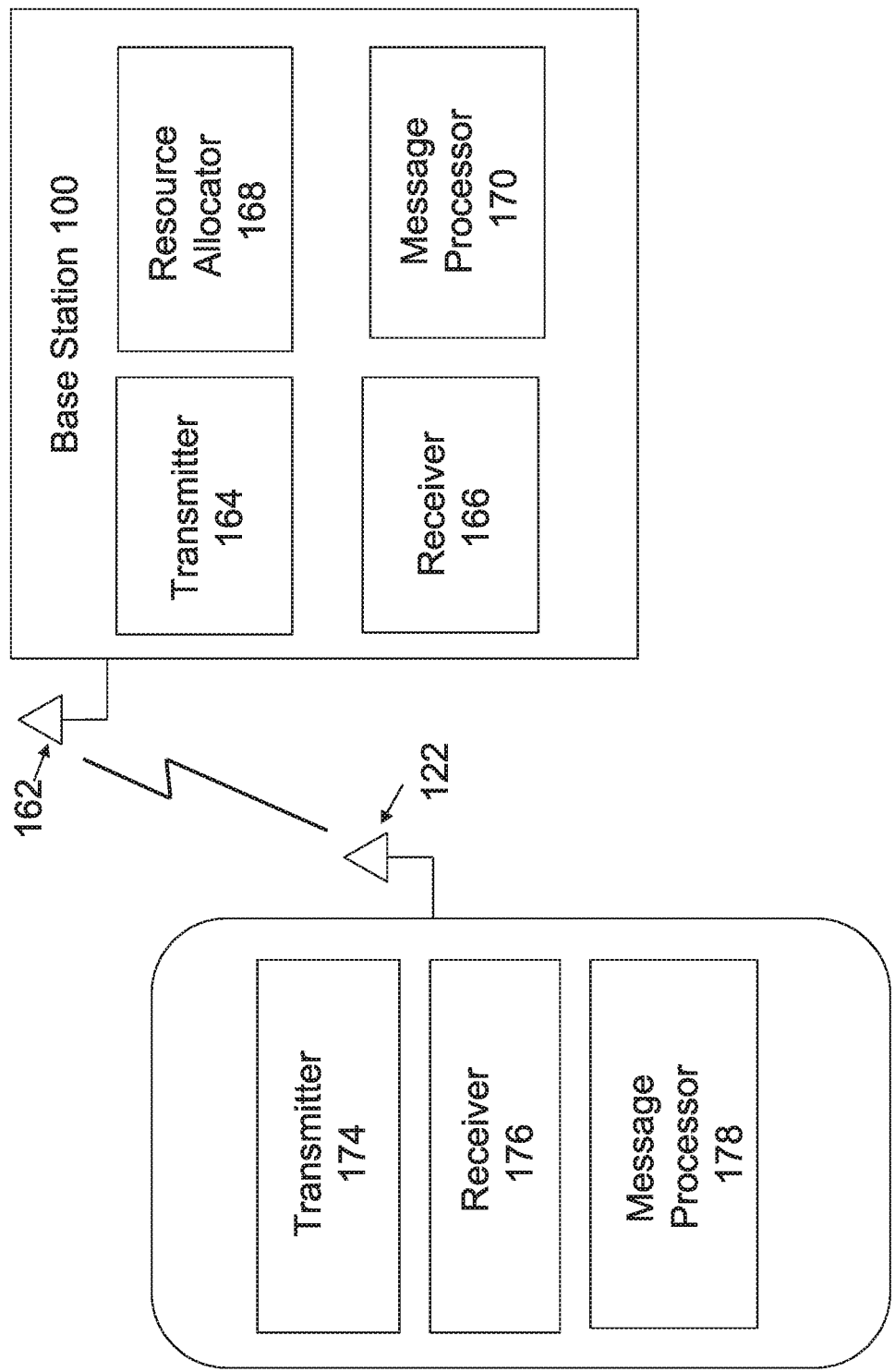
FIG. 2 is a block diagram of a base station and a UE, according to one embodiment.

FIG. 2 is a block diagram showing the base station 100 and a UE of FIG. 1 in more detail. The UE may be UE 102a, 102b, 104a, or 104b. The word "base station" encompasses any device that wirelessly transmits/receives data from wireless devices, such as UEs 102a, 102b, 104a, and 104b. The base station 100 is an example of a network access device that provides network access to UEs 102a, 102b, 104a, and 104b. The base station therefore encompasses access devices, including: a transmit and receive point, a base transceiver station, a radio base station, a radio access node, a network node, a transmit/receive node, a Node B, an evolved Node B (eNode B or eNB), a gNB, which is sometimes called a "gigabit" Node B, a relay station, a remote radio head, or an Access Point (AP). Also, in some embodiments, the functions of the base station 100 may be distributed. For example, some of the modules of the base station 100 may be located remote from the equipment housing the antennas of the base station 100, and may be coupled to the equipment housing the antennas over a communication link (not shown). Therefore, in some embodiments, the term base station 100 may also refer to modules on the network side that perform operations, such as scheduling and message generation, and that are not necessarily part of the equipment housing the antennas of the base station 100. The modules may also be coupled to other base stations. In some embodiments, the base station 100 may actually be a plurality of base stations that are operating together to serve the UEs, e.g. through coordinated multipoint transmissions.

Similarly, UEs 102a, 102b, 104a, and 104b are also meant to be illustrative of other end user devices that may be configured as disclosed herein for uplink/downlink communications with the base station 100. Examples of other user devices include wireless transmit/receive units (WTRUs), mobile stations, wireless devices, fixed or mobile subscriber units, mobile telephones, personal digital assistants (PDAs), smart phones, laptops, computers, wireless sensors, and consumer electronics devices.

The base station 100 includes a transmitter 164 and a receiver 166 coupled to one or more antennas 162. Only one antenna 162 is illustrated. The transmitter 164 and the receiver 166 may be integrated as a transceiver. The transmitter 164 may implement some or all of the downlink physical layer operations of the base station 100, and the receiver 166 may implement some or all of the uplink physical layer operations of the base station 100. The base station 100 further includes a message processor 170 for processing uplink transmissions from the UEs. The message processor 170 may be part of the receiver 166. The message processor 170 may include a decoder (not shown) for decoding uplink transmissions from the UEs. The base station 100 further includes a resource allocator 168, which may perform operations such as: generating scheduling grants; and/or partitioning the resources into coexistence, latency tolerant only, and/or low latency only regions; and/or configuring subcarrier spacing; and/or puncturing/postponing latency tolerant data transmissions to UEs 104a or 104b; and/or scheduling transmissions having symbol and/or slot alignment.

The message processor 170, the resource allocator 168, and/or any signal processing components of the transmitter 164 and receiver 166, may be implemented in the form of circuitry configured to perform the functions of the message processor 170, the resource allocator 168, and/or the transmitter 164/receiver 166. In some implementations the circuitry includes a memory and one or more processors that execute instructions stored in the memory that cause the one or more processors to perform the operations of the message processor 170, the resource allocator 168, and/or the transmitter 164/receiver 166. Alternatively, the message processor 170, the resource allocator 168, and/or any signal processing components of the transmitter 164 and receiver 166, may be implemented using dedicated integrated circuitry, such as an application specific integrated circuit (ASIC), a graphics processing unit (GPU), or a programmed field programmable gate array (FPGA) for performing the operations of the message processor 170, the resource allocator 168, and/or the transmitter 164/receiver 166. In yet other implementations, the functionality of the base station 100 described herein may be fully or partially implemented in software or modules stored in the memory and executed by the one or more processors.

The UE illustrated in FIG. 2 also includes a transmitter 174 and a receiver 176 coupled to one or more antennas 122. Only one antenna 122 is illustrated. The transmitter 174 and the receiver 176 may be integrated as a transceiver. The transmitter 174 may implement some or all of the uplink physical layer operations of the UE, and the receiver 176 may implement some or all of the downlink physical layer operations of the UE. The UE further includes a message processor 178 for generating messages to be transmitted in grant-based and/or grant-free uplink transmissions, and for processing received messages. Generating an uplink message may include performing uplink physical layer operations: receiving data, and then encoding and modulating the data so that it can be transmitted by the transmitter 174 in the transmission. Processing a received message may include decoding and demodulating the data received in the downlink transmission message. For example, the message processor 178 may include a decoder (not shown) for decoding a downlink transmission message from the base station 100. In some embodiments, the message processor 178 processes update information present in the downlink transmission (e.g. in the form of an indicator) in order to determine if there is particular data (e.g. punctured data or URLLC data) in the downlink transmission message that is not to be considered during decoding.

The message processor 178, and/or any signal processing components of the transmitter 174 and receiver 176, may be implemented in the form of circuitry configured to perform the functions of the message processor 178, the transmitter 174 and/or receiver 176. In some implementations the circuitry includes a memory and one or more processors that execute instructions stored in the memory that cause the one or more processors to perform the operations of the message processor 178, and/or the transmitter 174/receiver 176. Alternatively, message processor 178, and/or any signal processing components of the transmitter 174 and receiver 176, may be implemented using dedicated integrated circuitry, such as an ASIC, a GPU, or an FPGA for performing the operations of the message processor 178, and/or the transmitter 174/receiver 176. In yet other implementations, the functionality of the UE described herein may be fully or partially implemented in software or modules stored in the memory and executed by the one or more processors.

In some embodiments, communications between the UEs and the base station 100 use time division duplex (TDD) frame structures. Therefore, TDD frame structures are described in some embodiments below. However, a similar approach could be applied using frequency division duplex (FDD) frame structures instead.

Figure 3:
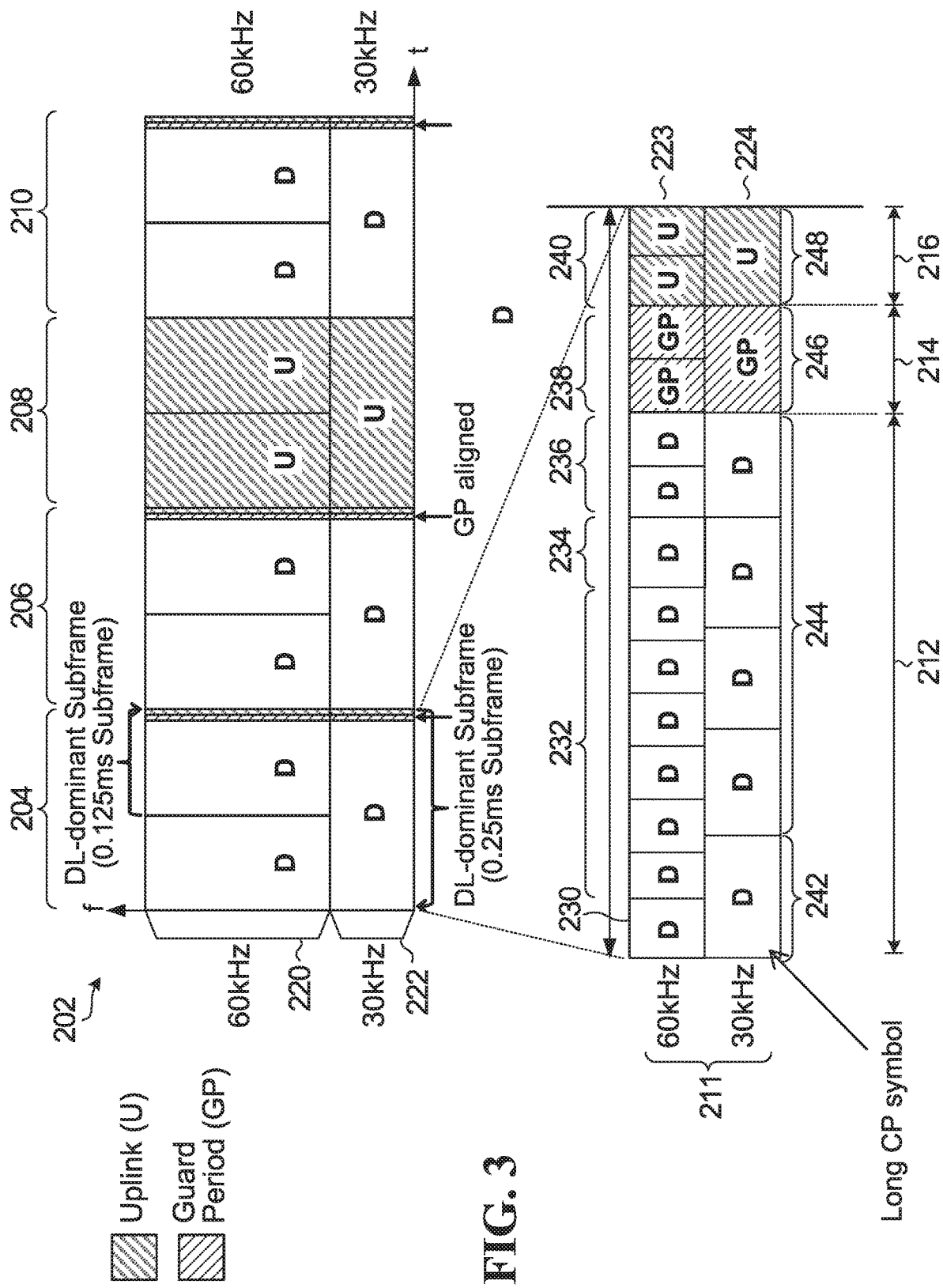
FIG. 3 illustrates one example of a time division duplex (TDD) frame structure.

In a TDD frame structure, each sub-frame may have a downlink segment, an uplink segment, and a guard period separating the downlink segment from the uplink segment. FIG. 3 illustrates one example of a TDD frame structure 202. The frame structure 202 is composed of four 30 kHz sub-band sub-frames 204, 206, 208, and 210. In FIG. 3, a sub-frame is illustrated as having a duration of 0.25 ms in the 30 kHz sub-band and 0.125 ms in the 60 kHz sub-band, but this is only an example. In other embodiments, a sub-frame may have a duration of 1 ms, regardless of the sub-band, numerology, or number of OFDM symbols in the sub-frame. Sub-band may be alternatively referred to as bandwidth part or bandwidth portion within a carrier bandwidth.

A sub-frame may be downlink dominant or uplink dominant. A downlink dominant sub-frame is a sub-frame in which more resources are allocated for downlink traffic compared to uplink traffic. An uplink dominant sub-frame is a sub-frame in which more resources are allocated for uplink traffic compared to downlink traffic.

In some embodiments, the time duplex communications are transmitted in two or more frequency sub-bands, each operating with a respective different sub-carrier spacing. In the example illustrated in FIG. 3, two frequency sub-bands 220 and 222 are shown operating with different sub-carrier spacings. Sub-band 220 operates with a 60 kHz sub-carrier spacing, and sub-band 222 operates with a 30 kHz sub-carrier spacing. Different sub-carrier spacings may be used. For example, two numerologies with different sub-carrier spacings may be chosen from a set of scalable numerologies having sub-carrier spacings that differ by a factor of $2^m$, where m is an integer. Some other examples of scalable numerologies include 15 kHz and 30 kHz sub-carrier spacings, and 15 kHz and 60 kHz sub-carrier spacings. As mentioned earlier, in some embodiments, numerology refers to subcarrier spacing and/or cyclic prefix (CP), or additionally other parameters TTU (or TTI), number of symbols per TTU (or TTI), symbol duration, symbol useful part duration, carrier bandwidth, FFT sizes, etc.

A self-contained downlink dominated sub-frame structure is shown at 211 and includes downlink segment 212, guard period 214 and uplink segment 216. OFDM symbols for data transmitted in the 60 kHz band have a time duration that is half that of OFDM symbols for data in the 30 kHz band. The contents of the sub-frame in the 60 kHz sub-band are indicated at 223 and include 14 OFDM symbol durations: OFDM symbols 230, 232, 234, and 236, followed by a guard period of two OFDM symbol durations 238, followed by two uplink symbols 240. The contents of the sub-frame in the 30 kHz sub-band are indicated at 224 and include 7 OFDM symbol durations: OFDM symbols 242 and 244, followed by a guard period of one OFDM symbol duration 246, followed by one uplink symbol 248. This design is implementation specific. In this design, the TDD structure of the contents in the two sub-bands is aligned in the sense that the uplink transmissions on one sub-band (e.g. the 60 kHz sub-band) are aligned with uplink transmissions in another sub-band (e.g. the 30 kHz sub-band), and a similar alignment is present for the downlink transmission period and the guard period. One or more symbols, in this example the symbols 230 and 234, have a longer cyclic prefix than the remaining symbols 232 and 236 of their sub-bands. Similarly, the symbol 242 has a longer cyclic prefix than the remaining symbols 244 of its sub-band. The different cyclic prefix durations may be used to ensure the desired alignment of the guard period and the uplink and downlink transmissions.

As noted above, the embodiments are also applicable to a FDD frame structure. In a FDD frame structure, all the symbols are transmitted in the same direction, e.g. 242, 244, 246, 248 are all downlink or uplink.

In FIG. 3, the overall frame structure is 1 ms in duration, and the sub-frames are 0.25 ms in duration in the 30 kHz band. In the 60 kHz band, each sub-frame is 0.125 ms. As mentioned above, this is only an example. A sub-frame may have a duration of 1 ms instead, regardless of numerology, in which case the overall frame structure in FIG. 3 would instead be 4 ms. The frame structure 220 for the 60 kHz band includes symbols 230 and 232 in the first half, and includes symbols 234, 236, 238, and 240 in the second half.

For each TDD frame, scheduling information may be sent by resource allocator 168 of the base station 100. The scheduling information in respect of latency tolerant downlink traffic is sent based on a predefined scheduling interval, which may be equal to the duration of one TDD frame. In addition, for each sub-frame, scheduling information is transmitted in respect of low latency downlink traffic based on a scheduling interval equal to the duration of one sub-frame. In the example illustrated in FIG. 3, the scheduling information for the latency tolerant traffic is sent at the beginning of the TDD scheduling interval, and is based on a scheduling interval of 0.5 ms or less, corresponding to the duration of the downlink portion of the frame structure. The scheduling information for the low latency traffic is sent at the beginning of each sub-frame, and is based on a 0.25 ms scheduling interval. The scheduling information indicates resources that are allocated for latency tolerant traffic or low latency traffic in the respective scheduling interval.

In some embodiments, at some time after the first sub-frame, update information is transmitted that updates the scheduling information in respect of the latency tolerant downlink traffic in a sub-frame other than the first sub-frame. For example, the update information may be an indicator indicating that scheduled latency tolerant data for particular time-frequency resources has been punctured. The resources freed from not transmitting the punctured latency tolerant data are used to send low latency data instead, which may also be indicated in the indication. Examples are presented below.

Figure 4:
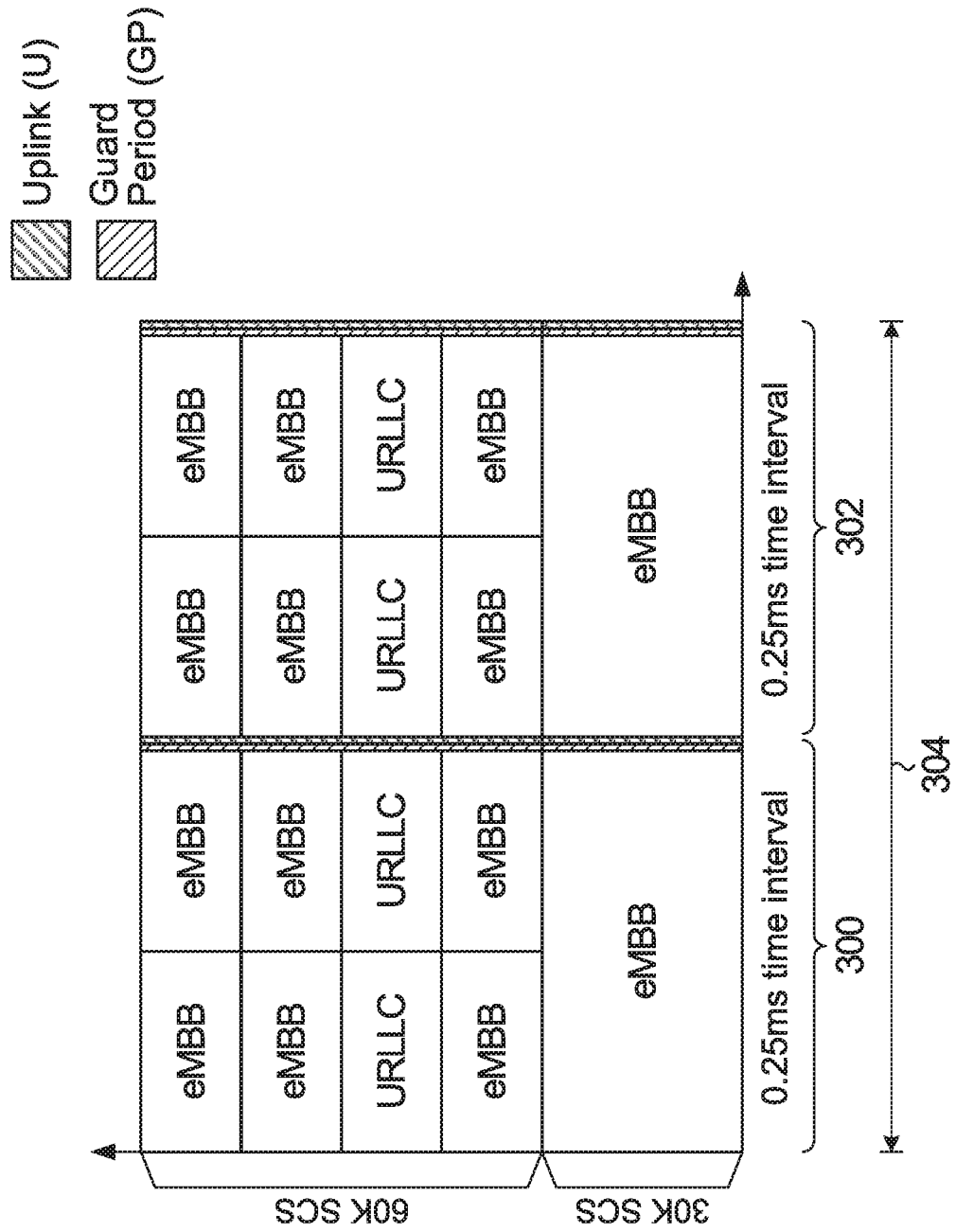
FIGS. 4 to 7 illustrate examples of puncturing latency tolerant data.

One example is depicted in FIG. 4. In this and some other examples below, the latency tolerant traffic will be referred to as eMBB traffic, and the low latency traffic will be referred to as URLLC traffic, but more generally, for any of these embodiments, other traffic types can be used instead. For example, the eMBB traffic may instead be replaced with traffic of a first type, and the URLLC traffic may instead be replaced with traffic of a second type. The traffic of the first type and the traffic of the second type may not necessarily have different latency requirements. In other embodiments, the traffic of the first type may be latency tolerant data, and the traffic of the second type may be low latency data.

Figure 5:
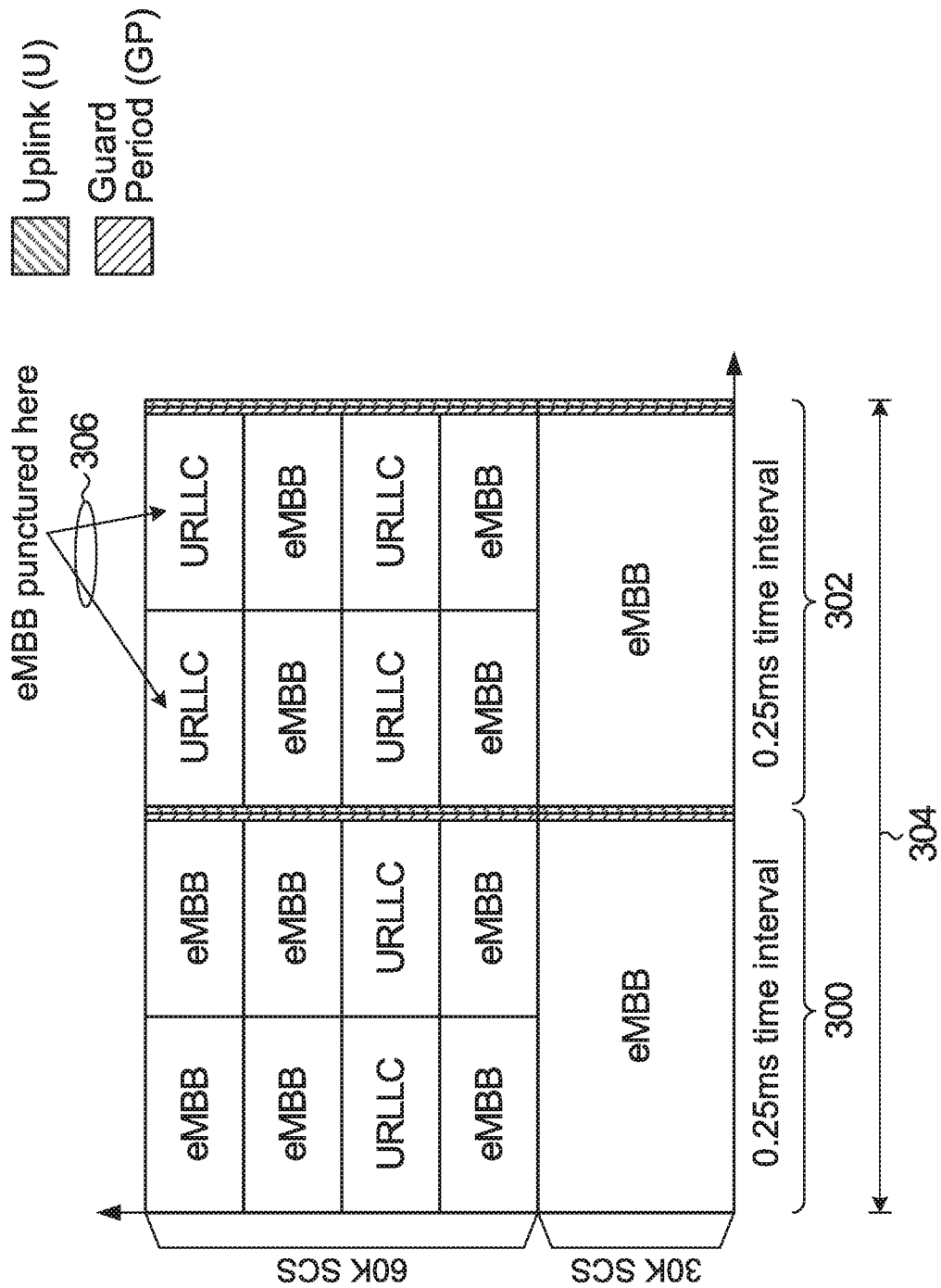

In FIG. 4, the eMBB scheduling interval is 0.5 ms, and spans two 0.25 ms scheduling intervals of URLLC traffic. The eMBB scheduling interval may consist of an aggregation of smaller units, where each smaller unit could be a scheduling interval for URLLC traffic, or more generally each smaller unit comprises a group of symbols for a given numerology. At the start of the overall frame structure 304, scheduling information is transmitted that allocates time frequency resources to eMBB traffic as indicated in FIG. 4. The scheduling information may be transmitted via a dynamic control channel, such as the physical downlink control channel (PDCCH) in long-term evolution (LTE), or the equivalent. Scheduling information is also sent for URLLC traffic in the first sub-frame 300. The sub-frame durations in FIG. 4 are shown as 0.25 ms, but this is only an example. As another example, a sub-frame duration may be 1 ms. At some point after the first sub-frame 300, update information is sent that updates the scheduling information, and this results in one or more time-frequency resources that were initially scheduled for eMBB traffic in the second sub-frame (more generally in a sub-frame other than the first sub-frame) no longer being scheduled for eMBB traffic. This implies that for a duration after the latency tolerant data is scheduled, the UE receiving latency tolerant data might not expect any pre-emption or puncturing of its data. Control signaling containing update information may be signaled to the UE after the duration elapses. This duration can be configured by the network, either in a UE-specific or a group-common manner. Control signaling containing update information can be UE specific or group-common and is transmitted/monitored by the UE after the aforementioned duration elapses at a configured search space. Common indication can be transmitted in group-common DCI such as in common PDCCH, or PCFICH or PHICH. The resulting allocation is depicted in FIG. 5, which shows that eMBB traffic has been punctured at time frequency resources 306. The update information can be communicated in any known manner, and indicates to the UE with eMBB traffic that some or all of the time frequency resources originally scheduled for eMBB traffic have been punctured. As a result, the UE with eMBB traffic can decode its received transmission without considering the punctured regions, thereby potentially reducing decoding errors.

Figure 6:
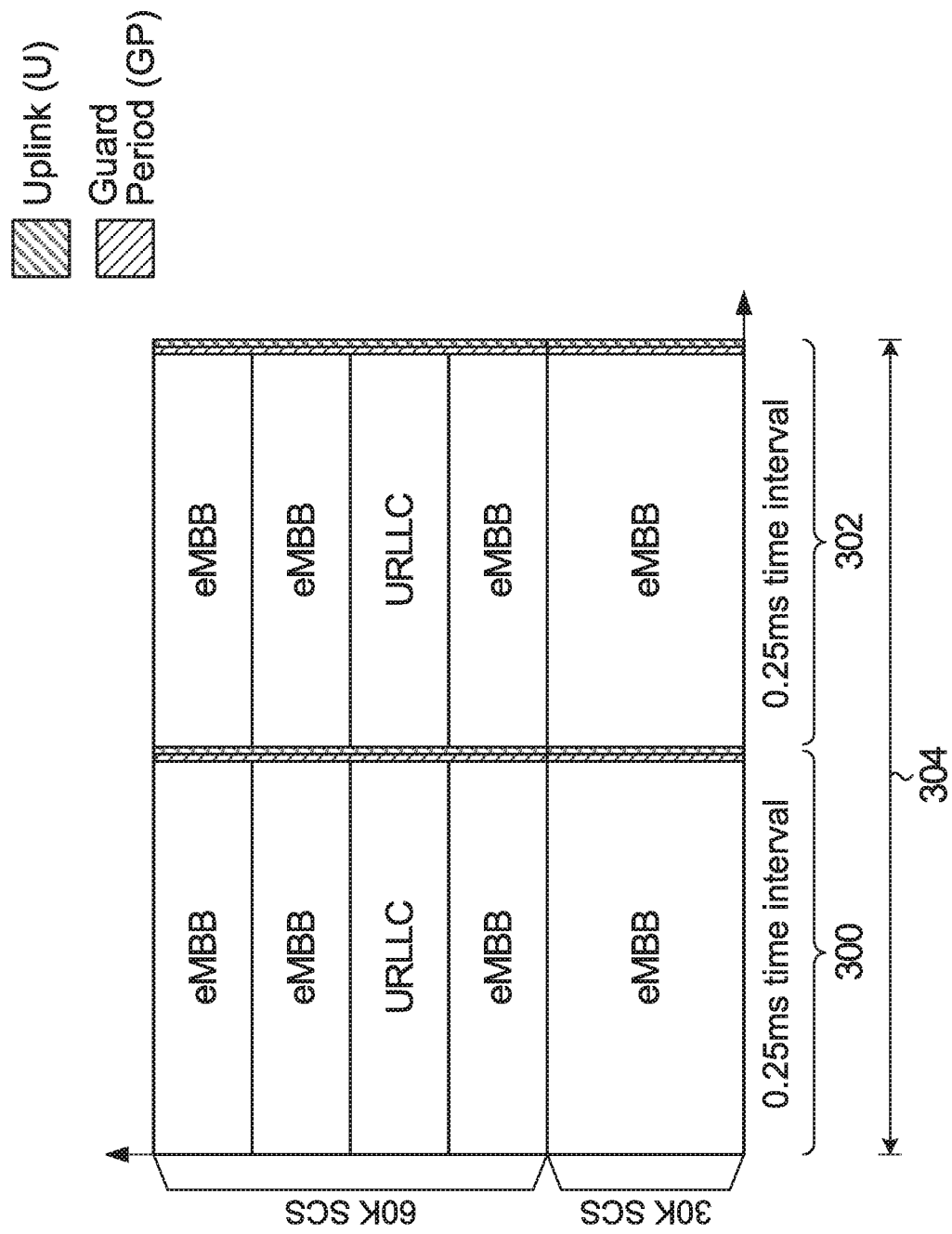
Figure 7:
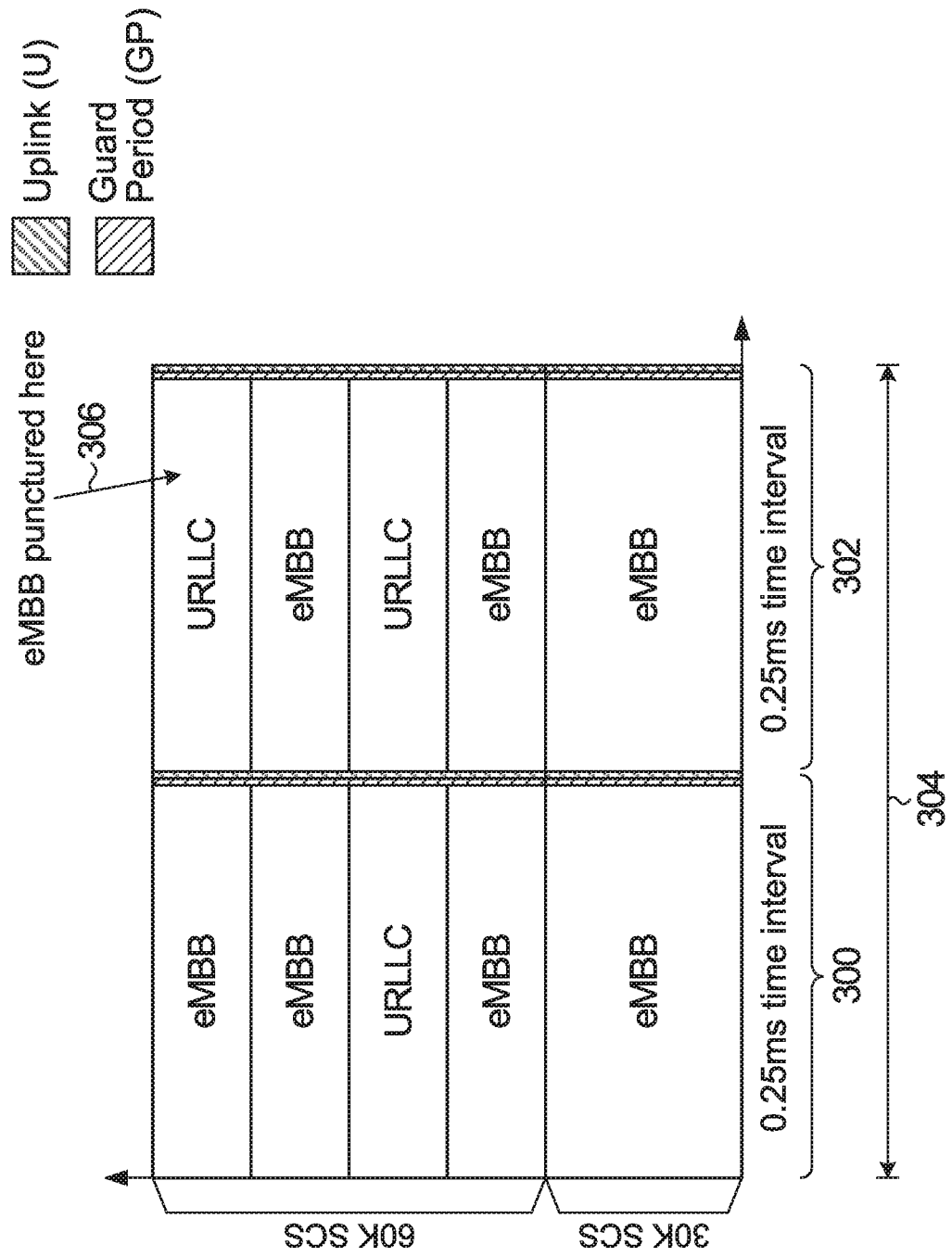

FIGS. 6 and 7 illustrate an alternative example in which the scheduling granularity for the 60 kHz band is different. With reference to FIG. 6, at the start of the overall frame structure 304, scheduling information is transmitted that allocates time frequency resources to eMBB traffic as indicated in FIG. 6. In addition, scheduling information is sent for URLLC traffic in the first sub-frame 300. At some point after the first sub-frame 300, update information is sent that updates the scheduling information, and this results in one or more time-frequency resources that were initially scheduled for eMBB traffic in the second sub-frame no longer being scheduled for eMBB traffic. The resulting allocation is depicted in FIG. 7, which shows that eMBB traffic has been punctured at time frequency resources 306. The update information can be communicated in any known manner, and indicates to the UE with eMBB traffic that some or all of the time frequency resources originally scheduled for eMBB traffic have been punctured. As a result, the UE with eMBB traffic can decode its received transmission without considering the punctured regions, thereby potentially reducing decoding errors.

Note that in FIGS. 4 to 7, the URLLC transmission interval is shown as 0.25 ms. More generally, the URLLC transmission interval can be less than 0.25 ms, i.e., the interval may correspond to one or a few symbols of a given numerology such as for subcarrier spacing 60 kHz.

For the embodiments when the transmission interval of low latency data is smaller than latency tolerant data, latency tolerant data transmission is shown to span a duration which consists of more than one downlink and more than one uplink portion for TDD systems. Alternatively, a latency tolerant data transmission can span a duration which consists of downlink portion(s) or sub-frames only, or more than one downlink portion but one uplink portion, or more generally any duration where the number of downlink portions can be more, equal or less than the number of uplink portions.

Figure 8:
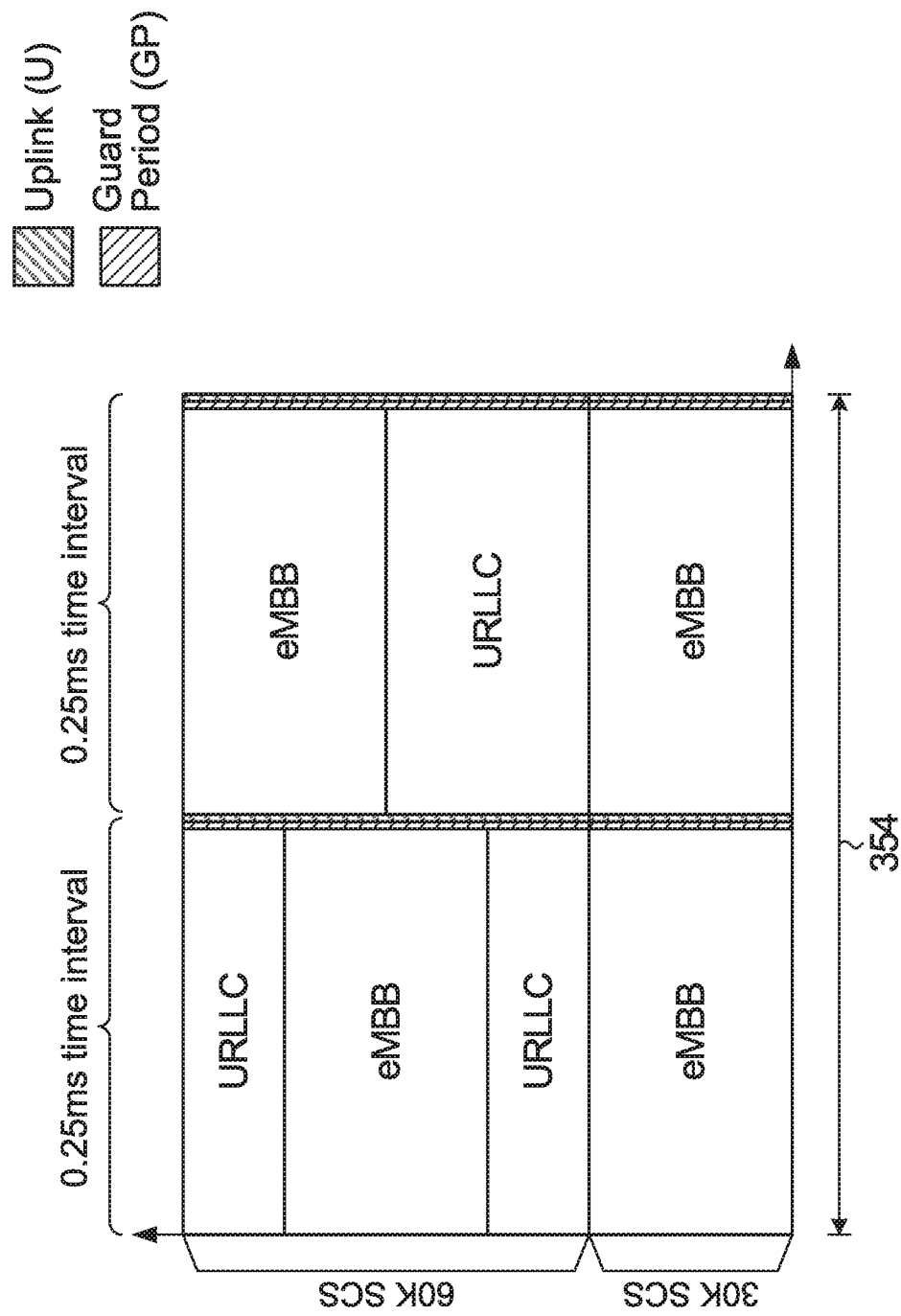
FIG. 8 illustrates an example in which puncturing is not needed because the scheduling interval for low latency and latency tolerant data in the coexistence region is the same.

Referring to FIG. 8, in an alternative example a frame structure 354 has a duration of 0.5 ms, which corresponds to one scheduling interval in the 30 kHz sub-band that is reserved for eMBB traffic. In the 60 kHz sub-band, the scheduling interval for both URLLC traffic and eMBB traffic is 0.25 ms. Here, scheduling interval of 0.25 ms implies more generally the transmission spans the duration of downlink portion(s) within 0.25 ms. It is contemplated that the scheduling interval in the sub-band reserved for eMBB traffic could be any integer multiple of the scheduling interval carrying both types of traffic. It is further contemplated that the scheduling interval for the sub-band that carries both types of traffic could be any suitable value that accommodates the latency tolerance of the URLLC traffic. In this embodiment, puncturing of the eMBB traffic is not needed because the scheduling interval for both traffic types (eMBB and URLLC) in the coexistence region is the same. Therefore, the UE with eMBB traffic does not need to monitor the channel for update information or puncturing information, because URLLC traffic in the second scheduling interval can be accommodated by dynamic scheduling of the eMBB traffic in that scheduling interval.

Figure 9:
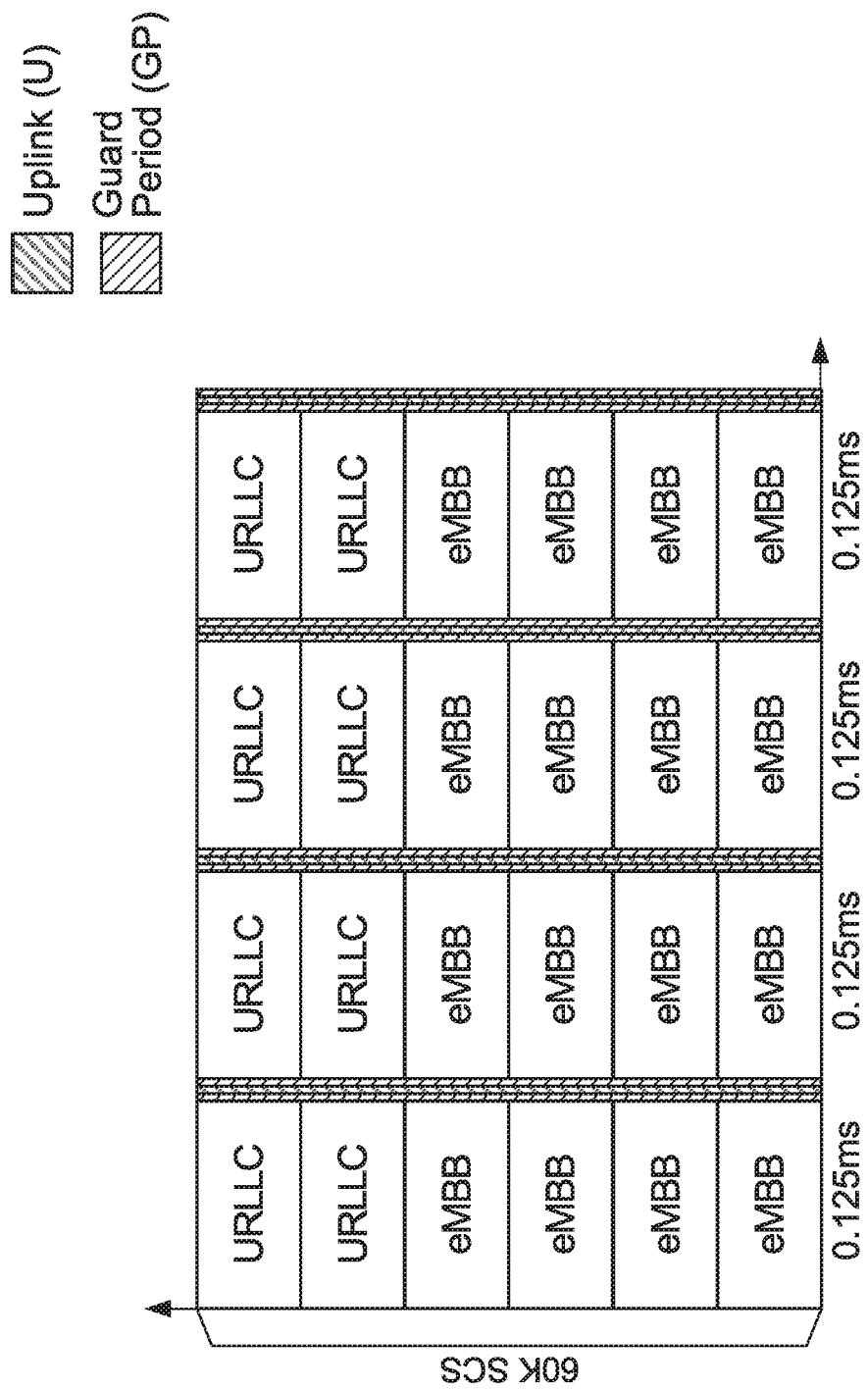
FIGS. 9 and 10 illustrate another example of puncturing latency tolerant data.
Figure 10:
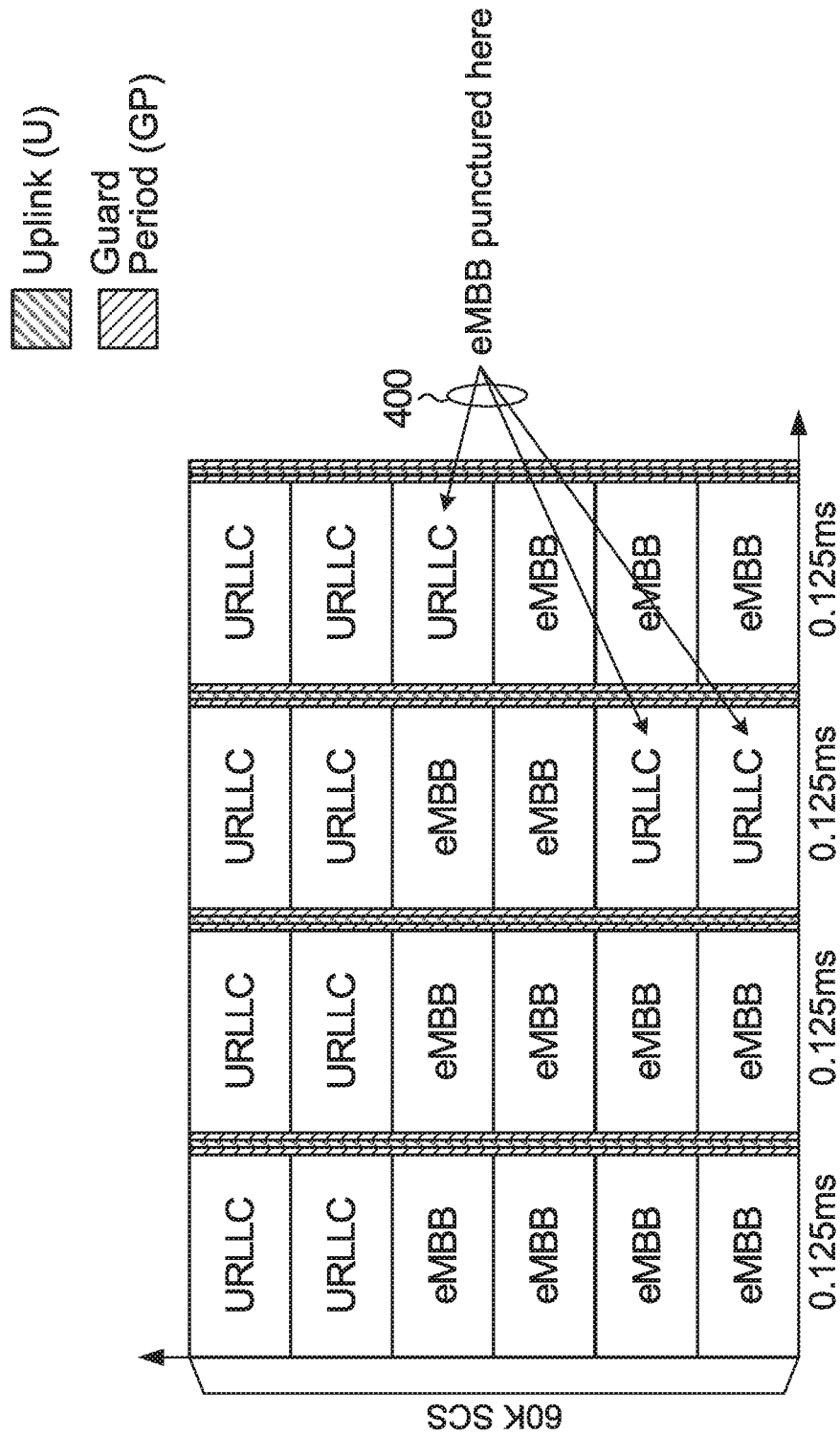

Another example is depicted in FIGS. 9 and 10. In FIG. 9, the eMBB scheduling interval is 0.5 ms, and spans four 0.125 ms scheduling intervals of URLLC traffic. Here, downlink scheduling interval implies more generally the transmission spans the duration of downlink portion(s) within the indicated interval. FIGS. 9 and 10 show before and after puncturing views of the scheduling of both eMBB and URLLC traffic. At some point after the first sub-frame, update information has been sent indicating that eMBB traffic is being punctured in time frequency regions 400. The indication can be sent as a common signal to at least the UEs whose transmission overlaps the region 400. Instead of third and fourth downlink portions with the 0.5 ms duration, second downlink portion could be punctured as well.

In some embodiments, eMBB and URLLC assignment does not change during their respective scheduling interval, unless eMBB data is punctured. Downlink signaling to update the eMBB scheduling may appear at the beginning of each subsequent sub-frame within the eMBB scheduling interval, starting from the second sub-frame.

In some embodiments, the update information is information specifically for the UEs with eMBB traffic indicating some of their time-frequency resources are punctured. This implies that update information can be sent to group of UEs. Alternatively, scheduling information for the UEs with URLLC traffic that conflicts with previous eMBB scheduling can function as the update information. Alternatively, control information at the beginning of the second sub-frame can be interpreted as update information. The control information can alternatively act as downlink control information in the embodiment described above with reference to FIG. 8, where the resources are allocated by dynamic scheduling instead of by puncturing.

For the examples illustrated in FIGS. 4-7, the update information may appear at the beginning of the second 0.25 ms interval in the 60K band. For the example illustrated in FIG. 9, the update information may appear at the beginning of the $2^{nd}$, $3^{rd}$, and $4^{th}$ 0.125 ms intervals. More generally, the update information can be transmitted at any time up until the end of the eMBB scheduling interval, as a collective indicator to notify any changes in eMBB transmission during $2^{nd}$ and subsequent sub-frames within the eMBB scheduling interval.

The downlink control information (DCI) that provides scheduling information to the UEs may indicate HARQ feedback timing and/or resources. In some embodiments, it may be possible that the UE is configured (by RRC signaling) to send HARQ feedback corresponding to a HARQ process or TB in an asynchronous or autonomous manner, or at a time and/or resource that can be different from the HARQ feedback timing indicated in DCI or pre-configured (i.e., a pre-set time after the DCI is received) for the UE. In some cases, the UE may choose to override the indicated HARQ timeline and send HARQ feedback before or after the indicated/configured timeline. For example, in the context of coexistence of latency tolerant and low latency transmission, if the UE receiving latency tolerant transmission identifies that a significant portion of the TB has been punctured, it may send a NACK early without waiting for the pre-configured/indicated timeline to arrive. In FIG. 10, if the UE identifies that a significant portion of its TB is punctured, either via puncturing indication or other mechanism, it may send a NACK in one of the uplink portions within the 0.5 ms duration. For example, if second downlink portion is punctured and the UE identifies that puncturing has occurred, the UE may choose to send a NACK in the immediate next uplink portion. Sending a NACK early may avoid resource wastage from transmission of the remaining part of the transport block (TB). In another embodiment, the UE may receive a TB comprising multiple code blocks (CBs) or code block groups (CBGs). The UE may receive and decode CBs or CBGs on the fly. i.e., decode CBs/CBGs as soon as they are received. If the UE fails to decode x CBs/CBGs of a TB, where x<N, N=total number of CB/CBGs configured in a TB, the UE may send a NACK before the configured/indicated HARQ feedback timeline of the TB. It may be useful, for example, if the UE is experiencing bad channel conditions, for the network to stop/postpone transmission of subsequent CBs of the TB based on early NACK. However, if the HARQ feedback is transmitted at a location and/or time that is different from the indicated or configured time and/or location, the network may not know which UE and/or which HARQ process ID the feedback refers to.

For the network to identify which UE and/or which HARQ process the feedback refers to, the UE may be configured with a location or time-frequency resource for HARQ feedback in uplink channel, which may or may not be shared with other UEs as well. In one example, the configured resource for transmitting feedback may be associated with received PDCCH signaling or Control resource set (CORESET) of received PDCCH signaling. The time-frequency resource for sending this HARQ feedback can be always reserved or can be made available after a configured duration of receiving the DCI containing downlink scheduling information or available with a configured periodicity or configured occasions for HARQ feedback transmission opportunities. For example, after every n symbols (for a given numerology) of receiving downlink scheduling information, the UE may have the opportunity to transmit HARQ feedback autonomously. The indicated/pre-configured timeline of sending HARQ feedback may or may not align with the transmission occasions of the autonomous HARQ feedback. The configured resource can be within the configured PUCCH resources or outside in different resources of the uplink channel. The time-frequency resource for sending this HARQ feedback can be configured solely for sending asynchronous/autonomous HARQ feedback or it can be used for sending both synchronous and asynchronous/autonomous HARQ feedback as well. Synchronous HARQ feedback refers to transmitting HARQ feedback at the indicated/configured timeline. In one embodiment, HARQ feedback transmitted in the configured resource may additionally include bits representing HARQ ID. Based on the HARQ ID, the network identifies that the UE is sending HARQ feedback for a given HARQ process or TB. The UE ID can be obtained from the mapped sequence or codes used for converting the bits of HARQ feedback to a physical signal. In other embodiments, the UE sends autonomous HARQ feedback, e.g., a NACK, which may not need to include a HARQ ID. The feedback may be masked with a sequence and/or codes representing UE ID, similar to conventional HARQ feedback multiplexing. The feedback is sent after a configured time of receiving PDCCH which corresponds to a HARQ process ID. Hence, based on the information of the last HARQ process scheduled to the UE, the network may identify that the feedback refers to the HARQ process scheduled to UE prior to transmission of the feedback. The configured PUCCH resources for the feedback may be associated with PDCCH type received or CORESET of PDCCH or may be dynamically indicated as part of PDCCH with or without a prior semi-static configuration. If multiple HARQ processes can be simultaneously scheduled to the UE, there may be multiple configured resources needed, and each configured resource may be used for feedback of one HARQ process. A pre-configured rule can be established for determining where feedback of each one of (potentially) simultaneously received HARQ processes can be sent. If multiple resources are not configured, then a HARQ ID may need to be inserted in order to avoid ambiguity. In another embodiment, there may be semi-static configuration of first and second resources associated for transmitting autonomous and synchronous HARQ feedback, respectively. Frequency resources of first and second resources can be the same or different. If the UE is configured for autonomous HARQ feedback and PDCCH is received, first and second resources may be activated or available for use in an uplink channel as a result of semi-static prior configuration and PDCCH reception. First and/or second resources can be semi-statically configured and/or dynamically indicated in the PDCCH.

Figure 11:
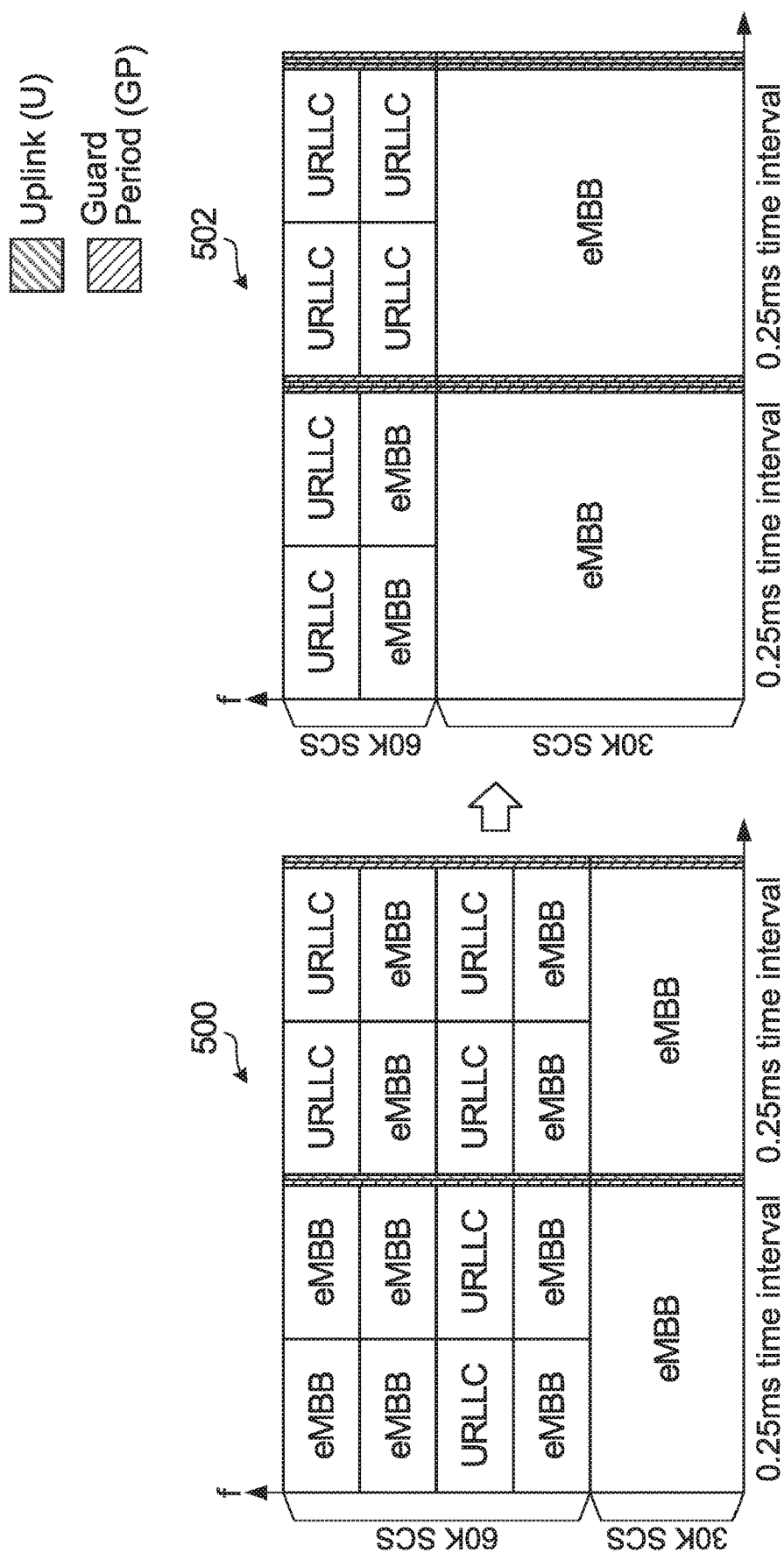
FIGS. 11 to 13 illustrate examples of dynamic sub-band bandwidth adjustment and/or a change in sub-carrier spacing assignments.
Figure 12:
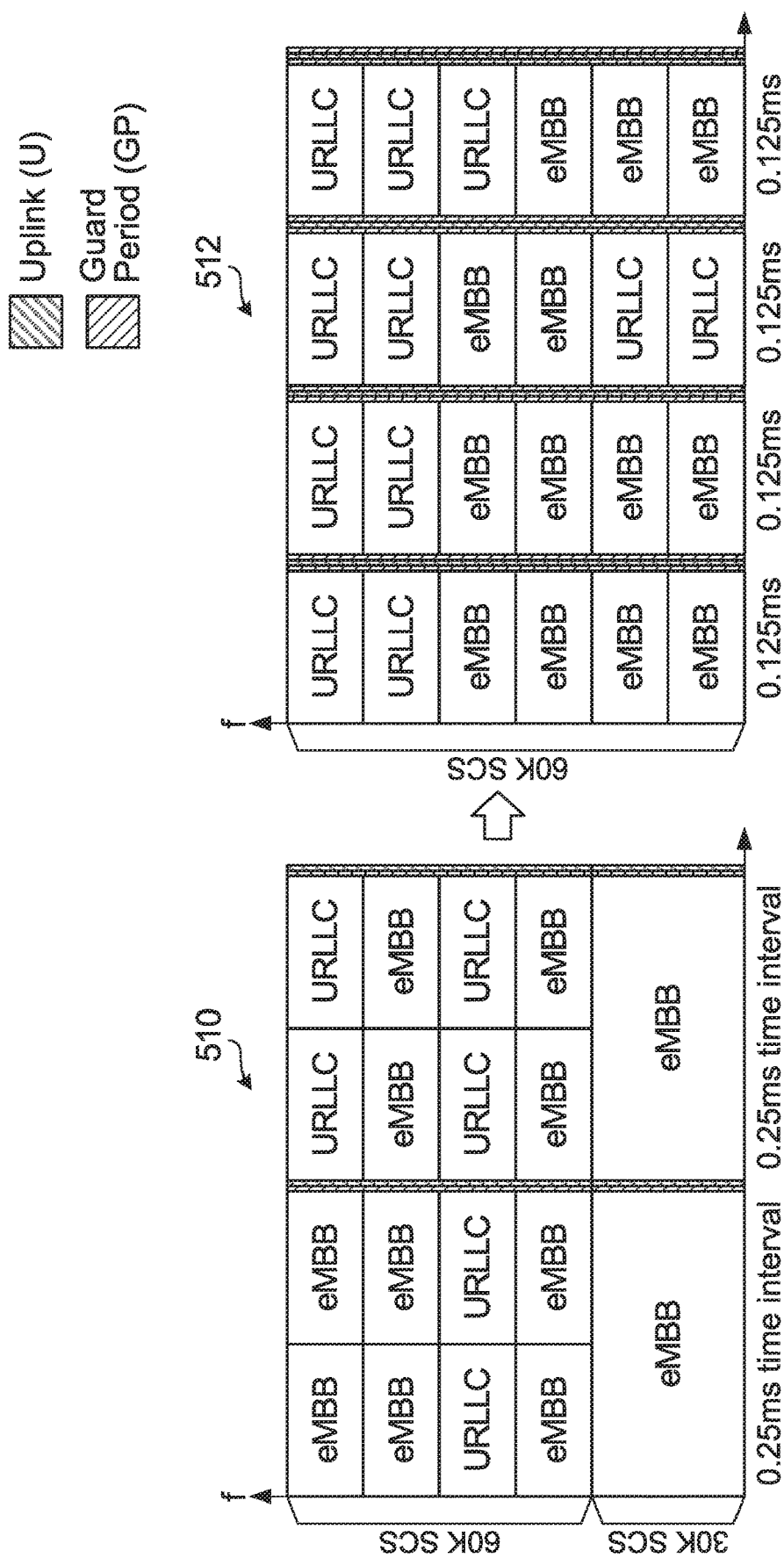

Some embodiments include dynamic sub-band bandwidth adjustment and/or a change in sub-carrier spacing assignments. This implies that resource assignment for transmission with different numerologies can be dynamically updated and indicated to the UEs. For example, FIG. 11 shows first and second time division duplex frames 500 and 502. After the first frame 500, the bandwidth of the 30 kHz and 60 kHz sub-bands is updated. This can be signalled to UEs, for example at the start of the second frame 502. The update can, for example, be based on traffic load for traffic of the URLLC and eMBB traffic types. Another example is depicted in FIG. 12 in which the entire bandwidth is switched to the sub-carrier spacing suitable for the URLLC traffic type (60 kHz in this example), with a self-contained interval (i.e. uplink, guard and downlink) of 0.125 ms. The eMBB traffic is still scheduled over the scheduling interval of 0.5 ms. A self-contained interval of 0.125 ms is only an example and in practice, it can be longer or shorter than 0.125 ms. For example, it can be 0.25 ms.

Figure 13:
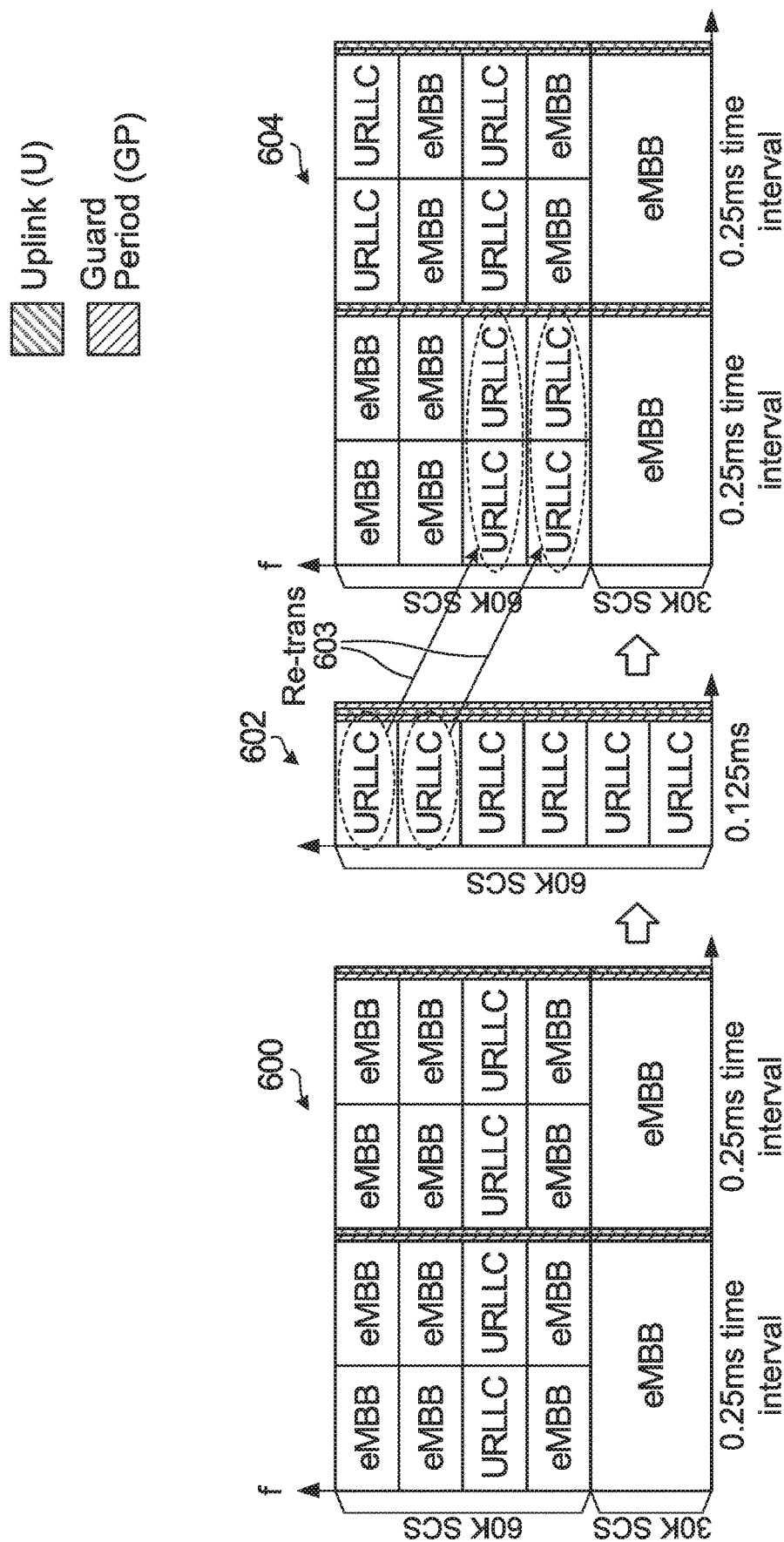

In some embodiments, frequency division multiplexing (FDM) and time division multiplexing (TDM) numerologies are combined. An example is depicted in FIG. 13. FIG. 13 shows a first TDD frame structure 600 similar to those described previously, where FDM is used to separate the 30 kHz numerology from the 60 kHz numerology. Following the initial frame 600 is a time period 602 allocated to URLLC traffic only, i.e. TDM is used to separate the 60 kHz numerology. Following that is another TDD frame structure 604 in which FDM is used to separate the 30 kHz numerology from the 60 kHz numerology. The durations shown for FDM and TDM coexistence in FIG. 13 are only examples, and in general, any configurable duration is possible, and TDM switching to/from FDM for may occur at the boundary of symbols, slots, or integer multiples of x ms, where x can be any positive value. In particular, x can be chosen from {0.125 ms, 0.25 ms, 0.5 ms, 1 ms}.

In some embodiments, for certain retransmissions. e.g. retransmissions to some UEs having outstanding unsuccessful transmissions, the scheduler adopts a lower modulation and coding scheme (MCS) for the retransmission for increased reliability. As an example, and still considering FIG. 13, the code rate for retransmission may be reduced such that the resources allocated for retransmissions within sub-frame 604 are twice those of a new transmission in time interval 602. This is shown at 603. The network may schedule a given number of repetitions for a packet, with different repetitions that use different MCS. As mentioned above, the $1^{st}$ retransmission may be automatically received, i.e., as a repetition following the initial transmission, in the same or different resources used for the initial transmission, and can be configured to have different MCS. Alternatively, subsequent transmissions following initial transmission of a TB are scheduled as well.

In any of the embodiments described above, various different methods can be employed for determining, for a given TDD frame, whether to transmit update information to update the scheduling information for latency tolerant traffic. This is because part of the DL transmission can be punctured or pre-empted due to the presence of low latency traffic. Update information may alternatively be called puncturing indication or pre-emption indication.

In some embodiments, determining whether to transmit the update information may involve: (a) receiving ACK/NACK information in respect of low latency traffic; and (b) using the received ACK/NACK information to determine whether to puncture resources scheduled for the latency tolerant traffic to allow for retransmission of a block of low latency traffic. The update information may identify the punctured resources.

In some embodiments, determining whether to transmit the update information may involve: (a) identifying the existence of new low latency data to send and/or determining an amount of low latency data to send; and (b) determining whether to puncture resources scheduled for latency tolerant data to allow for transmission of new low latency data based on the identified existence and/or the determined amount. The update information may indicate the punctured resources.

In some embodiments, determining whether to transmit the update information may involve: (a) receiving ACK/NACK information in respect of latency tolerant data; (b) based on the received ACK/NACK information, determining whether to re-assign some resources as between receivers of latency tolerant data. The update information may indicate the re-assignment of resources. The update information may be an indicator indicating which latency tolerant resources have been punctured. In one embodiment, the base station may puncture latency tolerant data to free up resources and instead use the freed resources in order to send low latency data. The latency tolerant UE that has its latency tolerant data punctured might not be sent an indicator indicating that the puncturing occurred. The indicator may only be sent if a NACK is subsequently received from the latency tolerant UE. The indicator may inform the latency tolerant UE of the resources on which the latency tolerant data has been punctured, which may assist the latency tolerant UE in decoding a retransmission of the latency tolerant data. With regard to (b), in some embodiments the indicator may include a scheduling grant, which may assign or re-assign resources for receivers of latency tolerant data.

In some embodiments, the update information may indicate where resources for latency tolerant data are to be punctured. Alternatively, the update information may indicate a re-assignment of resources as between different latency tolerant UEs.

In some embodiments, scheduling low latency traffic includes scheduling a block of low latency traffic during one of the sub-frames, and scheduling the same block of low latency traffic during another of the sub-frames with or without frequency hopping. When automatic retransmissions, i.e. repetitions, of low latency data are performed, then the repetitions may use frequency hopping. For example, with reference to FIG. 5, the two URLLC transmissions during sub-frame 300 may be repeated in the punctured locations 306, in which case frequency hopping would be present because resources 306 are different frequency resources from the URLLC transmissions in interval 300. However, the repetitions do not have to use frequency hopping.

The control resource set (CORESET) for monitoring update information or puncturing indication (PI) can be located within the same downlink portion that is impacted due to puncturing or in a different, e.g., subsequent, downlink portion. In particular, the CORESET for monitoring PI may be located in any symbol of the downlink portion of a TDD system. In particular, it can be in the first and/or second symbols of the downlink portion of self-contained interval. Alternatively, it can be located at the end of the downlink portion. Some downlink portions might not have any CORESET configured for PI.

If a TDD system is configured such that in a sub-frame, the downlink portion has duration Td, the guard period has duration Tg, and the uplink portion has duration Tu, and this assignment is repeated with a periodicity of $T=Td+Tg+Tu$ (i.e., T is the duration of the sub-frame), PI can be monitored with periodicity that can be an integer multiple of T in a CORESET configured in the downlink portion. Alternatively, PI can be monitored with a periodicity of K where $K<=Td$ within a downlink portion. That implies a UE can monitor at K occasions within each DL portion. In particular, $Td=nK$, i.e., there are n monitoring occasions within one contiguous downlink portion. T, Td, Tg, Tu, K can be time in ms or symbol/slots for a given numerology. If the network changes configuration, such as switching to FDD or changing the duration of downlink and/or guard and/or uplink portions, the periodicity may or may not be re-configured. If a pre-configured monitoring occasion of PI does not refer to a valid location due to re-configuration of TDD system or other system changes, the UE may skip monitoring PI or stop monitoring. The action may be RRC signaled. There can be association of monitoring periodicity with the active configuration of the self-contained TDD framework, i.e., a given configuration may have a certain number of symbols in DL and in UL. For example, if the DL portion is long. e.g., $Td=>X$ symbols for a given numerology, K can be a higher value m, and otherwise K can be a lower value n. In one example, the UE may choose to skip monitoring occasions based on sub-frame information (SFI) received, i.e., what portion of sub-frame is DL or UL.

In one embodiment, the update information sent to the UEs can be group-common control information. At least for TDD systems with frequent DL and UL switching, the group-common puncturing information may correspond to a DL resource which can be non-contiguous at least in time. For example, common puncturing information can be sent every nT which provides puncturing information for DL portions over a group of previous sub-frames (e.g., DL portions of previous n or (n−1) sub-frames) within the monitoring periodicity of the common puncturing information.

In some embodiments, orthogonal scheduling is used as between latency tolerant traffic and low latency traffic. This is the case for the examples described above. In other embodiments, non-orthogonal scheduling is used as between latency tolerant traffic and low latency traffic, such that for at least some time-frequency resources, latency tolerant traffic is superimposed with low latency traffic.

In some embodiments, a different longer scheduling interval is employed for latency tolerant traffic compared to a scheduling interval used for low latency traffic. Puncturing can be used to revise the allocation to latency tolerant traffic without waiting for the beginning of the next longer scheduling interval. In an alternative embodiment, the same scheduling interval is used for both latency tolerant and low latency traffic. When this is the case, rather than employing puncturing to update the allocation to low latency traffic within a comparatively long scheduling interval suitable for latency tolerant traffic, scheduling can be used to update the allocation to latency tolerant traffic within a scheduling interval suitable for low latency traffic. This approach can be used with the examples described. For example, referring back to FIG. 9, in an alternative embodiment a scheduling interval of 0.125 ms can be used for both URLLC traffic and eMBB traffic. New eMBB scheduling information is sent at the start of each 0.125 ms sub-frame. Thus, rather than puncturing time frequency resources, scheduling is used to allocate these to URLLC as opposed to eMBB. In some implementations featuring a common scheduling interval, some resources may be reserved for eMBB traffic. For example, the bottom two rows of the frame shown in FIG.

9 may be reserved for eMBB traffic, meaning only eMBB traffic can be scheduled using those resources, with remaining resources being available to be scheduled for eMBB or URLLC traffic. The other features described herein can be equally applied to embodiments with a common scheduling interval.

Figure 14:
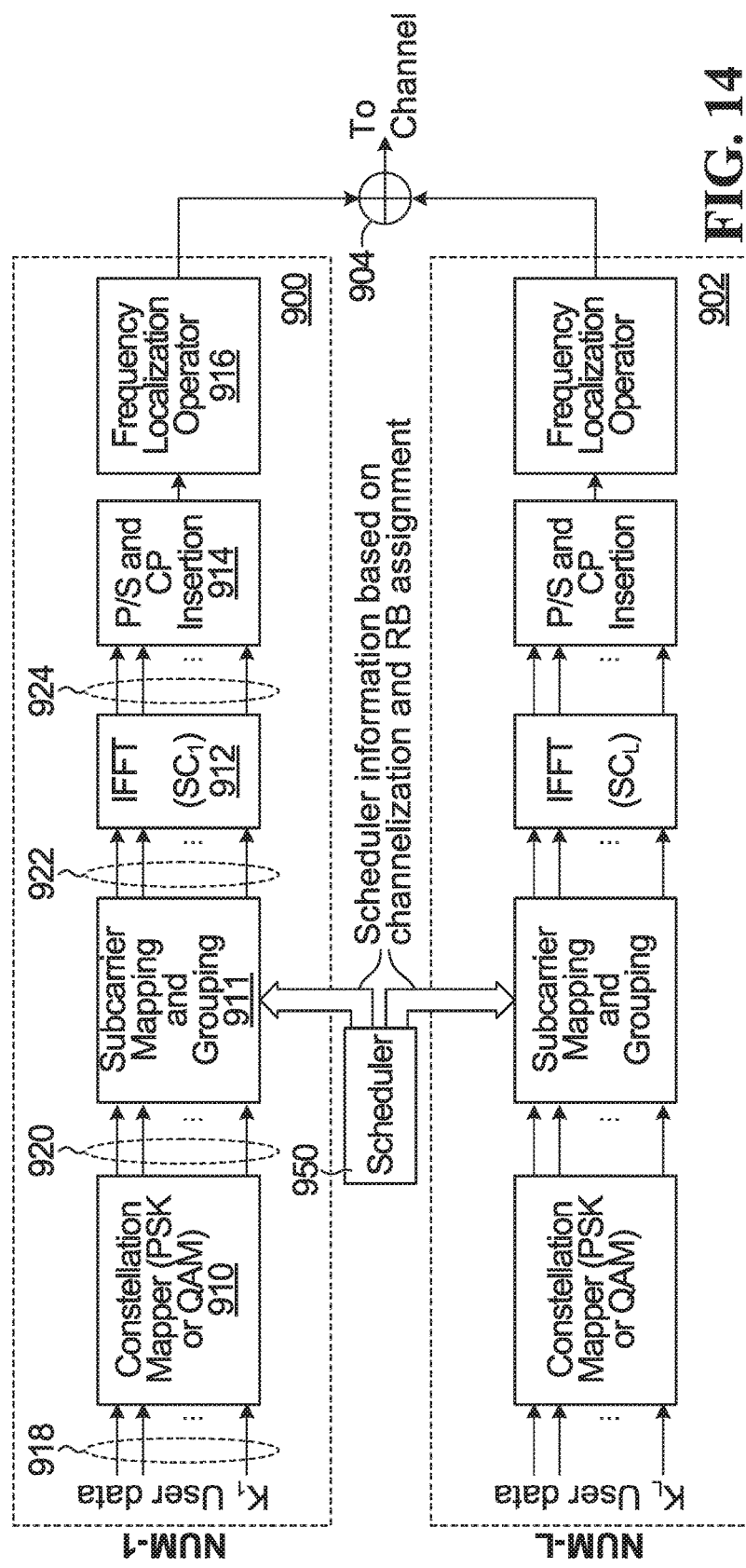
FIGS. 14 and 15 are a simplified diagram of part of a base station that can operate using multiple numerologies, according to one embodiment.
Figure 15:
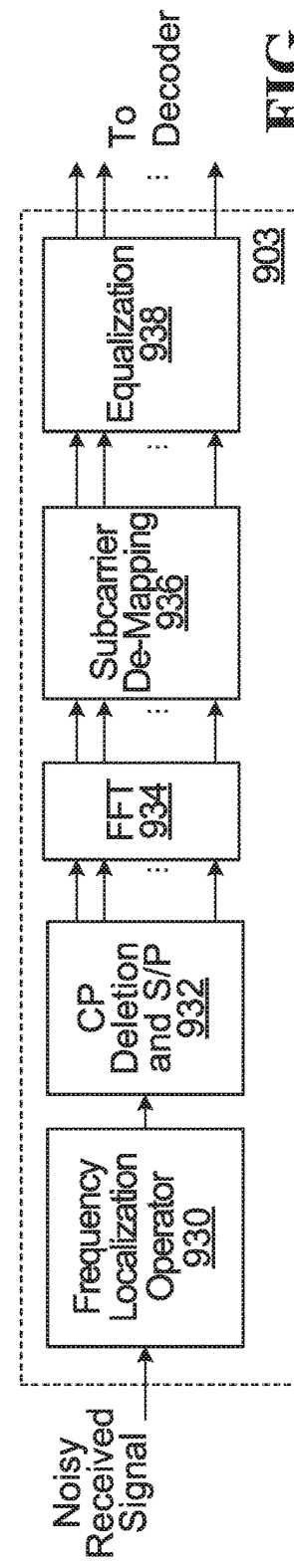

FIGS. 14 and 15 are a simplified diagram of part of a base station that can operate using multiple numerologies. In this example, there are L supported numerologies, where L>=2, each numerology operating over a respective sub-band with a respective sub-carrier spacing. However, the approaches described herein can also be applied when there is only a single numerology.

For each numerology, there is a respective transmit chain 900 and 902. FIG. 14 shows a simplified block diagram for the first and $L^{th}$ numerology. The other numerologies would have a similar functionality.

The transmit chain 900 for the first numerology includes: a constellation mapper 910; sub-carrier mapping and grouping block 911; IFFT 912 with sub-carrier spacing $SC_1$; pilot symbol, and parallel-to-serial converter and cyclic prefix insertion 914; and frequency localization operator 916, e.g. for filtering, sub-band filtering, windowing, and/or sub-band windowing. Also shown is a scheduler 950 that performs scheduling, which may be part of resource allocator 168 in FIG. 2. It is noted that depending on the frequency localization operator implementation, different guard zones may be needed at the two edges of the spectrum and/or between sub-bands with different numerologies, e.g. different sub-carrier spacings. In some embodiments, the guard zones are determined taking into account frequency localization capabilities of both the transmitter and receiver.

In operation, constellation mapper 910 receives UE data for $K_1$ UEs, where $K_1$>=1. The UE data may contain traffic data and/or signaling. The constellation mapper 910 maps the UE data for each of the $K_1$ UEs to a respective stream of constellation symbols and outputs this at 920. The number of UE bits per symbol depends on the particular constellation employed by the constellation mapper 910. In the example of quadrature amplitude modulation (QAM), 2 bits from for each UE are mapped to a respective QAM symbol.

For each OFDM symbol period, the sub-carrier mapping and grouping block 911 groups and maps the constellation symbols produced by the constellation mapper 910 to up to P inputs of the IFFT 912 at 922. The grouping and mapping is performed based on scheduler information, which in turn is based on a TDD frame structure such as describe above, in accordance with a defined resource block definition and allocation for the content of the $K_1$ UEs being processed in transmit chain 900. P is the size of the IFFT 912. Not all of the P inputs are necessarily used for each OFDM symbol period. The IFFT 912 receives up to P symbols, and outputs P time domain samples at 924. Following this, in some implementations, time domain pilot symbols are inserted and a cyclic prefix is added in block 914. The frequency localization operator 916 may, for example, apply a filter $f_1(n)$ which limits the spectrum at the output of the transmit chain 900 to prevent interference with the outputs of other transmit chains, such as transmit chain 902. The frequency localization operator 916 also performs shifting of each sub-band to its assigned frequency location.

The functionality of the other transmit chains, such as transmit chain 902, is similar. The outputs of all of the transmit chains are combined in a combiner 904 before transmission on the channel.

FIG. 15 shows a simplified block diagram for a receive chain 903 for a receiver in the base station operating using the first numerology. The functionality of the receive chain 903 would be replicated where multiple numerologies are supported. The receive chain 903 includes: frequency localization operator 930; cyclic prefix deletion, serial-to-parallel conversion, and pilot symbol processing 932; FFT 934; sub-carrier de-mapping 936; and equalizer 938. Each element in the receive chain performs corresponding reverse operations to those performed in the transmit chain.

The transmit chain of a UE may be similar to that of a base station, although there would be no scheduler. The receive chain of a UE may be similar to that of a base station. For a UE to support transmission with multiple numerologies, multiple transmit and receive chains with support of, for example, filters for different FFT blocks corresponding to the numerology etc. are provided. In some embodiments, the filters can be sub-band filters.

In embodiments described above, various solutions are provided that allow for the coexistence of URLLC and eMBB traffic using the same numerology. When eMBB resources on a given numerology are punctured or reallocated dynamically for URLLC, for the described embodiments above, the URLLC traffic is sent using the same numerology. Thus, when the sub-frame is initially scheduled, the numerology is fixed for the sub-frame, irrespective of whether there is puncturing or reallocation.

Figure 16:
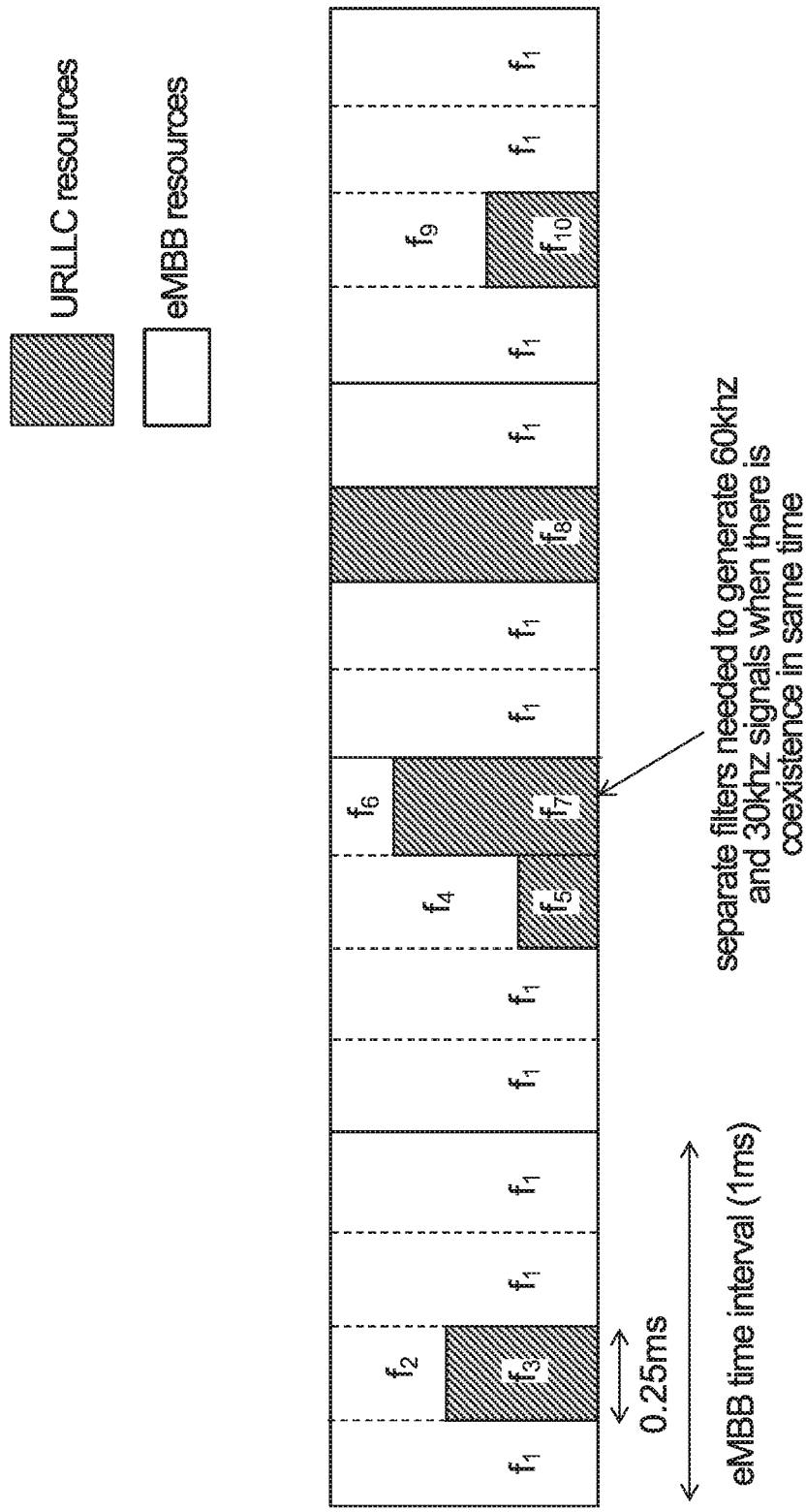
FIG. 16 illustrates different filters being used to generate and receive signals, according to one embodiment.

In the transmitter or receiver, separate transmit and receive chains are used to generate/receive signals with 60 kHz sub-carrier spacing and 30 kHz sub-carrier spacing, and more generally for differing sub-carrier spacings. In addition, if the frequency range allocated to each sub-carrier spacing is different in different time periods, then different filters are used to generate and receive signals. An example is depicted in FIG. 16, where signals with 60 kHz sub-carrier spacing are separated from signals with 30 kHz sub-carrier spacing. For the example illustrated in FIG. 16, ten different filters are employed, labelled $f_1, \ldots, f_{10}$. During the second 0.25 ms time interval, a filter $f_2$ is used for the 60 kHz traffic and a filter $f_3$ is used for the 30 kHz traffic. In the seventh 0.25 ms time interval, a filter $f_4$ is used for the 60 kHz traffic and a filter $f_5$ is used for the 30 kHz traffic. The filters $f_2$ and $f_3$ are different from the filters $f_4$ and $f_5$ because the bandwidths allocated to the sub-carrier spacings are different.

In the embodiments described above, various solutions are provided that allow for the coexistence of URLLC and eMBB traffic. In further embodiments described below, when eMBB resources on a given numerology are punctured or reallocated dynamically for URLLC, the URLLC traffic is sent using a different numerology. In general, the embodiments described below can be applied both to a FDD frame structure and a TDD frame structure.

The further examples below will continue to be described for two traffic types that are eMBB and URLLC, but more generally any two traffic types may benefit from this approach. However, typically one of the traffic types would have a lower latency requirement, or different requirement on numerologies, e.g., combinations of numerology parameters, than the other. Also, in the examples that follow, two numerologies are contemplated, one of which has a 30 kHz sub-carrier spacing, and the other of which has a 60 kHz sub-carrier spacing. However, more generally the same approach can be used to provide coexistence between any two differing scalable numerologies. Note that when two different numerologies are used simultaneously, two different transmit chains are used, for example such as depicted in FIG. 14, one for each numerology.

In these further embodiments, when a portion of eMBB resources is punctured or reallocated dynamically for URLLC, the URLLC traffic uses the same region in time frequency space, but can employ a different numerology.

Downlink dynamic puncturing of eMBB may be possible when the scheduling granularity of eMBB is larger than the scheduling granularity of URLLC. When the eMBB transmissions use a different numerology (e.g. different subcarrier spacing) from the URLLC transmission, then there may be symbol alignment or slot alignment between the different numerologies. Puncturing may be achieved by slot alignment. e.g., multiple URLLC OFDM symbols or slots fit within an eMBB slot. A URLLC slot is a low latency slot and an eMBB slot is a latency tolerant slot. In some embodiments, puncturing may be achieved by symbol alignment, e.g. multiple URLLC symbols fit within a single eMBB symbol. In uplink, eMBB and URLLC may use the same or different numerology, and a region can be identified where grant-free URLLC traffic may be transmitted. Regardless of whether the eMBB and URLLC use the same or different numerology, one is treated as interference for the other at the base station receiver if both traffic types are transmitted in the same resources.

Figure 17:
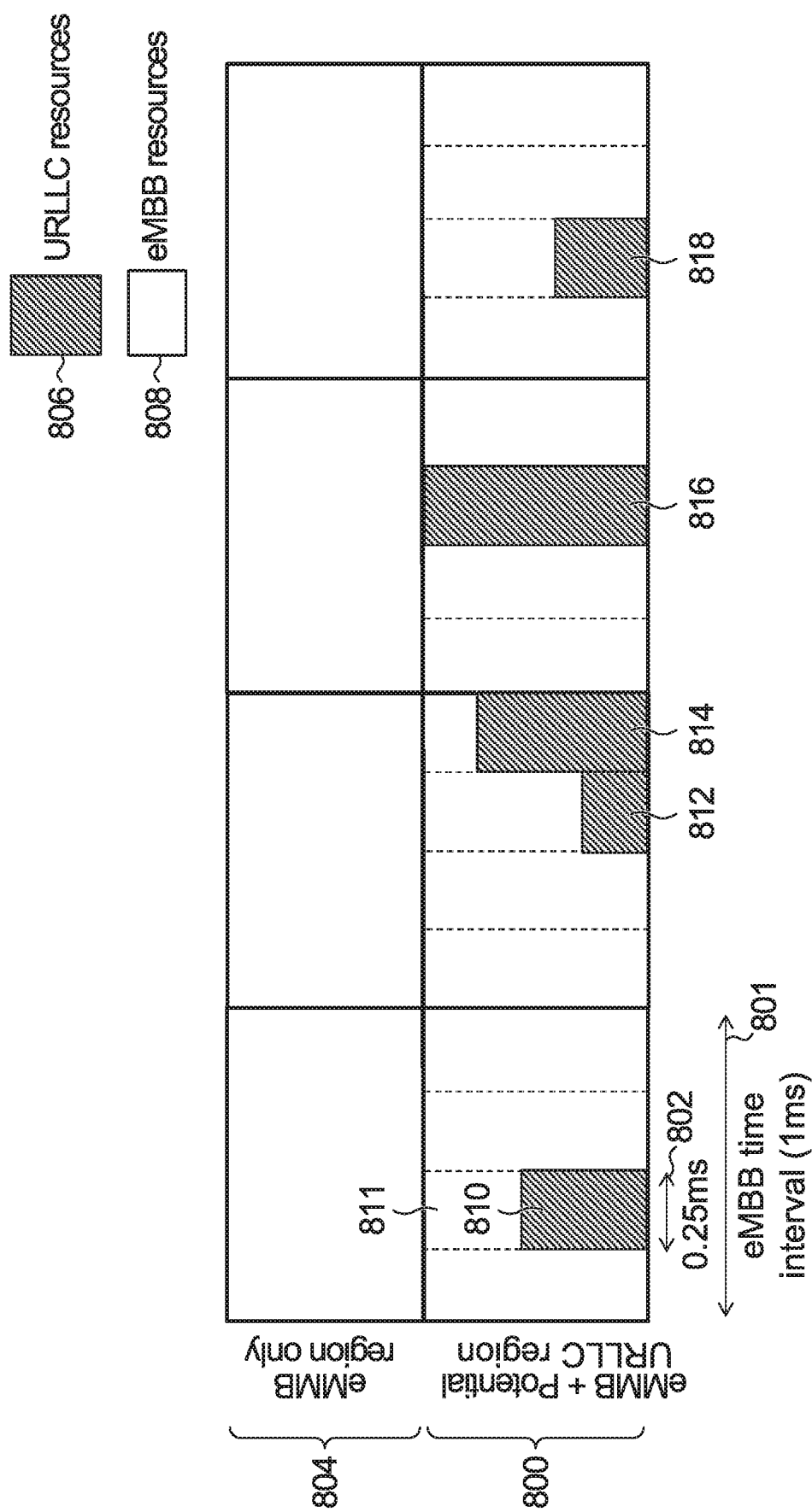
FIG. 17 illustrates an example of slot-based coexistence of differing numerologies.

In one embodiment, slot-based coexistence of differing numerologies is provided. An example is described with reference to FIG. 17. In this example, an overall bandwidth is divided into a first sub-band 800 for eMBB traffic subject to puncturing/reallocation for URLLC traffic, and a second sub-band 804 that is only for eMBB traffic. However, for the purpose of the coexistence methodologies described, the inclusion of a second sub-band 804 is optional. For this example, eMBB is scheduled with a 1 ms scheduling interval 801 using a numerology with a 30 kHz sub-carrier spacing. URLLC is transmitted with a 0.25 ms scheduling interval 802 using a numerology with a 60 kHz sub-carrier spacing. The 0.25 ms scheduling intervals are also referred to herein as URLLC slots. There are four URLLC slots within the eMBB scheduling interval. Frequency region 800 in FIG. 17 is equivalent to region 130 in FIG. 1 and can be regarded as a common downlink resource where both eMBB and URLLC traffic can be scheduled/transmitted.

URLLC traffic can be scheduled on a per slot basis, puncturing eMBB resources within sub-band 800. A specific utilization scenario will now be described. URLLC resources are generally indicated at 806 (using cross-hatching), and eMBB resources are generally indicated at 808. In the illustrated example, within the second slot a region 810 is a URLLC region, obtained by puncturing or reallocating eMBB resources, and the remainder 811 of the slot remains allocated to eMBB. During the second slot, within sub-band 800, traffic with a 30 kHz sub-carrier spacing in region 811 is coexisting with traffic with a 60 kHz sub-carrier spacing in region 810. The punctured 30 kHz eMBB resource is replaced with a 60 kHz resource for URLLC purposes.

UEs with eMBB traffic in the coexistence region 800 may receive an URLLC indicator to inform them that they do not need to decode region 810. The URLLC indicator can be referred to as the indicator containing puncturing information. The indicator may provide common puncturing information to the eMBB UEs scheduled in the coexistence region. The indicator can be as often as every 0.25 ms or at the end of 1 ms interval or any other location during the eMBB scheduling interval. More generally, if it is a common indicator, the occasion to monitor the indication can be inside or outside the scheduling interval of a UE that is monitoring the indicator. The decision to puncture resources in a subsequent slot can be made prior to the slot boundary.

Also shown are URLLC resources in regions 812, 814, 816, and 818, all of which are transmitted using the 60 kHz numerology.

Figure 18:
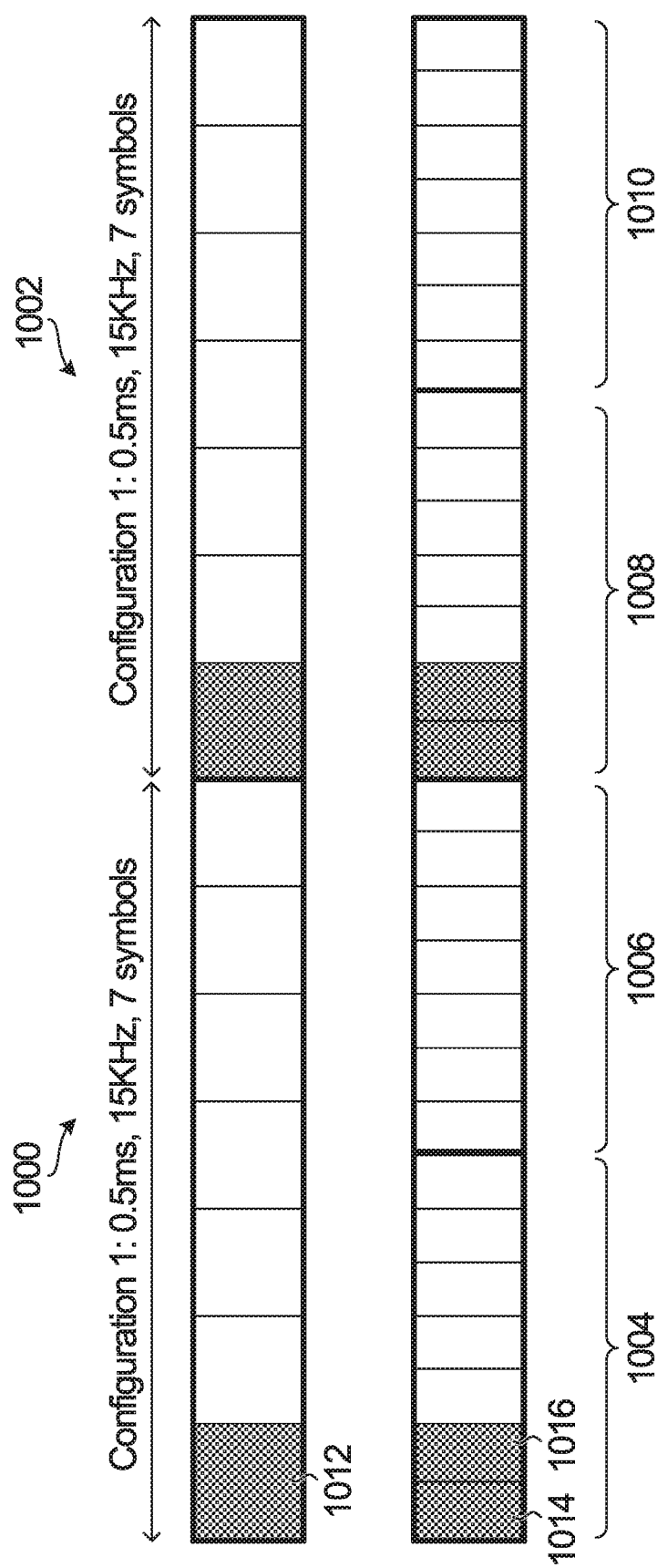
FIG. 18 illustrates an example of symbol-based coexistence of differing numerologies.

In another embodiment, sub-frames for differing numerologies are designed with symbol alignment to allow coexistence at the symbol level. In an example of symbol alignment, for two sub-carrier spacings $F_s$ and $F_0$, where $F_s=F_0*2^n$, symbol alignment exists when $2^n$ symbols with subcarrier spacing $F_s$ align with one symbol with sub-carrier spacing $F_0$. An example is depicted in FIG. 18, which shows two 0.5 ms sub-frames 1000 an 1002 for 15 kHz sub-carrier spacing each having 7 OFDM symbols. Also shown are four 0.25 ms sub-frames 1004, 1006, 1008, 1010 for a 30 kHz sub-carrier spacing each having 7 symbols. Symbol alignment is present in the sense that each symbol with the 15 kHz sub-carrier spacing is aligned with two symbols with 30 kHz sub-carrier spacing. As mentioned earlier, in other embodiments a sub-frame may have a duration of 1 ms, regardless of the numerology or number of OFDM symbols in the sub-frame.

To the extent a sub-frame may include symbols of differing lengths, for example due to different cyclic prefix lengths, this is taken into account to ensure symbol alignment is still present.

To understand the effect of cyclic prefix lengths, FIG. 19 will be described, which shows a very specific set of numerology examples. Shown are seven numerology examples each characterized by a respective set of parameters (Set 1, . . . , Set 7). The first row indicates a sub-carrier spacing in kiloHertz (kHz). The second row is the OFDM symbol length in microseconds. The third row is the cyclic prefix (CP) length. The first four sets of parameters have two possibilities for cyclic prefix length, one for normal cyclic prefix (NCP) and one for extended cyclic prefix (ECP) separated by a "/". For NCP, in each sub-frame there is a first symbol with a first cyclic prefix and remaining symbols of the sub-frame have a slightly shorter cyclic prefix. For ECP, all symbols have the same cyclic prefix. The corresponding number of symbols per OFDM symbol is indicated in the fourth row. When the number of OFDM symbols is different for the two cyclic prefix possibilities, two numbers of symbols per sub-frame are indicated, also separated by a "/". Taking Set 1 for example, the NCP cyclic prefix length is (10.42, 9.38), which indicates a 10.42 μs cyclic prefix for one symbol out of a total of seven symbols in the sub-frame, and 9.38 μs for the other symbols of the sub-frame. The ECP cyclic prefix length is 33.3 μs for all symbols of a sub-frame containing 6 OFDM symbols. The fifth row is the transmit time unit (TTU) duration, i.e. the time to transmit the number of symbols referred to in the fourth row. The cyclic prefix overhead for NCP and ECP is indicated in the sixth row, again separated by a "/". No ECP definition is provided for sets 5, 6, and 7. The examples that follow are based on the NCP and ECP definitions described. However, more generally, they apply to any set of two or more differing cyclic prefix definitions.

FIG. 19 is only an example. Alternatively, the number of symbols can be 14 or 12 symbols depending on whether CP type 1 or 2 is used, and the TTU duration would be double what shown in FIG. 19 for each set. Even though the examples below consider TTU length of 7 symbols for CP type 1, it should be appreciated that similar examples can be considered for TTU length of 14 symbols for CP type 1.

Returning to the example illustrated in FIG. 18, if each sub-frame employs normal cyclic prefix, then the sub-frame will include one symbol with the longer cyclic prefix and six symbols with the shorter cyclic prefix. For the first 15 kHz sub-frame 1000, the symbol with the longer cyclic prefix is indicated at 1012. Normally, for the 30 kHz sub-frames, each sub-frame would include one symbol with the longer cyclic prefix and six with the shorter cyclic prefix. However, in order to achieve symbol alignment, the symbols with the longer cyclic prefix are grouped together at 1014 and 1016 at the start of sub-frame 1004, such that together they have a duration equal to the symbol 1012. This is just one example of how symbol alignment can be achieved. For an embodiment in which co-existence at the symbol level is provided, there is symbol alignment.

Coexistence with symbol alignment involves puncturing/reallocating resources of one or more symbols of a first numerology, and in their place transmitting symbols of a second numerology. When K symbols of the second numerology align with one symbol of the first numerology, K symbols of the second numerology can be transmitted for each punctured/reallocated symbol of the first numerology. This can be done for a portion or all of a bandwidth initially allocated to the first numerology. In addition, there can be a dedicated portion of bandwidth for the first numerology that is not subject to being punctured/reallocated.

Figure 20:
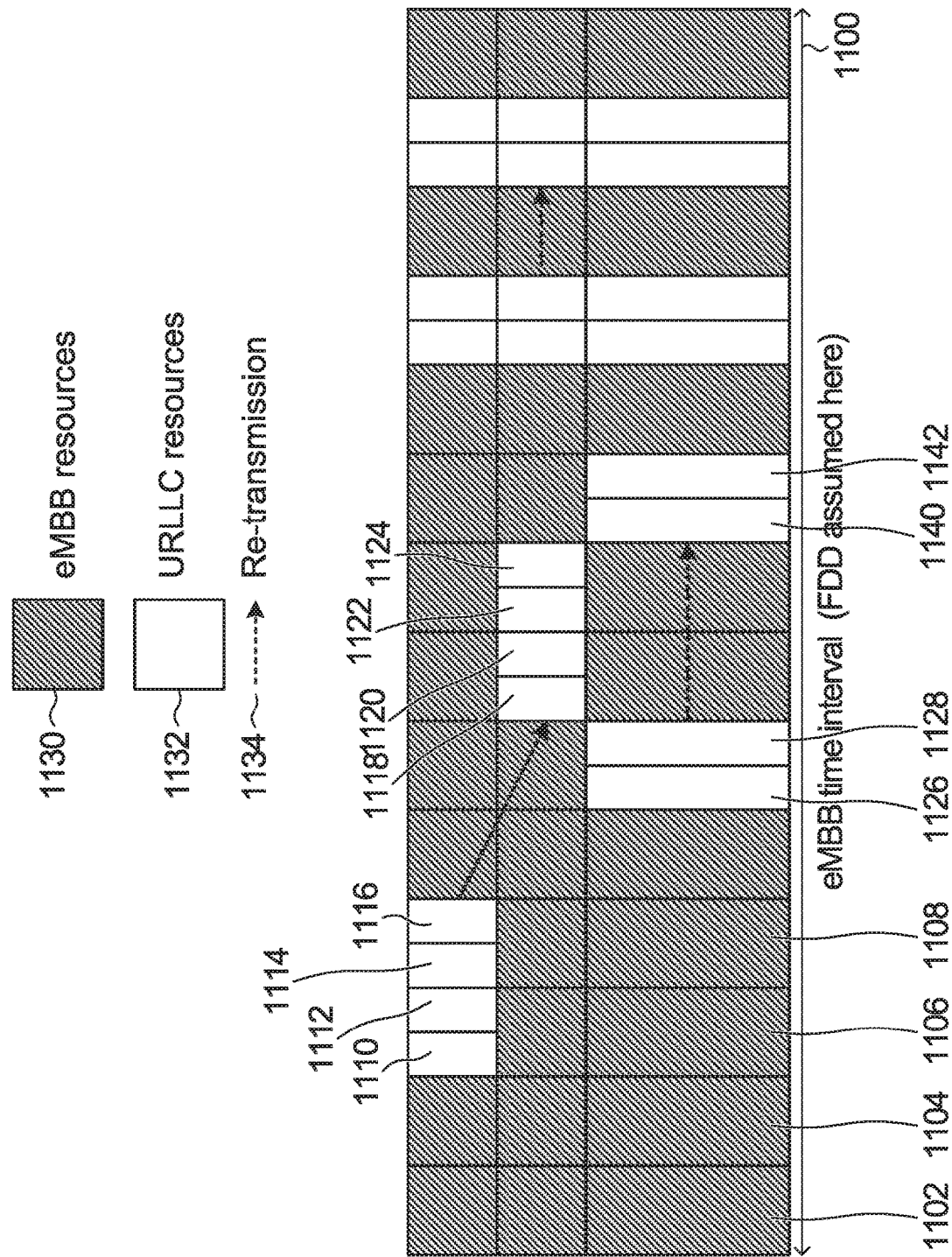
FIG. 20 illustrates another example of symbol-based coexistence of differing numerologies.

Another example will now be described with reference to FIG. 20, which uses FDD. An eMBB scheduling interval 1100 contains 14 symbol intervals for transmitting symbols with 30 kHz sub-carrier spacing. The 14 symbols of the eMBB scheduling interval 1100 are also symbol aligned with 14 URLLC transmission opportunities, each URLLC transmission opportunity containing two symbols with 60 kHz sub-carrier spacing. This implies that a URLLC transmission may begin at the boundary of any 30 kHz symbol and each URLLC transmission would have an even number of symbols. The time-frequency resources shown in FIG. 20 may refer to the coexistence region 130 in FIG. 1 or region 800 in FIG. 17, frequency range of which can be equal or less than carrier BW. However, the URLLC symbols are not transmitted unless there is a puncturing or reallocation. Allocations for eMBB are indicated at 1130 (in hatching), and allocations for URLLC are indicated at 1132. Retransmissions are indicated at 1134 (using an arrow).

During the first two symbol intervals 1102 and 1104, there is no puncturing. During the third symbol interval 1106, a portion of the bandwidth is punctured/reallocated for URLLC traffic. In the punctured/reallocated portion, the third 30 kHz symbol is replaced with two 60 kHz symbols in regions 1110 and 1112. Similarly, URLLC traffic is transmitted in regions 1114 and 1116. The URLLC content transmitted in regions 1110, 1112, 1114, and 1116 is retransmitted at 1118, 1120, 1122, and 1124 with frequency hopping, in the sense that a different frequency resource is used for the retransmission. This example is in the context of an FDD implementation in which an ACK/NACK is transmitted on the uplink on uplink spectrum before retransmitting in these hopped regions. More generally, re-transmission in regions 1118, 1120, 1122, 1124 may or may not be in response to a NACK. For example, automatic re-transmission or repetition can be configured for a group of UEs receiving URLLC transmission. In a second example, an initial URLLC transmission occupies regions 1126 and 1128, and a retransmission occupies regions 1140 and 1142. The second example features a shorter latency than the first example in that only two URLLC symbol durations are needed for the initial transmission compared to four. Here, URLLC traffic occupies the minimum of two URLLC symbols, but in general can occupy any even number of URLLC symbols, when there are two URLLC symbol durations per eMBB symbol duration.

Symbol alignment ensures that the duration of one 30 kHz symbol is the same as the duration of two 60 kHz symbols. The scheduling frequency for URLLC can be configurable. For example, with reference to FIG. 20, URLLC traffic could be scheduled to occupy the resources of one eMBB symbol, i.e. two URLLC symbols at a time. In another example, URLLC symbols could be scheduled to occupy resources of a group of consecutive eMBB symbols, in advance of the first symbol of the group.

In some embodiments, the UEs with eMBB traffic are informed of the puncturing locations so that they know not to decode those resources, for example, by receiving a common indicator. Alternatively, in some instances the amount of eMBB resources punctured is small enough that the UE can decode its content notwithstanding the puncturing and without knowledge of the puncturing, for example using weighted hybrid automatic repeat request (HARQ) combining or through the use of extra code-block protection.

Figure 21:
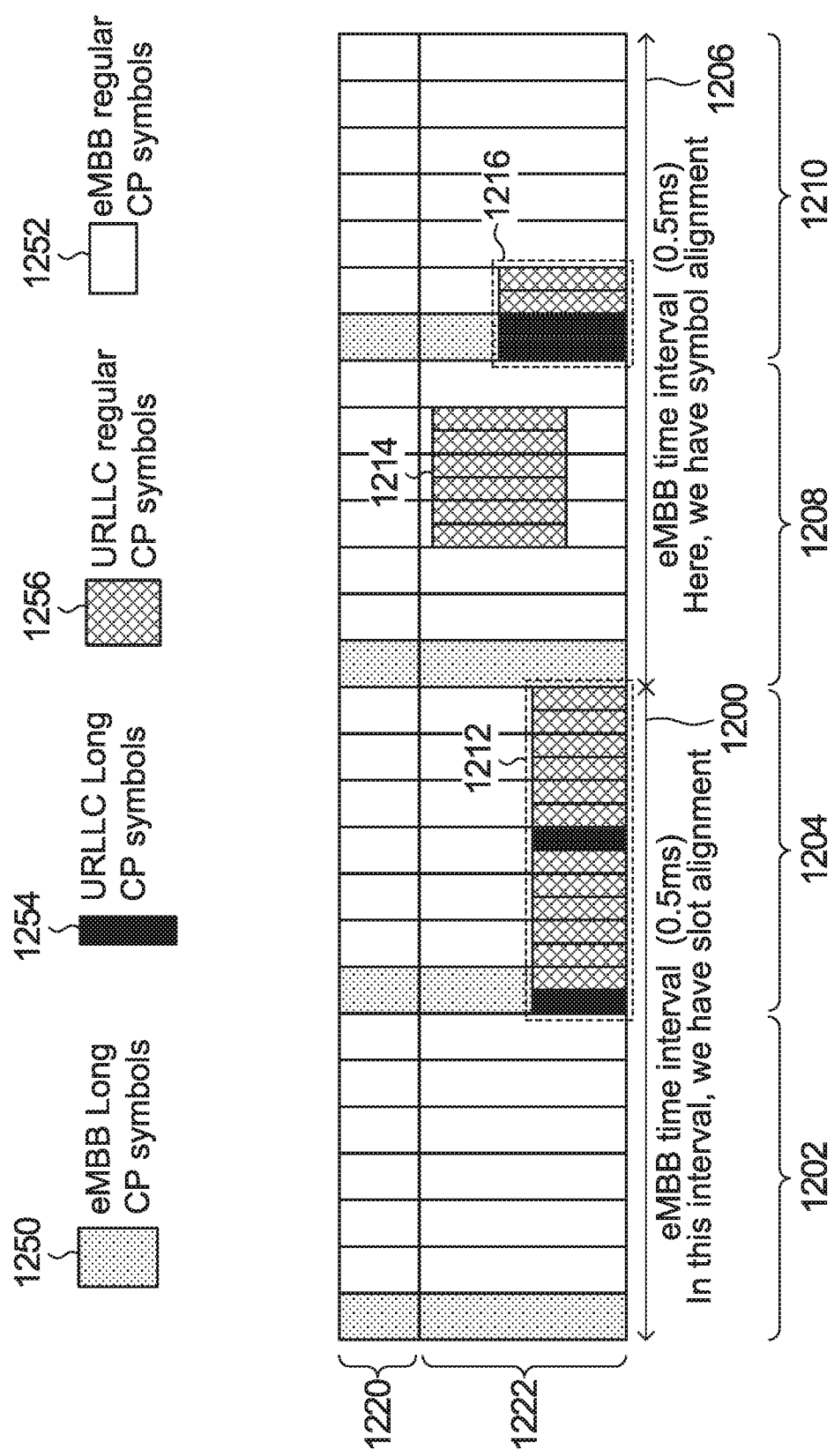
FIG. 21 illustrates an example of slot and symbol-based coexistence in the same time-frequency resources.

In some embodiments, both slot and symbol-based coexistence can be realized in the same time-frequency resources. Scheduled latency tolerant data having a first sub-carrier spacing may be punctured, and the resources freed by the puncturing may be used to transmit low latency data at a second sub-carrier spacing different from the first sub-carrier spacing. Despite the different sub-carrier spacing, the low latency interval still lines up with symbol or slot boundaries of the punctured latency tolerant data. An example is depicted in FIG. 21, where an eMBB scheduling interval is 0.5 ms, and a URLLC slot is 0.25 ms, such that there is slot alignment. The eMBB time interval 1200 is aligned with the URLLC slots 1202 and 1204, and the eMBB time interval 1206 is aligned with the URLLC slots 1208 and 1210. The bandwidth is divided into a first sub-band 1220 dedicated to eMBB traffic, and a second sub-band 1222 (co-existence region) for eMBB traffic subject to puncturing/reallocation to URLLC, but alternatively the entire bandwidth could be subject to puncturing/reallocation.

Symbols with long and regular cyclic prefix are transmitted. eMBB long cyclic prefix symbols are indicated at 1250. eMBB regular cyclic prefix symbols are indicated at 1252. URLLC long cyclic prefix symbols are indicated at 1254. URLLC regular cyclic prefix symbols are indicated at 1256. However, the same approach can be applied where all the symbols for each traffic type have the same cyclic prefix. It is noted that slot alignment can be achieved with NCP or ECP.

In an example of slot based coexistence, in the second 0.25 ms URLLC slot 1204, eMBB content is punctured/reallocated for the entire slot duration at 1212. Note that it is not necessary to have symbol alignment for the slot-based coexistence. Thus, in the illustrated example, the approach of having one URLLC symbol with a long CP followed by six symbols with a regular CP is taken for the slot-based puncturing in region 1212.

In an example of symbol based coexistence, eMBB content is punctured/reallocated for three eMBB symbol durations at 1214 allowing for 6 URLLC symbols with regular cyclic prefix to be transmitted, and at 1216 allowing for 4 URLLC symbols. In example 1216, in order to achieve symbol alignment, the first two URLLC symbols are long cyclic prefix symbols, and the next two are regular cyclic prefix symbols.

The embodiments illustrated in FIGS. 17 to 21 employ a FDD architecture, meaning that the illustrated bandwidth is used for downlink transmission, and another bandwidth is used for uplink transmission. However, a similar approach can be used for a TDD architecture in which certain symbol periods are used exclusively for downlink transmission, and certain symbol periods are used for uplink transmissions, separated from the downlink transmission by a guard period.

Figure 22:
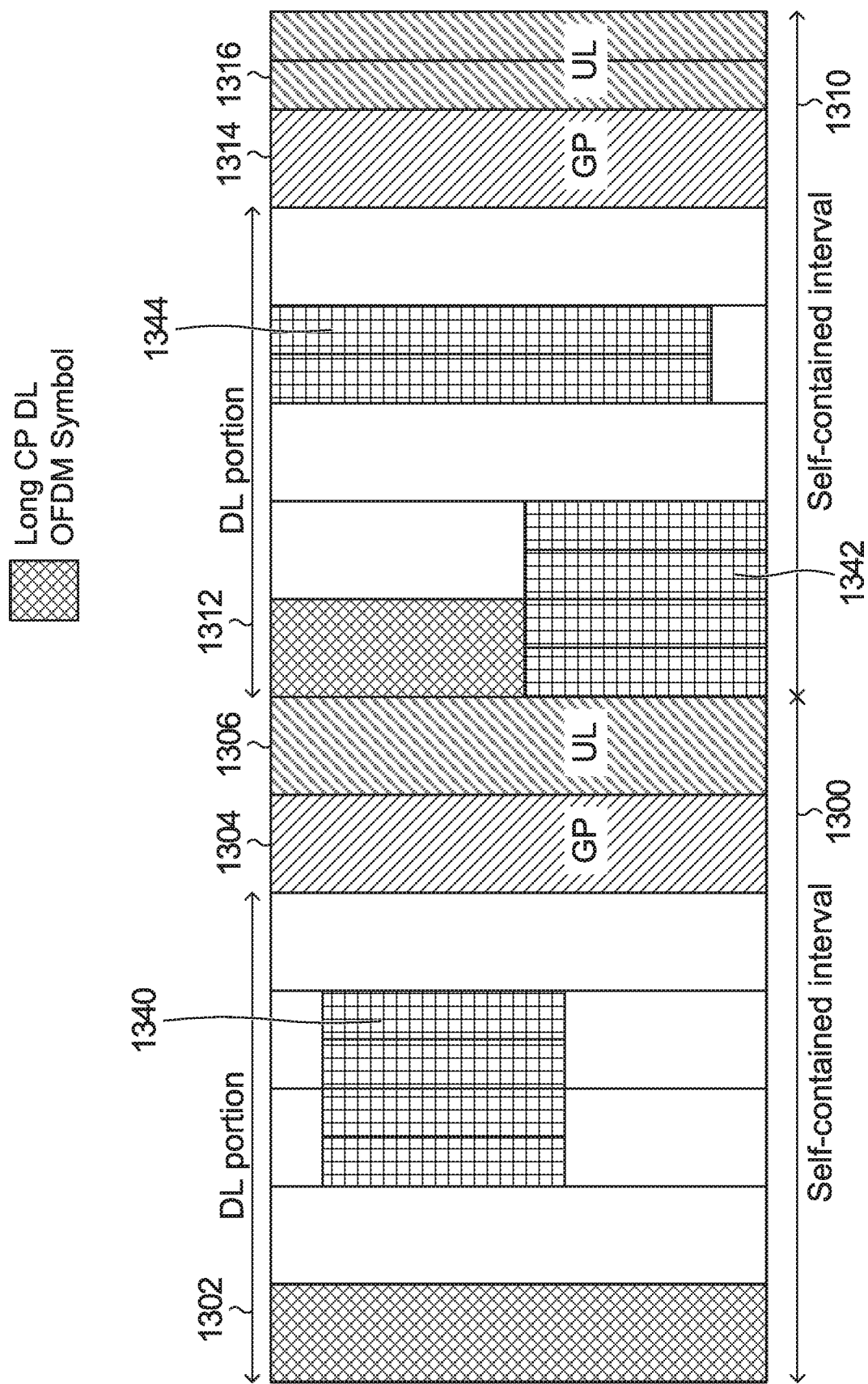
FIG. 22 illustrates an example of symbol-based coexistence in a TDD architecture.

As a specific example, a seven symbol self-contained interval with 30 kHz sub-carrier spacing may be used for eMBB traffic featuring an initial downlink symbol with a long cyclic prefix, four more downlink symbols with a regular cyclic prefix, a guard period of one symbol duration, and one uplink symbol. This is shown in FIG. 22, which shows a first self-contained interval 1300 having downlink portion 1302, guard period 1304, and uplink portion 1306. Coexistence through symbol alignment is shown in the first self-contained interval 1300 in that region 1340 has been punctured/reallocated, and in that region the two eMBB symbols are replaced with four URLLC symbols with 60 kHz sub-carrier spacing. Also shown is a second self-contained interval 1310 having downlink portion 1312, guard period 1314 and uplink portion 1316. Coexistence through symbol alignment is shown in the second self-contained interval 1310 in that region 1342 has been punctured/reallocated, and in that region the two eMBB symbols are replaced with four URLLC symbols with 60 kHz sub-carrier spacing. The uplink period 1306 and 1316 is one eMBB symbol duration, which is aligned with two URLLC slots. As such, the uplink period can be used for one symbol with 30 kHz numerology or two symbols with 60 kHz numerology. The puncturing information of region 1340 may be conveyed to the eMBB UEs within DL portion 1302 or in a later DL portion such as 1312. For example, the CORESET of a puncturing indicator, either UE-specific or group-common, may be located at the beginning of each DL portion and the indicator may provide puncturing information corresponding to the immediately preceding DL portion, or more generally one or more previous DL portions. A common puncturing indication can be transmitted in group common DCI such as PCFICH or PHICH like channel structure or common PDCCH channel structure.

The above coexistence examples are all applicable for uplink transmission as well. For example, a similar approach can be employed to provide coexistence for uplink transmissions. For uplink transmissions, there is: (1) traffic of a second type, which is transmitted on a grant-free basis, e.g. low latency traffic, such as URLLC uplink traffic; and (2) traffic of a first type, which is transmitted through a request and grant mechanism, e.g. latency tolerant traffic, such as eMBB uplink traffic. eMBB and URLLC traffic will be used in the examples below.

Two numerologies can co-exist on a per-slot basis and/or through symbol alignment. However, unlike the downlink situation, because the URLLC traffic is grant free, when the URLLC traffic is transmitted, there may be a collision between URLLC traffic and eMBB traffic. In addition, the 60 kHz URLLC traffic is superimposed over the air on top of the 30 kHz eMBB traffic if both URLLC and eMBB traffic transmit in the same time-frequency resources. The base station decodes URLLC and eMBB traffic by interference cancellation.

Figure 23:
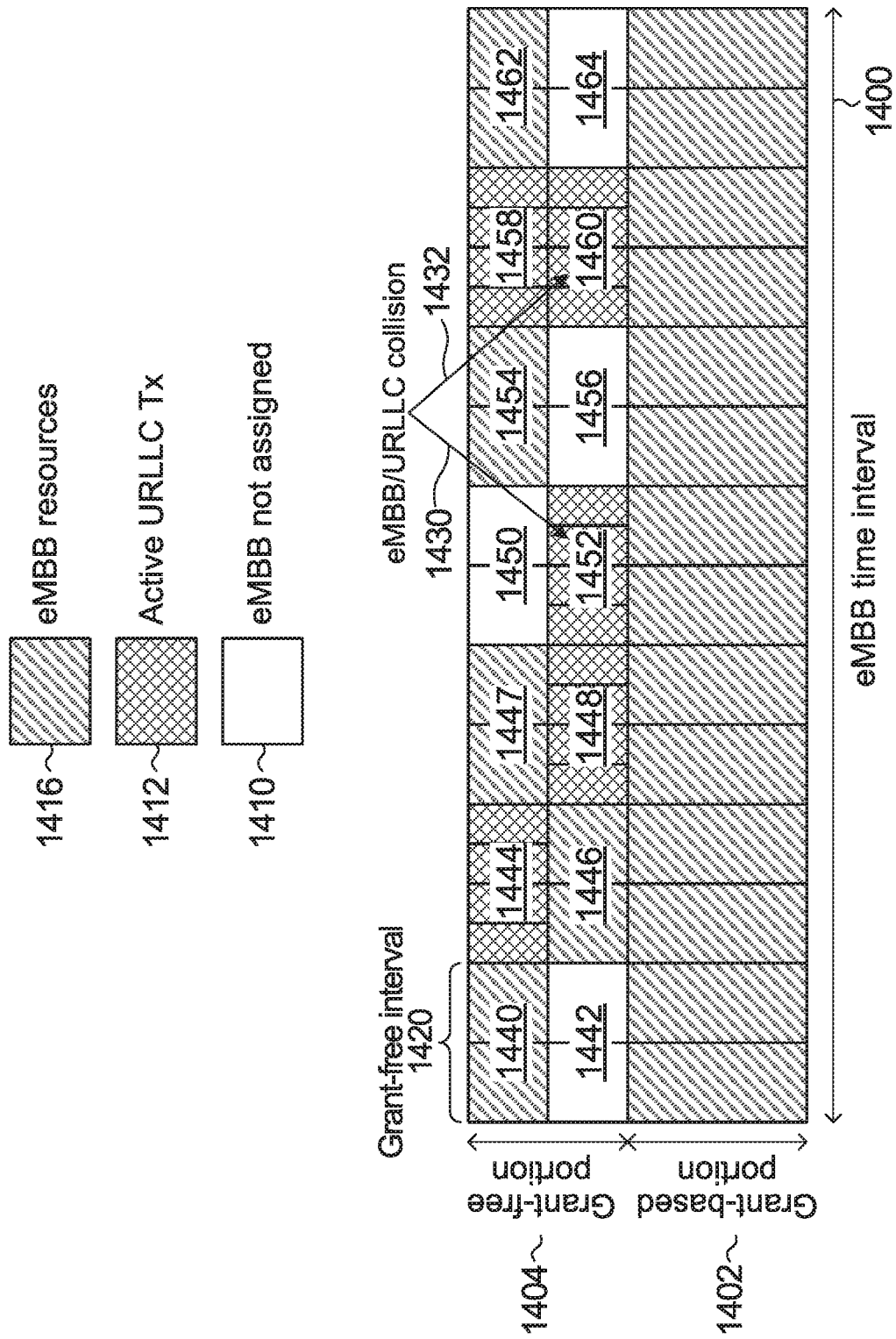
FIG. 23 illustrates an example of coexistence in the uplink.

A specific example of coexistence in the uplink will be described with reference to FIG. 23. Shown is an eMBB interval 1400. The available bandwidth is divided into a first portion 1402 dedicated to eMBB traffic, and a second portion 1404 available for eMBB and URLLC. The division can be achieved by semi-static configuration, for example, by RRC signaling or system information. Alternatively, there can be no such divisions and URLLC and eMBB may coexist anywhere within the carrier BW. Timing within the second portion has a grant-free interval (e.g. 1420) which is aligned with the eMBB scheduling interval 1400, such that 7 grant-free intervals fit within one eMBB scheduling interval. In addition, there is symbol alignment as between eMBB transmissions and URLLC transmissions, with two URLLC symbols with 60 kHz sub-carrier spacing fitting within one eMBB symbol with 30 kHz sub-carrier spacing.

In some embodiments, there are reserved areas where eMBB may not transmit. In some embodiments, UEs with eMBB and URLLC traffic may transmit over unreserved resources. Also, it is noted that the partition shown in FIG. 23 is a logical partition. In practice, the collision-free and collision-possible regions may be distributed over the available bandwidth for diversity.

The uplink coexistence can also be extended to an uplink TDD structure, and the numerology switching can be realized in the uplink on an uplink only TDD sub-frame, or in an uplink-only portion of a self-contained sub-frame. In that case, downlink control of an uplink-dominated sub-frame may use the same numerology as eMBB, or may use the numerology of URLLC.

UEs with URLLC traffic are mapped to resources, which are pre-configured for grant-free transmission. However, a given URLLC resource may or may not be used depending on whether the UEs mapped to the resource have anything to send. In addition, eMBB traffic is selectively assigned in the grant-free portion 1404. This can be based on a known URLLC UE mapping or can be updated semi-statically. Time frequency regions with eMBB traffic are indicated at 1416. URLLC traffic may or may not collide with eMBB. In the illustrated example, regions with active URLLC transmissions are indicated at 1412. Time frequency regions with no eMBB assignment are indicated at 1410.

In the first grant-free interval, in region 1440 there is eMBB traffic and in region 1442 there is no traffic. In the second grant-free interval, in region 1444 there is URLLC traffic and in region 1446 there is eMBB traffic. In the third grant-free interval, in region 1447 there is eMBB traffic and in region 1448 there is URLLC traffic. In the fourth grant-free interval, in region 1450 there is no traffic, and in region 1452 there is eMBB traffic and URLLC traffic meaning there is a collision between the eMBB traffic and the URLLC traffic. In the fifth grant-free interval, in region 1454 there is eMBB traffic and in region 1456 there is no traffic. In the sixth grant-free interval, in region 1458 there is URLLC traffic, and in region 1460 there is eMBB traffic and URLLC traffic meaning there is another collision. In the seventh grant-free interval, in region 1462 there is eMBB traffic, and in region 1464 there is no traffic. The URLLC transmission in region 1460 can be a re-transmission of an initial transmission made in 1452 following a NACK. UEs transmitting UL traffic without grant can be configured with a timeline (e.g., after x symbols of receiving a NACK for a given numerology or x ms more generally) when to re-transmit following a NACK is received. The configuration can be received via RRC signaling. In one example, UE may initiate K repetitions for re-transmission where value of K can be different from the number of repetitions used for initial transmission. K can be configured by RRC signaling.

Figure 24:
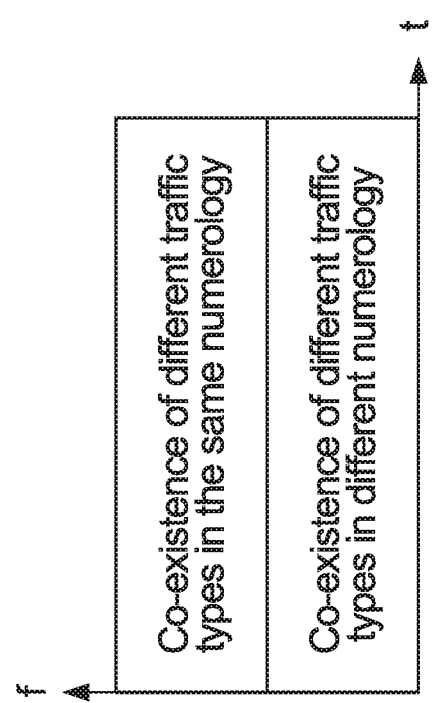
FIG. 24 illustrates an embodiment in which coexistence of first and second traffic types can be observed with both same and different numerology in separate frequency partitions.

FIG. 24 illustrates an embodiment in which coexistence of first and second traffic types can be observed with both the same and different numerology in separate frequency partitions during a common time interval. The first traffic type and second traffic type may co-exist with the same numerology in a frequency partition and also may co-exist with different numerologies in another frequency partition. Co-existence with the same and different numerology can be in a common time interval. FIG. 24 shows that time-frequency region (i.e., a reference region) where both low latency and latency tolerant transmissions are made, low latency traffic and latency tolerant traffic may coexist with same or different numerology. There can be a semi-static configuration of partitions in time and/or frequency where in one partition, both traffic types coexist with the same numerology and in the other partition, they coexist with different numerology. Alternatively, there might not be any semi-static partitioning, in which case transmission of two traffic types can coexist either with the same or different numerology dynamically anywhere within the coexistence region or within a given time-frequency region. Latency tolerant traffic may receive semi-static signaling, by RRC or SIB, of the time-frequency region. If the PDSCH transmission of the UE overlaps with the indicated time-frequency region, the UE monitors for a puncturing indicator which provides pre-emption/puncturing information within the region. Additionally, each latency tolerant UE may receive RRC signaling which turns on monitoring behaviour. Hence, signaling steps can be: Receive semi-static signaling of a time-frequency region→Receive RRC signaling to monitor indication→Monitor and attempt to decode indication if PDSCH overlaps with the time-frequency region. In one example, RRC signaling to monitor indication can be obtained as a property of active bandwidth part(s) of the UE. The UE receives one or more configurations of bandwidth parts by semi-static signaling (e.g., by RRC) prior to PDCCH/PDSCH reception. Alternatively, receiving semi-static signaling of a time-frequency region may implicitly activate monitoring behaviour for the UE and there may not be additional RRC signaling needed to activate the monitoring. In that case, UE behaviour would be: Receive semi-static signaling of a time-frequency region (reception of this configuration turns on monitoring)→Monitor and attempt to decode indication if PDSCH overlaps with the time-frequency region.

In one example, there are N groups of UEs that are monitoring puncturing indication, where UEs in group i, i={1, 2, . . . , N}, receive transmission with numerology i, i={1, 2, . . . , N}. It may be possible that a pre-emption indication is transmitted for each group of UEs, i.e., UEs belonging to group i monitor a search space/CORESET of pre-emption indication addressing group i. The PDCCH carrying the pre-emption indication can be received in the search space/CORESET based on numerology i. The configured granularity in time and/or frequency of PI addressing group i can be based on numerology i. A UE may belong to one or multiple groups depending on whether the UE can receive transmissions over one or multiple numerologies. The puncturing indication may have UE specific fields or may provide common information to the UEs that are monitoring. In the case of common indication, the indication may provide time and/or frequency domain pre-emption information within a region. If there are multiple indications sent, for example one for each numerology, the regions addressed by those indications can be the same or different and may or may not overlap.

In one example, a network may configure a time-frequency region, where pre-emption can occur in the region which indication corresponds to, based on a reference numerology. The configuration of time-frequency region includes at least location and size in time and/or frequency. The time domain location is within the periodicity of the indication, and the frequency domain location is within the carrier BW. The reference numerology can be the numerology used for synchronization sequence block (SSB) in a carrier/cell or any other numerology. At least one pre-emption indication can be transmitted with a configured periodicity which provides pre-emption information within the configured time-frequency region. In one example, the time-frequency region is defined/configured based on 15 kHz SCS and NCP. Then, the time-frequency region can be defined/configured as x RBs (i.e., frequency range) based on 15 kHz SCS within the carrier BW in frequency domain and y symbols or slots based on 15 kHz SCS NCP within the monitoring periodicity of indication. Here, x and y are positive integers, which can be configured. For example, there can be a set of values for x and y, from which one configuration is indicated semi-statically or dynamically (e.g., in the DCI carrying indication). The time and frequency granularity of PI can be based on the numerology used for configuring the time-frequency region. For example, time granularity can be m symbols, where m<y, and frequency granularity can be n RBs, where n<=x. A set of values can be configured for m and n, and one combination can be indicated to the UE semi-statically and/or dynamically (e.g., in the DCI carrying indication). It may be possible that semi-static configuration provides default parameters for time-frequency region and granularity, and later DCI (such as indication) can update the parameters dynamically. Latency tolerant UEs may receive transmissions in the same or different numerology chosen for configuration of time-frequency region and/or granularity. Note that the duration of the reference time-frequency region for which PI provides pre-emption information may or may not align at the slot boundary of a given/reference numerology. The numerology can be the same or different from the numerology used for the data transmissions of either latency tolerant or low latency UEs. A slot can be 7 or 14 symbols. The frequency region or range may align with the RB or RBG boundary of a given/reference numerology, which can be the same or different than the numerology used for the data transmissions of either latency tolerant or low latency UEs.

Some example configuration sets are shown below in Table 1, where NUM1, NUM2, NUM3 indicate numerologies which can be chosen from {3.75, 7.5, 15, 30, 60, 120, 480} kHz for values of SCS. Each SCS can be used with long or normal CP. UEs receive higher layer signaling to indicate which configuration set is active.

TABLE 1

| Set Index | Numerology for configuring reference time-frequency region | Numerology used for PDCCH and/or PDSCH of eMBB UEs | Numerology used for configuring time and/or frequency granularity |
|---|---|---|---|
| 1 | NUM 1 | NUM 1 | NUM 1 |
| 2 | NUM 1 | NUM 2 | NUM 2 |
| 3 | NUM 1 | NUM 2 | NUM 1 |
| 4 | NUM 1 | NUM 2 | NUM 3 |

In one example, the time-frequency region and/or granularity is configured based on default numerology using f0 kHz and a CP type. UEs monitoring PI may receive data transmissions based on $2^N*f0$ or $2^{-N}*f0$ kHz, N={0, 1, 2, . . . }, f0 can be one of {3.75, 7.5, 15, 30, 60, 120, 480} kHz. In one example, normal CP (NCP) is adopted and 15 kHz is chosen as f0 and latency tolerant UEs receive transmissions based 60 kHz NCP. The pre-emption indication (PI) monitoring periodicity is 1 ms (14 symbols based on 15 kHz) and the configured time duration of the region is 11 symbols, excluding the control and/or demodulation reference sequence region at the beginning of the 1 ms interval or slot of 15 kHz. In another example, the time duration can be 14 symbols, i.e., the same as the monitoring period. In one example, symbol alignment is achieved, i.e., 4 symbols of 60 kHz SCS align at the boundary of one 15 kHz symbol for the same CP overhead, and time granularity is m symbols based on 15 kHz and there are p time divisions within time duration of the region. p may or may not be an integer multiple of m, i.e., it may be possible that time granularities of different lengths can coexist within the duration of the time-frequency region addressed by the PI and at least one time granularity is equal to m. In one example, if m=1 and it is indicated that the $3^{rd}$ symbol (from the beginning of 1 ms interval) is pre-empted/impacted, a latency tolerant UE would determine that four 60 kHz symbols that align with the boundary of the $3^{rd}$ 15 kHz symbol are pre-empted. Hence, the time granularity is scalable across numerologies in terms of number of symbols. From a UE's perspective, 4 symbols are pre-empted based on 60 kHz which is the numerology used for transmission, whereas PI indicates that one symbol (or the equivalent duration in ms) is pre-empted based reference numerology 15 kHz. A similar example can be considered in the frequency domain. If there are k frequency divisions within the region and frequency granularity is configured to be n RBs based on 15 kHz, if the $3^{rd}$ granularity is pre-empted, the UE receiving a transmission with 60 kHz would determine that n/4 RBs that align at the boundary of the corresponding n RBs group are pre-empted. This assumes n is an integer multiple of 4. This provides a common indication methodology based on a reference numerology for a UE monitoring the indication. Hence, time-frequency granularity is configured for a reference numerology and the UE determines the actual number of RBs and/or symbols pre-empted based on the numerology used for transmission. UEs receiving transmissions with 60 kHz and 15 kHz may monitor CORESET of PI based on 60 kHz and 15 Khz respectively, however, the content of PI provides pre-emption information based on a reference numerology, i.e., the granularity configured can be based on a reference numerology which can be different than the numerology used for data transmission. If scalable time-frequency granularities are used across numerologies, the same payload for the bitmap can be used in PIs addressing transmissions for different numerologies. Moreover, the PIs addressing different transmissions with different numerologies may refer to the same reference time-frequency region. For example, for a given location, if a reference region has 16 RBs in frequency and 14 symbols in time for a given numerology, say 15 kHz, and the bitmap payload in PI is 14 bits and two frequency partitions and seven time partitions are configured, then the UE receiving a transmission based on {15 kHz SCS, 30 kHz SCS, 60 kHz SCS} would determine time and frequency granularity to be {2,4,8} symbols and {8, 4, 2} RBs, respectively. Alternatively, a UE receiving transmissions based on {15 kHz SCS, 30 kHz SCS, 60 kHz SCS} would determine the time duration and frequency range of reference region to be {14,28,56} symbols and {16, 8, 4} RBs, respectively, for a given location of the reference region. Alternatively, UEs may be notified of the location of the reference region only, (e.g., starting position in time and/or frequency) and size (i.e., range in frequency and duration in time) can be obtained implicitly from the configured time and/or frequency granularity and configuration of the bitmap used in PI (i.e., how many time and/or frequency partitions are configured within reference region).

For the calculations above, it is assumed that the effective pre-emption region (i.e., the region where pre-emption can occur) is same as the reference region. The reference region may or may not contain time-frequency resources which are exempted from pre-emption. Hence, in some cases, the effective pre-emption region may contain non-contiguous time-frequency resources and have a size less than reference region. In that case, the time-frequency region of the effective pre-emption region is taken into account for configuring one or more of indication granularity, number of time and/or frequency partitions within the region that the PI addresses.

More generally, similar examples as above can be considered when the default/reference numerology is one of 15 KHz, 30 kHz or 60 kHz, and UEs receive transmissions with 15 Khz or 30 KHz or 60 KHz.

In another embodiment, the numerology used for time-frequency region configuration and PDCCH/PDSCH reception is the same for the UEs monitoring the indication. For example, the starting RB index and frequency range (in RBs) of the region are notified to the UEs for the numerology. Alternatively, the numerology used for time-frequency region configuration and PDCCH/PDSCH reception are different for the UEs monitoring the indication. The numerology used for configuring pre-emption granularity can be the same or different than the numerology used in PDCCH/PDSCH. In one example, UEs receiving transmissions based on a particular numerology receive PI where the configured granularity is also based on the particular numerology. In one embodiment, different PIs are configured, and each PI provides pre-emption information for eMBB transmissions with one numerology and based on configured granularity for that numerology. Different PIs may correspond to same or different reference time-frequency region.

In one example, time and frequency granularity can be configured with different numerologies.

In one example, a UE receives configuration information of a reference region with starting and ending position (or a range) in frequency and starting position and ending position (or a range) in time within monitoring periodicity of PI. The range can be x RBs and y symbols based on a reference numerology or based on the numerology in which the latency tolerant UEs receive PDCCH/PDSCH.

In one example, for set 1 in Table 1, a UE receives configuration information of a region with starting and ending position (or a range) in frequency and starting position and ending position (or a range) in time within the monitoring periodicity of PI. The configured granularity is based on the same numerology as that of the region. In another example, for set 2, a region is configured based on a default numerology whereas data transmission and granularity is based on the same numerology, which is different than the numerology used for configuring the region. For example, according to set 2 where the same configuration of a reference region can be used for UEs receiving transmissions with different numerologies, if the reference region is N RBs in frequency and M symbols in time based on 15 kHz, then this is equivalent to N/4 RBs in frequency and 4M symbols (with the same CP overhead) in time for UEs receiving transmissions with 60 kHz. This is assuming RB grid and symbol alignment. Hence, the area of a reference region can be same for all UEs, however the number of RBs and/or symbols in the region can be different for different numerologies and can be scalable across numerologies. For set 3, the reference region and granularity are configured with a default/reference numerology that can be different from the data numerology, i.e., a common granularity grid is adopted in frequency and time for all UEs, irrespective of the numerologies used for data transmission. For example, there can be M time divisions and N frequency divisions (MN total divisions in time-frequency) configured in the reference region and the time granularity or duration of a division is K symbols and the frequency granularity is L RBs. If the reference numerology is f0 kHz and the data numerology is $2^N$*f0 kHz, then for each unit region pre-empted, the UE would find $2^N$*K symbols and $2^{-N}$*L RBs pre-empted. On the other hand, If the reference numerology is f0 kHz and data numerology is $2^N$*f0 kHz, then for each unit region pre-empted, the UE would find $2^{-N}$*K symbols and $2^N$*L RBs pre-empted. K and L may be chosen such that they are evenly divisible for other numerologies. In one example, values of K and L depend on the numerologies coexisting in a carrier. In another example, K and L can be integer multiples of 2. In another example, K and L can be $2^N$, where N is a positive integer.

For Set 4, independent numerology configurations can be applied for reference region, data, and granularity.

In some examples, different time granularities can coexist in the duration of the reference region. For example, the duration of the reference region is 14 symbols and the time granularity is 4 symbols. In that case, there are three divisions of granularity 4 symbols and one division with granularity 2 symbols. Similarly, different frequency granularities can coexist in the frequency range of the reference region. For example, the range of reference region is 14 RBs and the frequency granularity is 4 RBs. In that case, there are three divisions of granularity 4 RBs and one division with granularity 2 RBs. The UE can receive this configuration semi-statically. If a granularity is configured such that the range and/or duration of reference region is not integer multiple of the granularity, it may be possible that at one end of the time/frequency region, a different granularity in time/frequency is configured, which can be smaller or larger than configured granularity. The UE may obtain this configuration explicitly or implicitly from the configuration of the reference region, i.e., size in time/frequency, and the configured granularity in time/frequency.

In another example, the configured granularity in time and/or frequency can be implicitly derived from the configuration of the reference region and the configuration of a bitmap or the payload of a bitmap in the PI. Configuration of the reference time-frequency region, which may include location and size in time and/or frequency, can be notified by RRC signaling to the UE. Similarly, for a given payload of PI or payload of bitmap in the PI, how may partitions in time and/or in frequency are configured within the reference region can also be semi-statically indicated to the UEs, e.g., by RRC signaling or system information. For example, for a given N-bit payload in PI, x time partitions and y frequency partitions are configured and notified to UEs. Then, granularity in time and in frequency can be obtained implicitly from the indicated frequency range (within carrier BW) and time duration (within monitoring periodicity of PI) of the reference region and how many time and/or frequency partitions are configured for a given payload of PI. If PI has payload of N bits, which contains at least a bitmap to indicate pre-emption events within the reference region, x partitions in time and y partitions in frequency would require xy bits for the payload of bitmap, say M=xy bits, where N=>M. Note that different sets of values for the pair {x,y} are possible which can satisfy M=xy, and one configuration of pair {x,y} is indicated to the UE, either by RRC or dynamically in DCI. For example, if there are 6 bits used in the bitmap payload of PI, which correspond to three time divisions and two frequency divisions, and if reference region contains 20 RBs in frequency and 9 symbols in time, then the frequency and time granularity can be determined as 10 RBs and 3 symbols for the given numerology. Note that the bitmap may jointly indicate time-frequency pre-emption locations. Alternatively, for each time division/granularity, a bitmap may indicate frequency domain pre-emption information, in which case there would be a 2-bit bitmap for each time division. The least significant bit (LSB) indicates pre-emption at larger frequency (top RBs) and the most significant bit (MSB) corresponds to smaller frequency (bottom RBs), although this is only an example and other arrangements are possible. Note that 2 bits for each time division is an example, and more generally any integer number of bits can represent the pre-emption information, of which LSBs and MSBs may indicate top and bottom frequency partition/division respectively or vice versa.

In one example, for each set considered in Table 1, the numerology used for decoding PI in a CORESET can be the same or different than the numerology used for data.

In some examples, frequency granularity or division may be boundary aligned with RBs or RBGs of the largest sub-carrier spacing coexisting in the carrier. Similarly, time granularity or division may be boundary aligned with one or more symbols of the smallest sub-carrier spacing coexisting in the carrier. Ensuring this may avoid confusion at the UE side as to whether fraction of an RB or a symbol is pre-empted.

Embodiments described herein may be used to implement dynamic resource sharing between eMBB traffic and URLLC traffic. This can be done by puncturing resources scheduled to eMBB, or without puncturing resources scheduled to eMBB, e.g. as detailed above.

In some embodiments, scheduling between eMBB and URLLC is independent, for example when at least some eMBB traffic is transmitted in a dedicated sub-band that does not also carry URLLC traffic. In some embodiments, scalable numerologies are used to serve eMBB UEs depending on the latency requirement of URLLC. The numerologies used in a frequency band may have a scalable relationship in different regions, e.g. one sub-band may have a subcarrier spacing of 15 kHz×$2^i$, and another sub-band may have a subcarrier spacing of 15 kHz×$2^j$, where i and j are integers, i≥0 and j>i. The numerologies used may additionally or alternatively have a scalable relationship between low latency and latency tolerant traffic, e.g. eMBB data may have a subcarrier spacing of 15 kHz×$2^i$, and URLLC data may have a subcarrier spacing of 15 kHz×$2^j$, where i and j are integers, i≥0 and j>i.

In some embodiments described above, scheduled latency tolerant data is punctured. i.e. not sent, and the freed resources are used to instead transmit low latency data. If the punctured data, or a variation thereof (e.g. a different redundancy version of the punctured data), is possibly sent to the latency tolerant UE at a later time, then the punctured data may be said to be "postponed". Puncturing a transmission may alternatively referred to as 'pre-empting' a transmission. Hence, puncturing indicator may be called pre-emption indicator.

Figure 25:
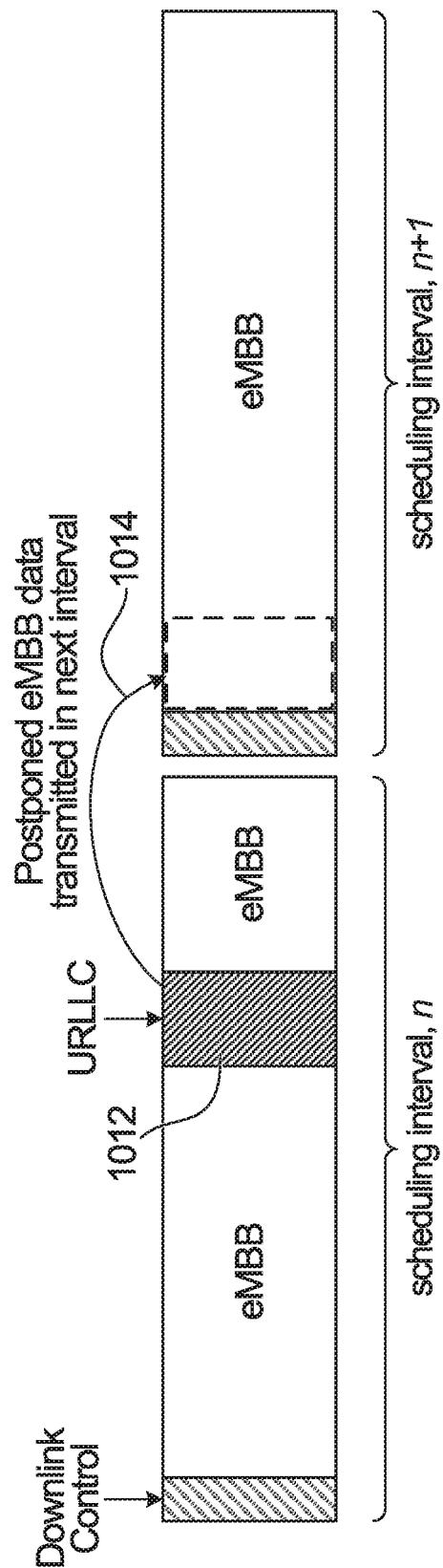
FIGS. 25 to 27 illustrate the transmission of postponed data according to different embodiments.

In some embodiments, when a base station schedules eMBB traffic in a downlink co-existence region during an eMBB scheduling interval, and then URLLC traffic arrives, some of the scheduled eMBB traffic may be postponed. e.g. transmitted in a later scheduling interval, so that resources are available to transmit the URLLC traffic. For example, FIG. 25 illustrates two eMBB scheduling intervals in a coexistence region. eMBB traffic is initially scheduled in scheduling interval n. However, after the eMBB traffic is scheduled in scheduling interval n, URLLC data arrives to be transmitted in the downlink. Therefore, the base station postpones some of the eMBB data in scheduling interval n and instead transmits the URLLC data, as shown at 1012. The eMBB traffic is punctured and then transmitted in a later scheduling interval.

In the embodiment shown in FIG. 25, the eMBB scheduling interval is longer than a URLLC transmission slot, which may necessitate the downlink transmission of a URLLC packet during an eMBB scheduling interval in order to satisfy the latency requirements of the URLLC traffic.

The postponed eMBB data may be transmitted in different ways. For example, the postponed data actually removed from scheduling interval n may be transmitted in a later scheduling interval, as at 1014. Alternatively, a different coded version, e.g. different redundancy version, of the originally scheduled packet in scheduling interval n may be transmitted at the later scheduling interval.

The transmission of the postponed data may be performed automatically by the base station, i.e. the base station transmits the postponed data without feedback from the eMBB UE. For example, the base station does not wait for an acknowledgement ("ACK") or negative acknowledgement ("NACK") from the eMBB UE indicating whether the eMBB UE successfully decoded the eMBB packet (with missing data) in scheduling interval n. In the example illustrated in FIG. 25, the base station automatically transmits the postponed data in the next scheduling interval. In an alternative embodiment, the transmission of the postponed data may be HARQ based, i.e. the base station first waits for an ACK or NACK from the eMBB UE indicating whether the eMBB successfully decoded the partially postponed eMBB packet in scheduling interval n. Then, if a NACK is received, i.e. the eMBB packet (with missing data) was not successfully decoded, the base station transmits: the missing data, or the original eMBB packet at a different redundancy version.

The base station may take different factors into account when deciding whether to automatically transmit the postponed eMBB data, or whether to instead use HARQ based transmission of the postponed data. For example, if a large fraction of the eMBB data in the eMBB packet is being postponed, then the postponed data may be automatically transmitted instead of using HARQ feedback, because the eMBB UE would have a low probability of successfully decoding the received portion of the packet. As another example, if there is an unacceptable delay in time before an ACK or NACK could be received by the base station, for example because there is no upcoming uplink transmission opportunity, then the postponed data may be automatically transmitted instead of using HARQ feedback. As a third example, if the code rate of the postponed data is high, then the postponed data may be automatically transmitted instead of using HARQ feedback because the packet may not have sufficient redundancy to be decoded without the punctured portion.

When the UE receives the eMBB packet having missing data, the UE may decide to try to decode the packet based on how much eMBB data is missing. For example, if a large portion of the eMBB packet was punctured, then the UE may not try to decode the packet.

The postponed eMBB data may be scheduled in different ways. For example, the postponed eMBB data may be appended to another eMBB packet destined for the eMBB UE. As another example, the postponed eMBB data may be scheduled separately from other eMBB packets destined for the eMBB UE. In general, the length of the scheduling interval during which the postponed data is transmitted may be different from the length of scheduling interval n. In one example, the postponed data that is transmitted later can be based on code block groups of the impacted transport block. In one example, further scheduling of postponed data can be based on a mini-slot interval whereas the original transmission was based on a slot interval. The frequency domain resources used to transmit the postponed data may also be different. In general, the resources required for transmitting the postponed data can be allocated in any suitable manner. The length of scheduling intervals n and n+1 in FIG. 25 are the same duration, but this is only an example.

Figure 26:
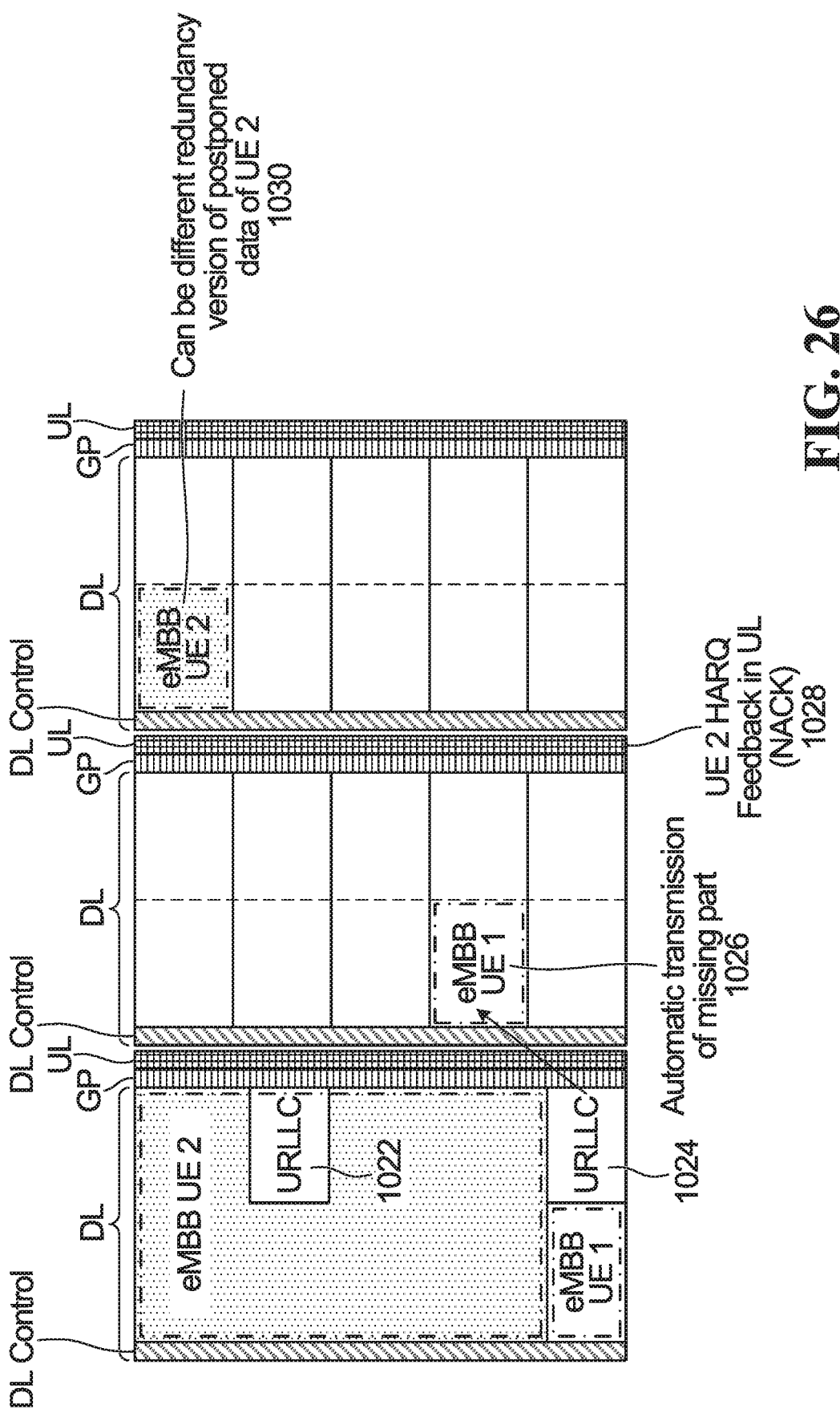

FIG. 26 illustrates two examples of the transmission of postponed data. "DL" indicates the downlink, "GP" indicates the guard period, and "UL" indicates the uplink. Three downlink dominated sub-frames are illustrated in FIG. 26. eMBB traffic for eMBB UE 1 and eMBB UE 2 are scheduled in the first sub-frame. However, after scheduling the eMBB traffic, some URLLC traffic arrives to be transmitted in the downlink. The base station therefore postpones a portion of the eMBB UE 2 traffic, and transmits URLLC traffic instead, as shown at 1022. The base station also postpones a portion of the eMBB UE 1 traffic, and transmits URLLC traffic instead, as shown at 1024.

Because a relatively large portion of the eMBB UE 1 packet is postponed, the UE 1 postponed data is automatically transmitted by the base station in a later sub-frame, as shown at 1026.

Because a relatively small portion of eMBB UE 2 packet is postponed, the transmission of the postponed data for UE 2 is HARQ based. The base station waits for HARQ feedback from UE 2 indicating whether or not UE 2 was able to successfully decode the eMBB data transmitted in the first downlink sub-frame. In the example illustrated in FIG. 26, the UE 2 is not able to successfully decode the data, and this is indicated by a NACK transmitted in the uplink, as shown at 1028. The base station therefore sends a retransmission of at least the punctured portion of the unsuccessfully decoded eMBB packet, e.g. at a higher redundancy version, as shown at 1030. If the UE 2 was able to successfully decode the eMBB packet, then an ACK would be sent instead and the base station would not have to send a retransmission at 1030.

In the example illustrated in FIG. 26, UE 1 sends a single ACK or NACK after receiving the postponed transmission and combining the postponed eMBB data with the original eMBB data. UE 2 sends two HARQ feedback messages: one for the initial eMBB data at 1028, and another one acknowledging (or negative acknowledging) the retransmission sent at 1030.

In FIG. 26, the UE 2 HARQ feedback 1028 is shown as being transmitted in the uplink portion of the second sub-frame. Alternatively, depending upon the processing speed of UE 2, the HARQ feedback may be sent earlier (e.g. in the uplink portion of the first sub-frame) or later (e.g. in the uplink portion of the third sub-frame).

In some embodiments, postponing eMBB transmission may not be preferred, depending upon the amount of resources reassigned to URLLC traffic. If the eMBB data is scheduled over multiple URLLC slots, then the more important eMBB data, e.g. the systematic bits, may be transmitted over the first slots. Then, if some slots at or near the end of the eMBB scheduling interval are reassigned to incoming URLLC traffic, the eMBB UE may have a better chance of decoding the eMBB packet. If the eMBB packet is successfully decoded, then the missing/postponed data does not have to be transmitted by the base station in a later interval.

Depending on the amount of the eMBB transmission that is postponed due to URLLC traffic, the base station may decide different options for whether and how to transmit missing eMBB data. For example, the base station may: (1) transmit the same postponed data; (2) transmit a different redundancy version of the original packet; (3) choose not to transmit the missing data. If there is a large volume of URLLC traffic, a relatively large portion of the eMBB data may be postponed, and the eMBB UE may wait for the rest of the packet to be transmitted in a later interval instead of attempting to decode the initially transmitted portion. The base station may schedule the rest of the packet in a subsequent interval (either automatically or HARQ based). The subsequent interval may or may not be the immediate next interval. On the other hand, if a relatively small portion of the eMBB data is missing, the eMBB UE may try to decode the data and can send HARQ feedback. If a NACK is received, the base station can send the missing data or a different redundancy version of the original packet.

Figure 27:
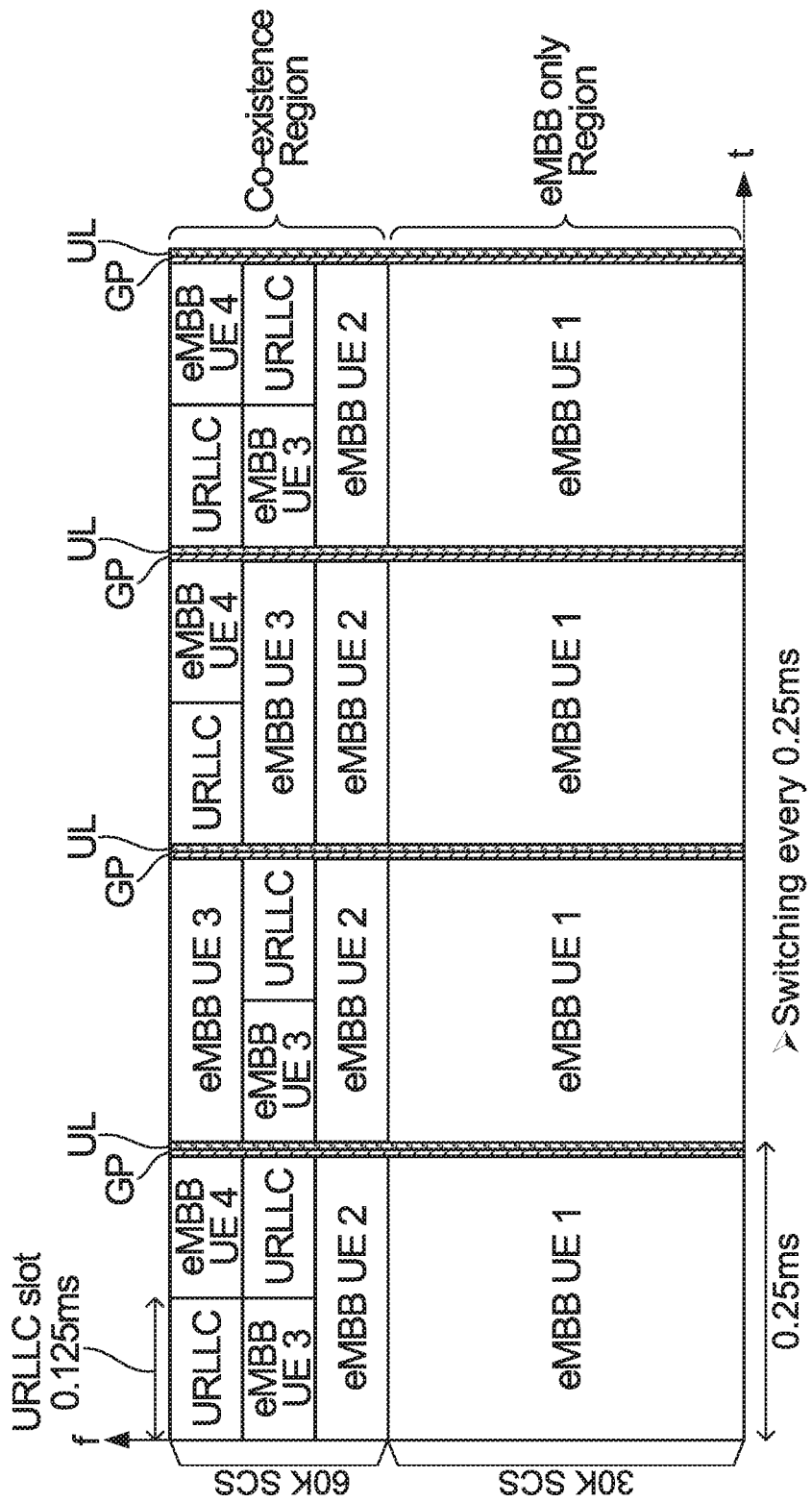

FIG. 27 illustrates an example in which four downlink dominated sub-frames are transmitted, each sub-frame having an eMBB only region and a co-existence region. The portion of the sub-frames that is not shown in hatching is downlink. eMBB UE configuration may support multiple slot aggregation/bundling. However, how many slots are actually used for a scheduled eMBB transmission depends on when the URLLC packet arrives. For example, eMBB UE 4 has its traffic scheduled in individual slots, without bundling. eMBB UE 3 has 2-slot bundling, and so its traffic is scheduled in units of two URLLC slots. Sometimes the second slot in the sub-frame is assigned to URLLC traffic. Traffic for eMBB UE 2 is scheduled in units of 8 bundled slots, and in the example illustrated in FIG. 27 none of the data for eMBB UE 2 is reassigned to URLLC traffic. eMBB UE 1 is scheduled in the eMBB only region.

In the example illustrated in FIG. 27, there may be dynamic orthogonal resource sharing between eMBB traffic and URLLC traffic. The eMBB UEs scheduled in the coexistence region may need to monitor URLLC presence in the coexistence region. In some embodiments, an URLLC indicator may be placed in every slot or at the end of the eMBB scheduling interval. The URLLC indicator indicates to the eMBB if one or more slots in the eMBB scheduling interval have been reassigned to URLLC traffic.

If URLLC packets arrive, ongoing eMBB transmission may be postponed for one or more slots. The large eMBB packets for eMBB UE 1 are scheduled in the eMBB only region, and so eMBB UE 1 does not need to monitor for URLLC presence. ACK/NACK can be based on a group of transmissions. For example, an eMBB UE having some data postponed may wait until the postponed data is received at a later slot before trying to decode the original packet and before sending an ACK/NACK for the packet.

The switching time between downlink and uplink in FIG. 27 may be fixed, or may change based on the URLLC latency requirement. For example, an uplink region may need to be present more often for low latency applications in order to timely receive ACK/NACK messages for the URLLC traffic sent by the base station.

Other Methods

FIG. 28 is a method performed by base station 100, according to one embodiment. Optionally, in step 2002, the base station 100 transmits signaling to the UEs. The signaling semi-statically configures first downlink time-frequency resources. In step 2004, the base station 100 transmits a first transmission of first data over a first time duration in the first downlink time-frequency resources. In step 2006, the base station 100 transmits a second transmission of second data over a second time duration in the first downlink time-frequency resources. The second time duration is shorter than the first time duration, and the second time duration aligns with an integer number of OFDM symbols of the first time duration. Optionally, in step 2008, the base station 100 transmits signaling that dynamically updates the frequency range of the first downlink time-frequency resources.

FIG. 29 is a method performed by a UE, according to one embodiment. Optionally, in step 2102, the UE receives signaling that semi-statically configures first uplink time-frequency resources. In step 2104, the UE transmits a first transmission of first data over a first time duration in the first uplink time-frequency resources. In step 2106, the UE transmits a second transmission of second data over a second time duration in the first uplink time-frequency resources. The second time duration is shorter than the first time duration, and the second time duration aligns with an integer number of OFDM symbols of the first time duration. Optionally, in step 2108, the UE receives signaling that dynamically updates the frequency range of the first uplink time-frequency resources.

Figure 30:
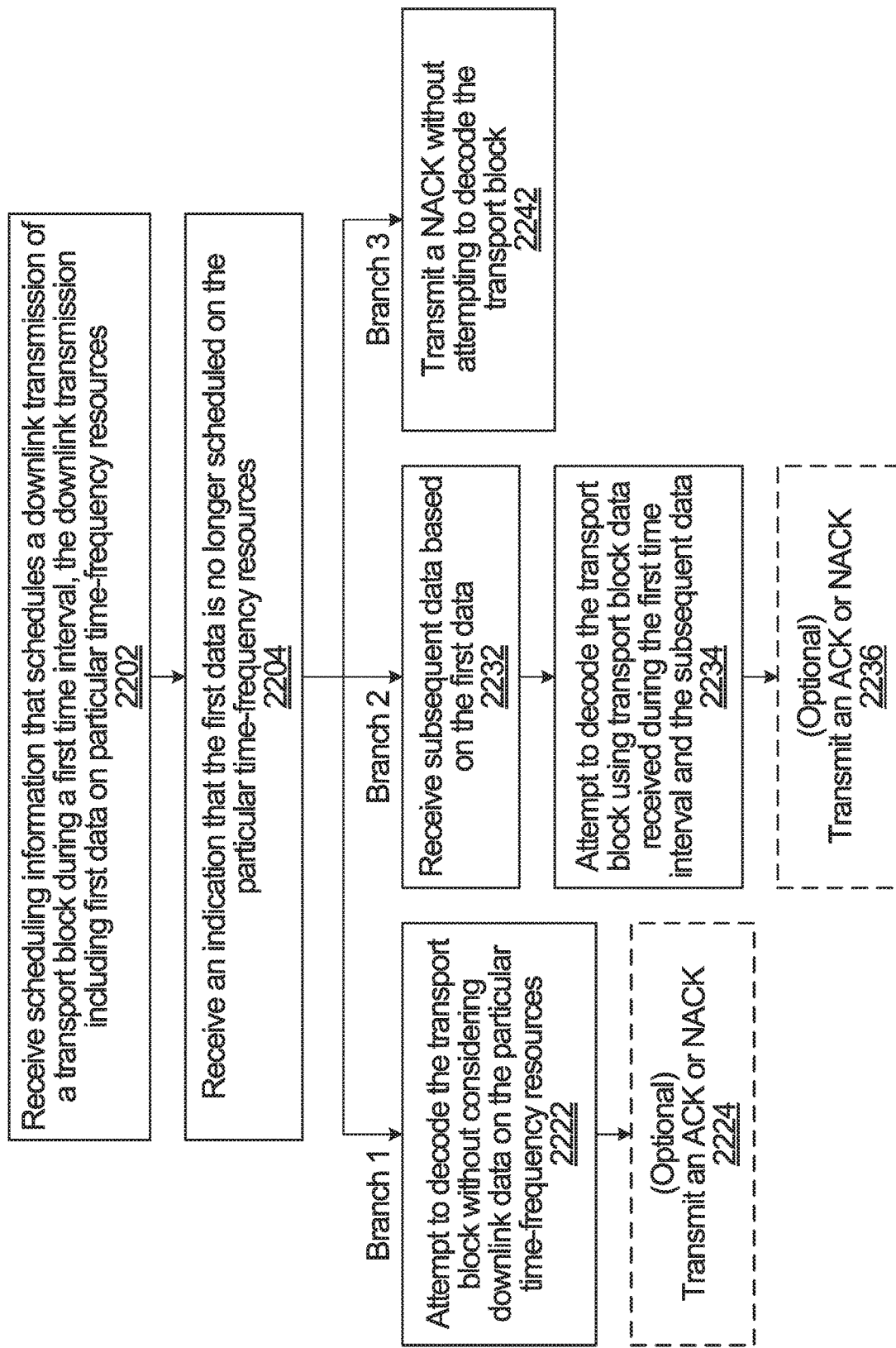

FIG. 30 is a method performed by a UE, according to another embodiment. In step 2202, the UE receives scheduling information that schedules a downlink transmission of a transport block for the UE during a first time interval. The downlink transmission includes first data on particular time-frequency resources. In step 2204, the UE receives an indication that indicates that the first data is no longer scheduled on the particular time-frequency resources. In some embodiments, the indication is received after receiving some of the downlink transmission, although this is not necessary.

After receiving the indication, one of three different series of operations may be performed by the UE, each one illustrated in a respective branch in FIG. 30.

Branch 1: In step 2222, the UE attempts to decode the transport block without considering downlink data on the particular time-frequency resources. Optionally, in step 2224, the UE transmits HARQ feedback: an ACK if the transport block is successfully decoded or a NACK if the transport block is unsuccessfully decoded.

Branch 2: In step 2232, the UE receives subsequent data based on the first data, e.g. the subsequent data may be the first data or a different redundancy version of the first data. The subsequent data may be received during a subsequent time interval. In step 2234, the UE then attempts to decode the transport block without considering downlink data on the particular time-frequency resources, but using the other transport block data received during the first time interval and the subsequent data. Optionally, in step 2236, the UE transmits HARQ feedback: an ACK if the transport block is successfully decoded or a NACK if the transport block is unsuccessfully decoded.

Branch 3: In step 2242, the UE sends a NACK without attempting to decode the transport block, e.g. because too much of the transport block is not received during the first time interval. Step 2242 may be performed when the first data is punctured from the transport block and is not sent during a subsequent time interval. If too much of the transport block is not received, then attempting to decode the transport block is not worth it because decoding will likely fail. In another embodiment, the UE may have decoded some CBs of the TB while some CBs are pre-empted. If the UE is not configured with CB-level HARQ feedback, the UE may send a NACK corresponding to the TB. If the UE is configured for CB-level HARQ feedback, it can send ACK for CBs that were decoded and NACK for the pre-empted ones.

ADDITIONAL EXAMPLES

Example 1

A method comprising: communicating using time division duplex frames, each time division duplex frame comprising at least two sub-frames including a first sub-frame, each sub-frame having a downlink segment, an uplink segment and a guard period separating the downlink segment from the uplink segment; for each time division duplex frame, transmitting scheduling information in respect of downlink traffic of a first type using a scheduling interval equal to the duration of one time division duplex frame; for each sub-frame, transmitting scheduling information in respect of downlink traffic of a second type using a scheduling interval equal to the duration of one sub-frame.

Example 2

The method of example 1 further comprising: for at least one time division duplex frame, at some time after the first sub-frame, transmitting update information that updates the scheduling information in respect of downlink traffic of the first type in a sub-frame other than the first sub-frame.

Example 3

The method of example 2 wherein the update information indicates one or more time-frequency resources that were initially scheduled for traffic of the second type in a sub-frame other than the first sub-frame are now no longer being scheduled for traffic of the second type.

Example 4

The method of example 2 further comprising determining for a given time division duplex frame whether to transmit the update information to update the scheduling information by: receiving ACK/NACK information in respect of traffic of the second type; using the received ACK/NACK information to determine whether to puncture resources scheduled for traffic of the first type to allow retransmission of a block of traffic of the second type, the update information identifying the punctured resources.

Example 5

The method of example 2 further comprising determining for a given time division duplex frame whether to transmit the update information to update the scheduling information by: identifying the existence of new data to send using traffic of the second type or determining an amount of new data to send using traffic of the second type; determining whether to puncture resources scheduled for traffic of the first type to allow transmission of new data using traffic of the second type based on the identified existence or the determined amount, the update information indicating the punctured resources.

Example 6

The method of example 2 further comprising determining for a given time division duplex frame whether to transmit the update information to update the scheduling information by: receiving ACK/NACK information in respect of traffic of the first type; based on the received ACK/NACK information, determining whether to re-assign some resources as between receivers of traffic of the first type, the update information indicating the re-assignment of resources.

Example 7

The method of example 1 wherein scheduling traffic of the second type comprises scheduling a block of traffic of the second type during one of the sub-frames, and scheduling the same block of traffic of the second type during another of the sub-frames with or without frequency hopping.

Example 8

The method of example 1 further comprising: transmitting some of the traffic of the first type in a first sub-band with a first sub-carrier spacing; transmitting traffic of the second type in a second sub-band with a second sub-carrier spacing; transmitting some of the traffic of the first type in the second sub-band with the second sub-carrier spacing.

Example 9

The method of example 1 wherein orthogonal scheduling is used as between traffic of the first type and traffic of the second type.

Example 10

The method of example 1 wherein non-orthogonal scheduling is used as between traffic of the first type and traffic of the second type such that for at least some time-frequency resources traffic of the first type is superimposed with traffic of the second type.

Example 11

The method of example 8 wherein a time division duplex frame has two sub-frames, and the first sub-carrier spacing is 30 kHz and the second sub-carrier spacing is 60 kHz.

Example 12

The method of example 1 wherein a time division duplex frame has four sub-frames, and a sub-carrier spacing of 60 kHz is used for traffic of the first type and traffic of the second type.

Example 13

The method of example 1 further comprising: transmitting some of the traffic of the first type in a first sub-band with a first sub-carrier spacing; transmitting traffic of the second type in a second sub-band with a second sub-carrier spacing; transmitting some of the traffic of the first type in the second sub-band with the second sub-carrier spacing; dynamically revising sub-band bandwidths as between one time division duplex frame and a subsequent time division duplex frame.

Example 14

The method of example 1 further comprising: transmitting some of the traffic of the first type in a first sub-band with a first sub-carrier spacing; transmitting traffic of the second type in a second sub-band with a second sub-carrier spacing; transmitting some of the traffic of the first type in the second sub-band with the second sub-carrier spacing; dynamically revising the number of sub-frames as between one time division duplex frame and a subsequent time division duplex frame.

Example 15

A method comprising: communicating using time division duplex frames, each time division duplex frame comprising at least two sub-frames including a first sub-frame, each sub-frame having a downlink segment, an uplink segment and a guard period separating the downlink segment from the uplink segment; for each sub-frame, transmitting scheduling information in respect of downlink traffic of a first type using a scheduling interval equal to the duration of one sub-frame; for each sub-frame, transmitting scheduling information in respect of downlink traffic of a second type using a scheduling interval equal to the duration of one sub-frame.

Example 16

A base station configured to implement the method of any one of examples 1 to 15.

Example 17

A UE to configured to receive transmissions generated in accordance with the method of any one of examples 1 to 15.

Example 18

A method performed by a base station, the method comprising:
scheduling a transmission of first data to a first user equipment (UE) on first resources; postponing some of the first data and instead transmitting second data to a second UE on a portion of the first resources.

Example 19

The method of example 18, further comprising: subsequently sending a transmission associated with the first data.

Example 20

The method of example 18, wherein subsequently sending a transmission associated with the first data comprises: subsequently transmitting the postponed first data.

Example 21

The method of example 18, wherein subsequently sending a transmission associated with the first data comprises: subsequently transmitting a retransmission corresponding to the first data.

Example 22

The method of example 21, wherein the retransmission has a higher redundancy version.

Example 23

The method of example 21 or example 22, wherein subsequently transmitting the retransmission is in response to a NACK received from the first UE.

Example 24

The method of any one of examples 18 to 23, wherein the transmission of first data to the first UE is sent over multiple slots.

Example 25

The method of example 24, wherein more important data (e.g. systematic bits) are transmitted at or near the start of the first data transmission.

Example 26

The method of any one of examples 18 to 25, wherein the first data is eMBB data and the second data is URLLC data.

Example 27

A base station configured to perform the method of any one of examples 18 to 26.

Example 28

A UE configured to receive one or more transmissions generated in accordance with the method of any one of examples 18 to 26.

Example 29

A method comprising: transmitting traffic of a first type within a scheduling interval using a first numerology; transmitting traffic of a second type within at least one time slot of a plurality N of possible time slots using a second numerology, wherein the scheduling interval is N times greater than one of a duration one time slot, and the N possible time slots are aligned with the first scheduling interval; wherein a time frequency resource used to transmit the traffic of the second type is obtained by puncturing or reallocating or is overlapping with, or co-existing with a time frequency resource scheduled for the traffic of the first type.

Example 30

The method of example 29 further comprising: transmitting an indication for a receiver of traffic of the first type that some of a time frequency resource scheduled to the receiver is used by traffic of the second type.

Example 31

The method of example 30 further comprising: determining whether to transmit the traffic of the second type on a per time slot basis; transmitting the indication on a per time slot basis in advance of the time slot.

Example 32

The method of example 30 further comprising: determining whether to transmit the traffic of the second type on a per time slot basis; transmitting the indication as a collective indication for all time slots on a per first scheduling interval basis.

Example 33

A method comprising: transmitting traffic of a first type within a first scheduling interval using a first sub-carrier spacing, the first scheduling interval accommodating K symbol locations for transmitting K OFDM symbols with the first sub-carrier spacing; transmitting traffic of a second type using at least one of N×K possible symbol locations for symbols using a second sub-carrier spacing, wherein each symbol location for the first sub-carrier spacing is aligned with N symbol locations for the second sub-carrier spacing; wherein a time frequency resource used to transmit the traffic of the second type is obtained by puncturing or reallocating a time frequency resource scheduled for the traffic of the first type.

Example 34

The method of example 33 further comprising: transmitting an indication for a receiver of traffic of the first type that some of a time frequency resource scheduled to the receiver has been punctured/reallocated.

Example 35

The method of example 34 further comprising: determining whether to transmit the traffic of the second type on periodic basis; transmitting the indication on a period basis in advance a symbol for traffic of the first type that has been punctured.

Example 36

The method of example 34 further comprising: determining whether to transmit the traffic of the second type on periodic basis; transmitting the indication as a collective indication for all time slots on a per first scheduling interval basis.

Example 37

A method comprising: within a scheduling interval for traffic of the first type, performing the method of example 29 for some traffic of the second type, and the method of example 5 for some traffic of the second type.

Example 38

The method of any one of examples 29 to 37 performed within a downlink portion of a self-contained TDD architecture in which each self-contained frame has a downlink portion, a guard period and an uplink portion.

Example 39

A method comprising: within a bandwidth available for both uplink grant-based traffic and uplink grant-free traffic, and within a scheduling interval for uplink grant-based traffic, defining allocation regions having a duration equal to a grant-free transmission interval, each region accommodating N uplink OFDM symbols for grant-based traffic using a first sub-carrier spacing, and accommodating N×K uplink OFDM symbols for grant-based traffic using a second sub-carrier spacing, where N>=1, K>=2; scheduling uplink transmission for grant-based traffic in one or more of the allocation regions; mapping a grant-free transmitter to an allocation region such that the grant-free transmitter can make a grant-free transmission using the allocation region if it has traffic to send.

Example 40

The method of example 39 wherein for at least one of the allocation regions, grant-based traffic is scheduled and a grant-free transmitter is mapped, such that if the grant-free transmitter has traffic to send there will be a collision of grant-based traffic with the first sub-carrier spacing with grant-free traffic with the second sub-carrier spacing.

Example 41

The method of any one of examples 29 to 38 wherein the traffic of the first type is eMBB traffic, and the traffic of the second type is URLLC traffic.

Example 42

The method of any one of examples 38 to 40 wherein the traffic of the first type is eMBB traffic, and the traffic of the second type is URLLC traffic.

Example 43

A base station configured to implement the method of any one of examples 29 to 42.

Example 44

A user equipment configured to receive transmissions generated in accordance with the method of any one of examples 29 to 42.

Example 45

A method performed by a base station, the method comprising: transmitting scheduling information that schedules a downlink transmission of first data to a first UE on first resources; transmitting update information to the first UE, the update information indicating that the first data is no longer scheduled on the first resources; transmitting second data for a second UE on the first resources.

Example 46

The method of example 45, wherein the first resources are in a first frequency sub-band, and further comprising transmitting a scheduled downlink transmission to a third UE in a second frequency sub-band.

Example 47

The method of example 46, further comprising transmitting signaling indicating a change in a bandwidth of the first frequency sub-band.

Example 48

The method of example 47, wherein the bandwidth of the first frequency sub-band is changed based on a traffic load of UEs that have a lower latency requirement than other UEs.

Example 49

The method of example 47, wherein the signaling indicates the presence of a time interval during which there is no second frequency sub-band.

Example 50

The method of any one of examples 45 to 49, wherein transmission of the second data uses a different numerology from the first data.

Example 51

The method of example 50, wherein the transmission of the second data uses a different sub-carrier spacing from the first data.

Example 52

The method of example 51, wherein the second data is sent in a time interval having boundaries that align with a time interval during which the first data was scheduled.

Example 53

The method of example 52, wherein multiple OFDM symbols of the second data are sent over a first time duration, the first time duration having boundaries aligned in time with a second time duration during which a single OFDM symbol of the first data would have been sent.

Example 54

The method of any one of examples 45 to 53, further comprising transmitting the first data to the first UE on second resources different from the first resources.

Example 55

The method of example 54, wherein the second resources are later in time than the first resources.

Example 56

The method of example 54 or 55, wherein the first data is transmitted on the second resources without waiting for a NACK or an ACK from the first UE.

Example 57

The method of any one of examples 54 to 56, wherein the first data is appended to another packet destined for the first UE.

Example 58

The method of any one of examples 54 to 56, wherein the first data is scheduled separately from other packets destined for the first UE.

Example 59

The method of any one of examples 54 to 56, wherein the first data is scheduled on the second resources during a first scheduling interval, the first scheduling interval having a time duration that is different from the time duration of a second scheduling interval during which a packet for the first UE is scheduled.

Example 60

The method of any one of examples 45 to 59, wherein the first data is part of a packet destined for the first UE, and further comprising transmitting systematic bits of the packet before a scheduled transmission time of the first data.

Example 61

The method of any one of examples 45 to 60, wherein the second UE has a lower latency requirement than the first UE.

Example 62

A base station comprising a transmitter to: transmit scheduling information that schedules a downlink transmission of first data to a first UE on first resources; transmit update information to the first UE, the update information indicating that the first data is no longer scheduled on the first resources; transmit second data for a second UE on the first resources.

Example 63

The base station of example 62, wherein the first resources are in a first frequency sub-band, and the transmitter is further to transmit a scheduled downlink transmission to a third UE in a second frequency sub-band.

Example 64

The base station of example 63, wherein the transmitter is further to transmit signaling indicating a change in a bandwidth of the first frequency sub-band.

Example 65

The base station of example 64, wherein the bandwidth of the first frequency sub-band is changed based on a traffic load of UEs that have a lower latency requirement than other UEs.

Example 66

The base station of example 64, wherein the signaling indicates the presence of a time interval during which there is no second frequency sub-band.

Example 67

The base station of any one of examples 62 to 66, wherein transmission of the second data uses a different numerology from the first data.

Example 68

The base station of example 67, wherein the transmission of the second data uses a different sub-carrier spacing from the first data.

Example 69

The base station of example 68, wherein the second data is to be sent in a time interval having boundaries that align with a time interval during which the first data was scheduled.

Example 70

The base station of example 69, wherein multiple OFDM symbols of the second data are to be sent over a first time duration, the first time duration having boundaries aligned in time with a second time duration during which a single OFDM symbol of the first data would have been sent.

Example 71

The base station of any one of examples 62 to 70, wherein the transmitter is to transmit the first data to the first UE on second resources different from the first resources.

Example 72

The base station of example 71, wherein the second resources are later in time than the first resources.

Example 73

The base station of example 71 or 72, wherein the first data is to be transmitted on the second resources without waiting for a NACK or an ACK from the first UE.

Example 74

The base station of any one of examples 71 to 73, wherein the first data is to be appended to another packet destined for the first UE.

Example 75

The base station of any one of examples 71 to 73, wherein the first data is to be scheduled separately from other packets destined for the first UE.

Example 76

The base station of any one of examples 71 to 73, wherein the first data is to be scheduled on the second resources during a first scheduling interval, the first scheduling interval having a time duration that is different from the time duration of a second scheduling interval during which a packet for the first UE is scheduled.

Example 77

The base station of any one of examples 62 to 76, wherein the first data is part of a packet destined for the first UE, and wherein the transmitter is further to transmit systematic bits of the packet before a scheduled transmission time of the first data.

Example 78

The base station of any one of examples 62 to 77, wherein the second UE has a lower latency requirement than the first UE.

Example 79

A method performed by a UE, the method comprising: receiving scheduling information that schedules a downlink transmission of a packet to the UE, the downlink transmission including first data on first resources; receiving update information, the update information indicating that the first data is no longer scheduled on the first resources.

Example 80

The method of example 79 further comprising: attempting to decode the packet without considering downlink data on the first resources.

Example 81

The method of example 79, further comprising the UE sending a NACK in relation to the packet.

Example 82

The method of example 81, wherein the NACK is sent upon unsuccessful decoding of the packet.

Example 83

The method of example 81, wherein the UE sends the NACK without attempting to decode the packet.

Example 84

A UE comprising: a receiver to: receive scheduling information that schedules a downlink transmission of a packet to the UE, the downlink transmission including first data on first resources; and receive update information, the update information indicating that the first data is no longer scheduled on the first resources.

Example 85

The UE of example 84 further comprising a decoder to: attempt to decode the packet without considering downlink data on the first resources.

Example 86

The UE of example 84, further comprising a decoder to generate a NACK in relation to the packet to be sent by a transmitter to the base station.

Example 87

The UE of example 86, wherein the NACK is sent upon unsuccessful decoding of the packet.

Example 88

The UE of example 86, wherein the UE sends the NACK without attempting to decode the packet.

Example 89

A method performed by a base station, the method comprising: transmitting a first transmission of first data over a first time duration in first downlink time-frequency resources; transmitting a second transmission of second data over a second time duration in the first downlink time-frequency resources, the second time duration shorter than the first time duration; wherein the second time duration aligns with an integer number of OFDM symbols of the first time duration.

Example 90

The method of example 89, wherein the first data is latency tolerant data and the second data is low latency data.

Example 91

The method of example 89 or 90, further comprising semi-statically configuring the first downlink time-frequency resources.

Example 92

The method of any one of examples 89 to 91, wherein the first transmission is scheduled over at least one downlink portion of a time interval, the time interval also having at least one uplink portion.

Example 93

The method of any one of examples 89 to 92, wherein a frequency range of the first downlink time-frequency resources is dynamically updated over time.

Example 94

The method of example 93, further comprising transmitting signaling to at least one UE, the signaling indicating a change in the frequency range of the first downlink time-frequency resources.

Example 95

The method of example 94, wherein the signaling is transmitted to a group of UEs.

Example 96

The method of example 93, wherein the frequency range of the first downlink time-frequency resources is dynamically updated over time such that: for a first duration of time a carrier bandwidth is used for transmitting both a first traffic type and a second traffic type, and for a second duration of time the carrier bandwidth is only used for transmitting the second traffic type.

Example 97

The method of example 96, further comprising transmitting signaling indicating that the first traffic type is not sent during the second duration of time.

Example 98

The method of example 96, wherein the first traffic type is low latency traffic and the second traffic type is latency tolerant traffic.

Example 99

The method of example 96, wherein the first traffic type is latency tolerant traffic and the second traffic type is low latency traffic.

Example 100

The method of example 99, wherein the first data belongs to the first traffic type, and the second data belongs to the second traffic type.

Example 101

The method of any one of examples 89 to 100, wherein the first transmission and the second transmission have the same sub-carrier spacing.

Example 102

The method of any one of examples 89 to 100, wherein the first transmission and the second transmission have different sub-carrier spacings.

Example 103

The method of example 102, wherein the second time duration aligns in time with an integer number of slots of the first time duration.

Example 104

The method of example 103, wherein the second time duration aligns in time with one slot of the first time duration.

Example 105

The method of example 102, wherein the second time duration aligns in time with one OFDM symbol of the first time duration.

Example 106

The method of example 105, wherein exactly $2^n$ OFDM symbols of the second data are transmitted over the second time duration, where n is a natural number and $n \geq 1$.

Example 107

The method of example 106, wherein n=1.

Example 108

The method of example 102, wherein the first transmission has a 30 kHz subcarrier spacing and the second transmission has a 60 kHz subcarrier spacing.

Example 109

The method of any one of examples 89 to 108, wherein the first transmission is scheduled for transmission to a first UE, and the method further comprising: transmitting an indication, the indication indicating that a portion of the first data is no longer scheduled on particular time-frequency resources; and transmitting, to a second UE, the second transmission on the particular time-frequency resources.

Example 110

The method of example 109, wherein the indication is transmitted subsequent to transmitting some of the first transmission to the first UE.

Example 111

The method of example 110, further comprising transmitting subsequent data to the first UE on second time-frequency resources, the subsequent data based on the portion of the first data, and the second-time frequency resources different from the particular time-frequency resources.

Example 112

The method of example 111, wherein the subsequent data is scheduled on the second time-frequency resources.

Example 113

The method of example 111 or 112, wherein the subsequent data is a different redundancy version of the portion of the first data.

Example 114

The method of example 111 or 112, wherein the subsequent data is the portion of the first data.

Example 115

The method of any one of examples 111 to 114, wherein the second time-frequency resources are during a subsequent time interval that is later in time than the particular time-frequency resources.

Example 116

The method of example 115, wherein the subsequent time interval has a time duration that is different from the first time duration.

Example 117

The method of example 116, wherein the time duration of the subsequent time interval is shorter than the first time duration.

Example 118

The method of any one of examples 111 to 117, wherein a transport block is scheduled to be transmitted by the first transmission over the first time duration, and wherein the portion of the first data is part of the transport block.

Example 119

The method of example 118, wherein the transport block is a first transport block, wherein the subsequent data is scheduled on the second time-frequency resources over a third time duration, wherein a second transport block is scheduled over a fourth time duration, and wherein the third time duration is different from the fourth time duration.

Example 120

The method of example 119, wherein the third time duration is shorter than the fourth time duration.

Example 121

The method of example 118, further comprising transmitting systematic bits of the transport block at a beginning of the first time duration.

Example 122

The method of example 118, wherein the transport block is a first transport block, and wherein the subsequent data is appended to a second transport block destined for the first UE, the second transport block transmitted during a subsequent time interval that is later in time than the particular time-frequency resources.

Example 123

The method of example 118, wherein the subsequent data is scheduled separately from other transport blocks destined for the first UE.

Example 124

The method of example 111, wherein the subsequent data is transmitted on the second time-frequency resources without waiting for HARQ feedback from the first UE.

Example 125

A base station comprising: a resource allocator to schedule a first transmission of first data over a first time duration in first downlink time-frequency resources, and to schedule a second transmission of second data over a second time duration in the first downlink time-frequency resources, the second time duration shorter than the first time duration; a transmitter to transmit the first transmission and the second transmission; wherein the second time duration aligns with an integer number of OFDM symbols of the first time duration.

Example 126

The base station of example 125, wherein the first data is latency tolerant data and the second data is low latency data.

Example 127

The base station of example 125 or 126, wherein the resource allocator is to semi-statically configure the first downlink time-frequency resources.

Example 128

The base station of any one of examples 125 to 127, wherein the resource allocator is to schedule the first transmission over at least one downlink portion of a time interval, the time interval also having at least one uplink portion.

Example 129

The base station of any one of examples 125 to 128, wherein the resource allocator is to dynamically update, over time, a frequency range of the first downlink time-frequency resources.

Example 130

The base station of example 129, wherein the transmitter is to transmit signaling to at least one UE, the signaling indicating a change in the frequency range of the first downlink time-frequency resources.

Example 131

The base station of example 130, wherein the transmitter is to transmit the signaling to a group of UEs.

Example 132

The base station of any one of examples 129 to 131, wherein the resource allocator is to dynamically update, over time, the frequency range of the first downlink time-frequency resources such that: for a first duration of time a carrier bandwidth is used for transmitting both a first traffic type and a second traffic type, and for a second duration of time the carrier bandwidth is only used for transmitting the second traffic type.

Example 133

The base station of example 132, wherein the transmitter is to transmit signaling indicating that the first traffic type is not sent during the second duration of time.

Example 134

The base station of example 132 or 133, wherein the first traffic type is low latency traffic and the second traffic type is latency tolerant traffic.

Example 135

The base station of example 132 or 133, wherein the first traffic type is latency tolerant traffic and the second traffic type is low latency traffic.

Example 136

The base station of example 135, wherein the first data belongs to the first traffic type, and the second data belongs to the second traffic type.

Example 137

The base station of any one of examples 125 to 136, wherein the first transmission and the second transmission have the same sub-carrier spacing.

Example 138

The base station of any one of examples 125 to 136, wherein the first transmission and the second transmission have different sub-carrier spacings.

Example 139

The base station of example 138, wherein the second time duration aligns in time with an integer number of slots of the first time duration.

Example 140

The base station of example 139, wherein the second time duration aligns in time with one slot of the first time duration.

Example 141

The base station of example 138, wherein the second time duration aligns in time with one OFDM symbol of the first time duration.

Example 142

The base station of example 141, wherein the transmitter is to transmit exactly $2^n$ OFDM symbols of the second data over the second time duration, where n is a natural number and $n \geq 1$.

Example 143

The base station of example 142, wherein n=1.

Example 144

The base station of example 138, wherein the first transmission has a 30 kHz subcarrier spacing and the second transmission has a 60 kHz subcarrier spacing.

Example 145

The base station of any one of examples 125 to 144, wherein the resource allocator is to schedule the first transmission for transmission to a first UE, and wherein the transmitter is further to: transmit an indication, the indication indicating that a portion of the first data is no longer scheduled on particular time-frequency resources; and transmit, to a second UE, the second transmission on the particular time-frequency resources.

Example 146

The base station of example 145, wherein the transmitter is to transmit the indication subsequent to transmitting some of the first transmission to the first UE.

Example 147

The base station of example 146, wherein the transmitter is to transmit subsequent data to the first UE on second time-frequency resources, the subsequent data based on the portion of the first data, and the second-time frequency resources different from the particular time-frequency resources.

Example 148

The base station of example 147, wherein the resource allocator is to schedule the subsequent data on the second time-frequency resources.

Example 149

The base station of example 147 or 148, wherein the subsequent data is a different redundancy version of the portion of the first data.

Example 150

The base station of example 147 or 148, wherein the subsequent data is the portion of the first data.

Example 151

The base station of example 147, wherein the second time-frequency resources are during a subsequent time interval that is later in time than the particular time-frequency resources.

Example 152

The base station of example 151, wherein the subsequent time interval has a time duration that is different from the first time duration.

Example 153

The base station of example 152, wherein the time duration of the subsequent time interval is shorter than the first time duration.

Example 154

The base station of example 147, wherein the resource allocator is to schedule a transport block to be transmitted by the first transmission over the first time duration, and wherein the portion of the first data is part of the transport block.

Example 155

The base station of example 154, wherein the transport block is a first transport block, wherein the resource allocator is to schedule the subsequent data on the second time-frequency resources over a third time duration, wherein the resource allocator is to schedule a second transport block over a fourth time duration, and wherein the third time duration is different from the fourth time duration.

Example 156

The base station of example 155, wherein the third time duration is shorter than the fourth time duration.

Example 157

The base station of example 154, wherein the transmitter is to transmit systematic bits of the transport block at a beginning of the first time duration.

Example 158

The base station of example 154, wherein the transport block is a first transport block, wherein the base station is to append the subsequent data to a second transport block destined for the first UE, and wherein the transmitter is to transmit the second transport block during a subsequent time interval that is later in time than the particular time-frequency resources.

Example 159

The base station of example 154, wherein the resource allocator is to schedule the subsequent data separately from other transport blocks destined for the first UE.

Example 160

The base station of example 147, wherein the transmitter is to transmit the subsequent data on the second time-frequency resources without the base station waiting for HARQ feedback from the first UE.

Example 161

A method performed by a UE, the method comprising: transmitting a first transmission of first data over a first time duration in first uplink time-frequency resources; transmitting a second transmission of second data over a second time duration in the first uplink time-frequency resources, the second time duration shorter than the first time duration; wherein the second time duration aligns with an integer number of OFDM symbols of the first time duration.

Example 162

The method of example 161, wherein the first transmission is a grant-based uplink transmission and the second transmission is grant-free uplink transmission.

Example 163

The method of example 161 or 162, wherein the first data is latency tolerant data and the second data is low latency data.

Example 164

The method of any one of examples 161 to 163, further comprising receiving signaling that semi-statically configures the first uplink time-frequency resources.

Example 165

The method of any one of examples 161 to 164, wherein a frequency range of the first uplink time-frequency resources is dynamically updated over time.

Example 166

The method of example 165, further comprising receiving signaling indicating a change in the frequency range of the first uplink time-frequency resources.

Example 167

The method of example 165, wherein the frequency range of the first uplink time-frequency resources is dynamically updated over time such that: for a first duration of time a carrier bandwidth is used for transmitting both a first traffic type and a second traffic type, and for a second duration of time the carrier bandwidth is only used for transmitting the second traffic type.

Example 168

The method of example 167, further comprising receiving signaling indicating that the first traffic type is not sent during the second duration of time.

Example 169

The method of example 167, wherein the first traffic type is low latency traffic and the second traffic type is latency tolerant traffic.

Example 170

The method of example 167, wherein the first traffic type is latency tolerant traffic and the second traffic type is low latency traffic.

Example 171

The method of example 170, wherein the first data belongs to the first traffic type, the second data belongs to the second traffic type.

Example 172

The method of any one of examples 161 to 171, wherein the first transmission and the second transmission have the same sub-carrier spacing.

Example 173

The method of any one of examples 161 to 171, wherein the first transmission and the second transmission have different sub-carrier spacings.

Example 174

The method of example 173, wherein the second time duration aligns in time with an integer number of slots of the first time duration.

Example 175

The method of example 174, wherein the second time duration aligns in time with one slot of the first time duration.

Example 176

The method of example 173, wherein the second time duration aligns in time with one OFDM symbol of the first time duration.

Example 177

The method of example 176, wherein exactly $2^n$ OFDM symbols of the second data are transmitted over the second time duration, where n is a natural number and n≥1.

Example 178

The method of example 177, wherein n=1.

Example 179

The method of example 173, wherein the first transmission has a 30 kHz subcarrier spacing and the second transmission has a 60 kHz subcarrier spacing.

Example 180

A user equipment (UE) comprising: a message processor to generate first data for uplink transmission to a base station, and to generate second data for uplink transmission to the base station; a transmitter to transmit a first transmission of the first data over a first time duration in first uplink time-frequency resources, and to transmit a second transmission of the second data over a second time duration in the first uplink time-frequency resources, the second time duration shorter than the first time duration; wherein the second time duration aligns with an integer number of OFDM symbols of the first time duration.

Example 181

The UE of example 180, wherein the first transmission is a grant-based uplink transmission and the second transmission is grant-free uplink transmission.

Example 182

The UE of example 180 or 181, wherein the first data is latency tolerant data and the second data is low latency data.

Example 183

The UE of any one of examples 180 to 182, further comprising a receiver to receive signaling, the signaling semi-statically configuring the first uplink time-frequency resources.

Example 184

The UE of any one of examples 180 to 183, further comprising a receiver to receive signaling, the signaling dynamically updating, over time, a frequency range of the first uplink time-frequency resources.

Example 185

The UE of example 184, wherein the signaling indicates a change in the frequency range of the first uplink time-frequency resources.

Example 186

The UE of example 184, wherein the signaling is to dynamically update the frequency range of the first uplink time-frequency resources over time such that: for a first duration of time a carrier bandwidth is used for transmitting both a first traffic type and a second traffic type, and for a second duration of time the carrier bandwidth is only used for transmitting the second traffic type.

Example 187

The UE of example 186, wherein the receiver is to also receive signaling indicating that the first traffic type is not to be sent during the second duration of time.

Example 188

The UE of example 186, wherein the first traffic type is low latency traffic and the second traffic type is latency tolerant traffic.

Example 189

The UE of example 186, wherein the first traffic type is latency tolerant traffic and the second traffic type is low latency traffic.

Example 190

The UE of example 189, wherein the first data belongs to the first traffic type, the second data belongs to the second traffic type.

Example 191

The UE of any one of examples 180 to 190, wherein the first transmission and the second transmission have the same sub-carrier spacing.

Example 192

The UE of any one of examples 180 to 190, wherein the first transmission and the second transmission have different sub-carrier spacings.

Example 193

The UE of example 192, wherein the second time duration aligns in time with an integer number of slots of the first time duration.

Example 194

The UE of example 193, wherein the second time duration aligns in time with one slot of the first time duration.

Example 195

The UE of example 192, wherein the second time duration aligns in time with one OFDM symbol of the first time duration.

Example 196

The UE of example 195, wherein the transmitter is to transmit exactly $2^n$ OFDM symbols of the second data over the second time duration, where n is a natural number and $n \geq 1$.

Example 197

The UE of example 196, wherein n=1.

Example 198

The UE of example 192, wherein the first transmission has a 30 kHz subcarrier spacing and the second transmission has a 60 kHz subcarrier spacing.

Example 199

The UE of example 192, wherein the first transmission has a 15 kHz subcarrier spacing and the second transmission has a 30 kHz subcarrier spacing.

Example 200

A method performed by a UE, the method comprising: receiving scheduling information that schedules a downlink transmission of a transport block for the UE during a first time interval, the downlink transmission including first data on particular time-frequency resources; receiving an indication, the indication indicating that the first data is no longer scheduled on the particular time-frequency resources, and the indication being received subsequent to receiving some of the downlink transmission; attempting to decode the transport block without considering downlink data on the particular time-frequency resources.

Example 201

The method of example 200, wherein the downlink transmission includes a first portion and a second portion, the second portion later in time than the first portion, and further comprising the UE monitoring for the indication subsequent to the first portion.

Example 202

The method of example 201, wherein the UE monitors for the indication subsequent to the second portion.

Example 203

The method of example 200, further comprising the UE monitoring for the indication after a second time interval, the second time interval subsequent to the scheduling information, and the second time interval comprises a group of OFDM symbols.

Example 204

The method of any one of examples 200 to 203, further comprising receiving subsequent data on second time-frequency resources, the subsequent data based on the first data, and the second time-frequency resources different from the particular time-frequency resources; and the method further comprising using the subsequent data when attempting to decode the transport block.

Example 205

The method of example 204, wherein the subsequent data is a different redundancy version of the first data.

Example 206

The method of example 204, wherein the subsequent data is the first data.

Example 207

The method of any one of examples 204 to 206, wherein the second time-frequency resources are during a subsequent time interval that is later in time than the particular time-frequency resources.

Example 208

The method of example 207, wherein the subsequent time interval is also later in time than the first time interval.

Example 209

The method of example 207 or 208, wherein attempting to decode the transport block comprises using both (i) data received during the first time interval and (ii) the subsequent data.

Example 210

The method of example 209, further comprising transmitting HARQ feedback based on the result of the decoding.

Example 211

The method of any one of examples 207 to 210, further comprising receiving systematic bits of the transport block at a beginning of the first time interval.

Example 212

The method of any one of examples 207 to 211, further comprising transmitting HARQ feedback to the base station based on the result of the decoding.

Example 213

The method of any one of examples 207 to 212, wherein the subsequent time interval has a time duration that is different from a duration of the first time interval.

Example 214

The method of example 213, wherein the time duration of the subsequent time interval is shorter than the time duration of the first time interval.

Example 215

The method of example 204, wherein the transport block is a first transport block, wherein the subsequent data is scheduled on the second time-frequency resources over a third time duration, wherein a second transport block for the UE is scheduled over a fourth time duration, and wherein the third time duration is different from the fourth time duration.

Example 216

The method of example 215, wherein the third time duration is shorter than the fourth time duration.

Example 217

The method of example 204, wherein the transport block is a first transport block, and wherein the subsequent data is appended to a second transport block received by UE, the second transport block received during a subsequent time interval that is later in time than the particular time-frequency resources.

Example 218

The method of example 204, wherein the subsequent data is scheduled on the second time-frequency resources separately from scheduling other transport blocks for the UE.

Example 219

A UE comprising: a receiver to receive scheduling information that schedules a downlink transmission of a transport block for the UE during a first time interval, the downlink transmission including first data on particular time-frequency resources; the receiver to also receive an indication, the indication indicating that the first data is no longer scheduled on the particular time-frequency resources, and the indication being received subsequent to receiving some of the downlink transmission; a message processor to attempt to decode the transport block without considering downlink data on the particular time-frequency resources.

Example 220

The UE of example 219, wherein the downlink transmission includes a first portion and a second portion, the second portion later in time than the first portion, and wherein the UE is to monitor for the indication subsequent to the first portion.

Example 221

The UE of example 220, wherein the UE is to monitor for the indication subsequent to the second portion.

Example 222

The UE of example 219, wherein the UE is to monitor for the indication after a second time interval, the second time interval subsequent to the scheduling information, and the second time interval comprises a group of OFDM symbols.

Example 223

The UE of any one of examples 219 to 222, wherein the receiver is to receive subsequent data on second time-frequency resources, the subsequent data based on the first data, and the second time-frequency resources different from the particular time-frequency resources; and the message processor is to use the subsequent data when attempting to decode the transport block.

Example 224

The UE of example 223, wherein the subsequent data is a different redundancy version of the first data.

Example 225

The UE of example 223, wherein the subsequent data is the first data.

Example 226

The UE of any one of examples 223 to 225, wherein the second time-frequency resources are during a subsequent time interval that is later in time than the particular time-frequency resources.

Example 227

The UE of example 226, wherein the subsequent time interval is also later in time than the first time interval.

Example 228

The UE of example 226 or 227, wherein the message processor is to attempt to decode the transport block by using both (i) data received during the first time interval and (ii) the subsequent data.

Example 229

The UE of example 228, further comprising a transmitter to transmit HARQ feedback, the HARQ feedback based on the result of the decoding.

Example 230

The UE of any one of examples 226 to 229, wherein the receiver is to receive systematic bits of the transport block at a beginning of the first time interval.

Example 231

The UE of any one of examples 226 to 230, further comprising a transmitter to transmit HARQ feedback to the base station, the HARQ feedback based on the result of the decoding.

Example 232

The UE of example 226, wherein the subsequent time interval has a time duration that is different from a duration of the first time interval.

Example 233

The UE of example 232, wherein the time duration of the subsequent time interval is shorter than the time duration of the first time interval.

Example 234

The UE of example 223, wherein the transport block is a first transport block, wherein the subsequent data is scheduled on the second time-frequency resources over a third time duration, wherein a second transport block for the UE is scheduled over a fourth time duration, and wherein the third time duration is different from the fourth time duration.

Example 235

The UE of example 234, wherein the third time duration is shorter than the fourth time duration.

Example 236

The UE of example 223, wherein the transport block is a first transport block, and wherein the receiver is to receive the subsequent data appended to a second transport block, the second transport block received during a subsequent time interval that is later in time than the particular time-frequency resources.

Example 237

The UE of example 223, wherein the subsequent data is scheduled on the second time-frequency resources separately from scheduling other transport blocks for the UE.

Example 238

A method performed by a UE, the method comprising: receiving scheduling information that schedules a downlink transmission of a transport block for the UE during a first time interval, the downlink transmission including first data on particular time-frequency resources; receiving an indication, the indication indicating that the first data is no longer scheduled on the particular time-frequency resources, and the indication being received subsequent to receiving some of the downlink transmission; transmitting a NACK without attempting to decode the transport block.

Example 239

The method of example 238, wherein the downlink transmission includes a first portion and a second portion, the second portion later in time than the first portion, and further comprising the UE monitoring for the indication subsequent to the first portion.

Example 240

The method of example 239, wherein the UE monitors for the indication subsequent to the second portion.

Example 241

The method of example 238, further comprising the UE monitoring for the indication after a second time interval, the second time interval subsequent to the scheduling information, and the second time interval comprises a group of OFDM symbols.

Example 242

The method of any one of examples 238 to 241, further comprising determining not to attempt to decode the transport block based on information in the indication.

Example 243

The method of any one of examples 238 to 242, further comprising determining not to attempt to decode the transport block based on how much of the transport block is not received during the first time interval.

Example 244

A UE comprising: a receiver to receive scheduling information that schedules a downlink transmission of a transport block for the UE during a first time interval, the downlink transmission including first data on particular time-frequency resources; the receiver also to receive an indication, the indication indicating that the first data is no longer scheduled on the particular time-frequency resources, and the indication being received subsequent to receiving some of the downlink transmission; a transmitter to transmit a NACK, the NACK transmitted without attempting to decode the transport block.

Example 245

The UE of example 244, wherein the downlink transmission includes a first portion and a second portion, the second portion later in time than the first portion, and wherein the UE is to monitor for the indication subsequent to the first portion.

Example 246

The UE of example 245, wherein the UE is to monitor for the indication subsequent to the second portion.

Example 247

The UE of example 244, wherein the UE is to monitor for the indication after a second time interval, the second time interval subsequent to the scheduling information, and the second time interval comprises a group of OFDM symbols.

Example 248

The UE of any one of examples 244 to 247, wherein the UE is to determine not to attempt to decode the transport block based on information in the indication.

Example 249

The UE of any one of examples 244 to 248, wherein the UE is to determine not to attempt to decode the transport block based on how much of the transport block is not received during the first time interval.

Example 250

A method performed by a UE, the method comprising: receiving semi-static signaling indicating a location of a time-frequency region; receiving scheduling information that schedules a downlink transmission of a transport block for the UE during a first time interval in the time-frequency region, the downlink transmission including first data on particular time-frequency resources; receiving an indication, the indication indicating that the first data is no longer scheduled on the particular time-frequency resources, and the indication being received subsequent to receiving some of the downlink transmission.

Example 251

The method of example 250, wherein the downlink transmission includes a first portion and a second portion, the second portion later in time than the first portion, and further comprising the UE monitoring for the indication subsequent to the first portion.

Example 252

The method of example 250, wherein the downlink transmission includes a first portion and a second portion, the second portion later in time than the first portion, and further comprising the UE monitoring for the indication subsequent to the second portion.

Example 253

The method of example 250, further comprising the UE monitoring for the indication after a second time interval, the second time interval subsequent to the scheduling information, and the second time interval comprises a group of OFDM symbols.

Example 254

The method of any one of examples 250 to 253, further comprising attempting to decode the transport block without considering downlink data on the particular time-frequency resources.

Example 255

The method of any one of examples 250 to 253, further comprising attempting to decode the transport block using both (i) data received during the first time interval and (ii) subsequent data, the subsequent data based on the first data.

Example 256

The method of any one of examples 250 to 253, further comprising transmitting a NACK without attempting to decode the transport block.

Example 257

A UE comprising: a receiver to receive semi-static signaling, the semi-static signaling indicating a location of a time-frequency region; the receiver to also receive scheduling information that schedules a downlink transmission of a transport block for the UE during a first time interval in the time-frequency region, the downlink transmission including first data on particular time-frequency resources; the receiver also to receive an indication, the indication indicating that the first data is no longer scheduled on the particular time-frequency resources, and the indication being received subsequent to receiving some of the downlink transmission.

Example 258

The UE of example 257, further comprising a message processor to attempt to decode the transport block without considering downlink data on the particular time-frequency resources.

Example 259

The UE of example 257, further comprising a message processor to attempt to decode the transport block using both (i) data received during the first time interval and (ii) subsequent data, the subsequent data based on the first data.

Example 260

The UE of example 257, further comprising a transmitter to transmit a NACK, the NACK transmitted without attempting to decode the transport block.

Example 261

A base station comprising a memory and at least one processor, wherein instructions are stored in the memory that, when executed by the at least one processor, cause the base station to perform any one of the base station method examples outlined above.

Example 262

A UE comprising a memory and at least one processor, wherein instructions are stored in the memory that, when executed by the at least one processor, cause the UE to perform any one of the UE method examples outlined above.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a base station, the method comprising:
    transmitting, by the base station, a first transmission of first data over a first time duration in first downlink time-frequency resources;
    transmitting, by the base station, a second transmission of second data over a second time duration in the first downlink time-frequency resources, the second time duration being shorter than the first time duration;
    transmitting, by the base station, a monitor indication through radio resource control (RRC) signaling, wherein the monitor indication indicates to monitor for a puncturing indicator; and
    transmitting, by the base station, the puncturing indicator in a group common downlink control information (DCI), wherein the puncturing indicator indicates that a subset of the first downlink time-frequency resources are punctured from the first transmission of first data, and wherein the second transmission of the second data is located within the subset of the first downlink time-frequency resources.

2. The method of claim 1, further comprising semi-statically configuring the first downlink time-frequency resources.

3. The method of claim 1, wherein a frequency range of the first downlink time-frequency resources is dynamically updated over time.

4. The method of claim 1, wherein the first transmission and the second transmission have different sub-carrier spacings.

5. The method of claim 4, wherein the second time duration aligns in time with an integer number of slots of the first time duration.

6. The method of claim 1, further comprising transmitting subsequent data to a first UE on second downlink time-frequency resources, the subsequent data based on the subset of the first downlink time-frequency resources punctured from the first transmission of first data, and the second downlink time-frequency resources are different from the first downlink time-frequency resources.

7. The method of claim 6, wherein the second downlink time-frequency resources are during a subsequent time interval, the subsequent time interval being shorter than the first time duration.

8. The method of claim 6, wherein a transport block is scheduled to be transmitted by the first transmission over the first time duration, wherein the method further comprises transmitting systematic bits of the transport block at time-frequency resources prior to the subset of the first downlink time-frequency resources punctured.

9. The method of claim 6, wherein a first transport block is scheduled to be transmitted by the first transmission over the first time duration, and wherein the subsequent data is appended to a second transport block destined for the first UE, the second transport block transmitted during a subsequent time interval that is later in time than the first downlink time-frequency resources.

10. The method of claim 6, wherein the subsequent data is transmitted on the second downlink time-frequency resources without waiting for HARQ feedback from the first UE.

11. The method of claim 1, wherein the first transmission of the first data and the second transmission of the second data are transmitted to different UEs.

12. A base station comprising:
    at least one processor; and
    a non-transitory computer readable storage medium storing programming, the programming including instructions that, when executed by the at least one processor, cause the base station to perform operations, the operations comprising:
        transmitting a first transmission of first data over a first time duration in first downlink time-frequency resources;
        transmitting a second transmission of second data over a second time duration in the first downlink time-frequency resources, the second time duration being shorter than the first time duration;
        transmitting a monitor indication through radio resource control (RRC) signaling, wherein the monitor indication indicates to monitor for a puncturing indicator; and
        transmitting the puncturing indicator in a group common downlink control information (DCI), wherein the puncturing indicator indicates that a subset of the first downlink time-frequency resources are punctured from the first transmission of first data, and wherein the second transmission of second data is located within the subset of the first downlink time-frequency resources.

13. The base station of claim 12, the operations further comprising:
semi-statically configuring the first downlink time-frequency resources.

14. The base station of claim 12, the operations further comprising:
scheduling the first transmission to a first UE;
transmitting an indication, the indication indicating that a portion of the first data is no longer scheduled on particular time-frequency resources; and
transmitting, to a second UE, the second transmission on the particular time-frequency resources.

15. The base station of claim 12, wherein the first transmission of the first data and the second transmission of the second data are transmitted to different UEs.

16. A method performed by a user equipment (UE), the method comprising:
receiving, by the UE from a base station, a first transmission of first data over a first time duration in first downlink time-frequency resources;
receiving, by the UE from the base station, a monitor indication through radio resource control (RRC) signaling, wherein the monitor indication indicates to monitor for a puncturing indicator; and
receiving, by the UE from the base station, the puncturing indicator in a group common downlink control information (DCI), wherein the puncturing indicator indicates that a subset of the first downlink time-frequency resources are punctured from the first transmission of the first data for a second transmission of second data from the base station over a second time duration in the first downlink time-frequency resources, the second time duration being shorter than the first time duration, wherein the second transmission of the second data is located within the subset of the first downlink time-frequency resources.

17. The method of claim 16, further comprising,
receiving, by the UE, the second transmission of the second data over the second time duration in the first downlink time-frequency resources.

18. The method of claim 17, wherein the second time duration aligns in time with an integer number of slots of the first time duration.

19. The method of claim 17, wherein the second time duration aligns in time with one OFDM symbol of the first time duration.

20. The method of claim 17, wherein the first transmission and the second transmission have different sub-carrier spacings.

21. The method of claim 17, wherein the second time duration aligns in time with an integer number of slots of the first time duration.

22. The method of claim 17, wherein the first transmission of the first data and the second transmission of the second data are transmitted to different UEs.

23. The method of claim 17, wherein the group common DCI is transmitted after the first downlink time-frequency resources.

24. A user equipment (UE) comprising:
at least one processor; and
a non-transitory computer readable storage medium storing programming, the programming including instructions that, when executed by the at least one processor, cause the UE to perform operations, the operations comprising:
receiving, from a base station, a first transmission of first data over a first time duration in first downlink time-frequency resources;
receiving, from the base station, a monitor indication through radio resource control (RRC) signaling, wherein the monitor indication indicates to monitor for a puncturing indicator; and
receiving, from the base station, the puncturing indicator in a group common downlink control information (DCI), the puncturing indicator indicating that a subset of the first downlink time-frequency resources are punctured from the first transmission of the first data for a second transmission of second data from the base station over a second time duration in the first downlink time-frequency resources, the second time duration being shorter than the first time duration, wherein the second transmission of the second data is located within the subset of the first downlink time-frequency resources.

25. The UE of claim 24, the operations further comprising:
receiving the second transmission of the second data over the second time duration in the first downlink time-frequency resources.

26. The UE of claim 25, wherein the second time duration aligns in time with an integer number of slots of the first time duration.

27. The UE of claim 25, wherein the second time duration aligns in time with one OFDM symbol of the first time duration.

28. The UE of claim 25, wherein the first transmission and the second transmission have different sub-carrier spacings.

29. The UE of claim 25, wherein the first transmission of the first data and the second transmission of the second data are transmitted to different UEs.

30. The UE of claim 25, wherein the group common DCI is transmitted after the first downlink time-frequency resources.

* * * * *